United States Patent
Motomura et al.

[11] Patent Number: 5,875,357
[45] Date of Patent: *Feb. 23, 1999

[54] LENS-FITTED PHOTO FILM UNIT AND ELECTRONIC FLASH DEVICE FOR USE THEREWITH

[75] Inventors: Katsumi Motomura, Saitama; Keiji Uchiyama, Kanagawa; Nobuyuki Kameyama, Kanagawa; Takashi Imamura, Kanagawa; Mitsuyoshi Mochida, Tokyo; Yukitsugu Hata; Junichi Takagi, both of Kanagawa, all of Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 965,090

[22] Filed: Nov. 28, 1997

Related U.S. Application Data

[60] Continuation of Ser. No. 641,429, May 7, 1996, abandoned, which is a division of Ser. No. 443,980, May 18, 1995, abandoned.

[30] Foreign Application Priority Data

| | | | |
|---|---|---|---|
| May 18, 1994 | [JP] | Japan | 6-103532 |
| Aug. 22, 1994 | [JP] | Japan | 6-196658 |
| Aug. 24, 1994 | [JP] | Japan | 6-199670 |
| Oct. 13, 1994 | [JP] | Japan | 6-247465 |
| Oct. 17, 1994 | [JP] | Japan | 6-250980 |
| Oct. 17, 1994 | [JP] | Japan | 6-250985 |

[51] Int. Cl.$^6$ ................................................. G03B 17/02
[52] U.S. Cl. ............................................. 396/6; 396/167
[58] Field of Search .................................. 396/167, 170, 396/262, 506, 6

[56] References Cited

U.S. PATENT DOCUMENTS

| | | | |
|---|---|---|---|
| 3,476,029 | 11/1969 | Schreckendgust | 95/53 |
| 3,906,526 | 9/1975 | Toyoshima et al. | 354/149 |
| 4,051,494 | 9/1977 | Fujita et al. | 354/145 |
| 4,068,150 | 1/1978 | Iwata et al. | 315/241 |

(List continued on next page.)

FOREIGN PATENT DOCUMENTS

| | | |
|---|---|---|
| 0 331 048 | 9/1989 | European Pat. Off. . |
| 27 40 119 | 3/1978 | Germany . |
| 32 20 318 | 12/1983 | Germany . |
| 39 40 202 | 6/1990 | Germany . |
| 2-118532 | 5/1990 | Japan . |

*Primary Examiner*—Safet Metjahic
*Assistant Examiner*—John Chizmar
*Attorney, Agent, or Firm*—Young & Thompson

[57] ABSTRACT

A lens-fitted photo film unit has an electronic flash device (11, 30; 115) with a printed circuit board (173). The flash device includes a flash-emitting section (6, 170) for emitting flash light toward a photographic field, and a main capacitor (31, 155) for storing charge to be discharged in the flash-emitting section. The printed circuit board converts a current of a battery (12, 127) into a current of high voltage to be supplied to the main capacitor. The printed circuit board has a transistor (13, Tr1) for oscillation. A primary winding (15) has one end connected to the battery, and another end connected to a collector of the transistor. A secondary winding (16) is combined in mutual induction with the primary winding, has one end connected to the main capacitor, and another end connected to a base of the transistor. A tertiary winding (17) is combined in mutual induction with the secondary winding, has one end connected to the battery, and another end connected to the base of the transistor. An LED (21, 180) has a cathode connected to the one end of the tertiary winding with the battery, and an anode connected to the another end of the tertiary winding opposite to the battery. The LED is driven to emit light in response to charging of the main capacitor at a predetermined level. In a preferred embodiment, the photo film unit is pre-loaded with photo film (123) having speed of ISO 800 or higher, to allow the main capacitor to have small capacitance adapted to the high speed of the photo film.

3 Claims, 36 Drawing Sheets

U.S. PATENT DOCUMENTS

| | | |
|---|---|---|
| 4,101,914 | 7/1978 | Yamashita et al. .................... 354/128 |
| 4,106,037 | 8/1978 | Nakamura et al. .................... 354/128 |
| 4,174,898 | 11/1979 | Iijima ..................................... 354/145 |
| 4,218,120 | 8/1980 | Kawamura et al. .................... 354/227 |
| 4,311,371 | 1/1982 | Kobori et al. ............................ 354/34 |
| 4,350,420 | 9/1982 | Engelsmann et al. ................. 354/145 |
| 4,431,288 | 2/1984 | Iwata et al. ............................. 354/446 |
| 4,478,502 | 10/1984 | Nakai ..................................... 354/416 |
| 4,609,269 | 9/1986 | Kamata ............................. 354/149.11 |
| 4,945,368 | 7/1990 | Ishino et al. ...................... 354/149.11 |
| 4,999,663 | 3/1991 | Nakamura .............................. 354/415 |
| 5,047,792 | 9/1991 | Asano et al. ...................... 354/149.11 |
| 5,063,402 | 11/1991 | Shimada et al. ....................... 354/400 |
| 5,107,287 | 4/1992 | Swayze ..................................... 354/82 |
| 5,181,057 | 1/1993 | Takagi et al. ............................. 354/94 |
| 5,235,364 | 8/1993 | Ohmura et al. ................... 354/149.11 |
| 5,270,754 | 12/1993 | Newman ........................... 354/149.11 |
| 5,410,378 | 4/1995 | Tasaka et al. ..................... 354/149.11 |
| 5,432,572 | 7/1995 | Hirasaki et al. .................. 354/149.11 |
| 5,466,560 | 11/1995 | Sowinski et al. ....................... 430/347 |

F I G. 4
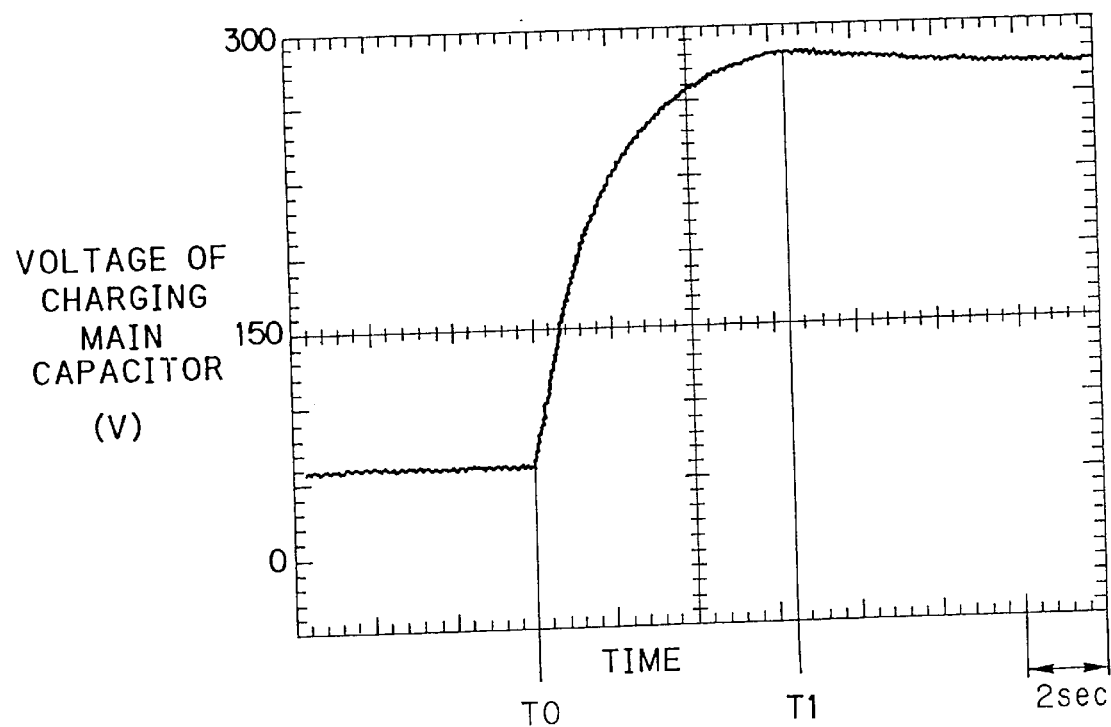

F I G. 7
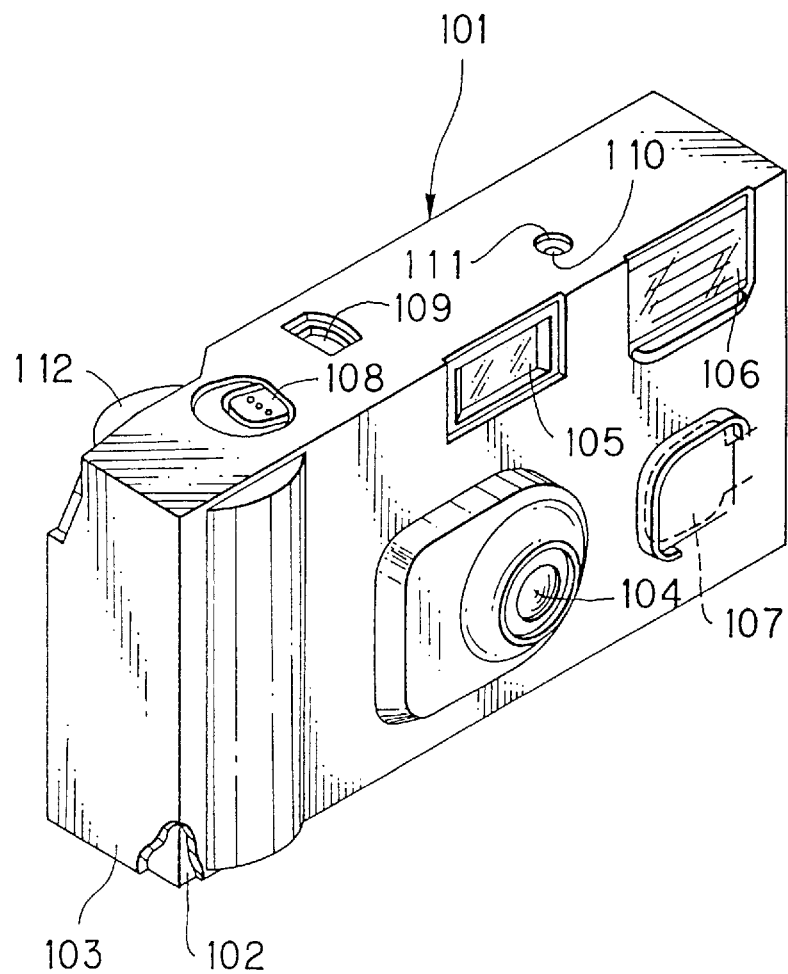

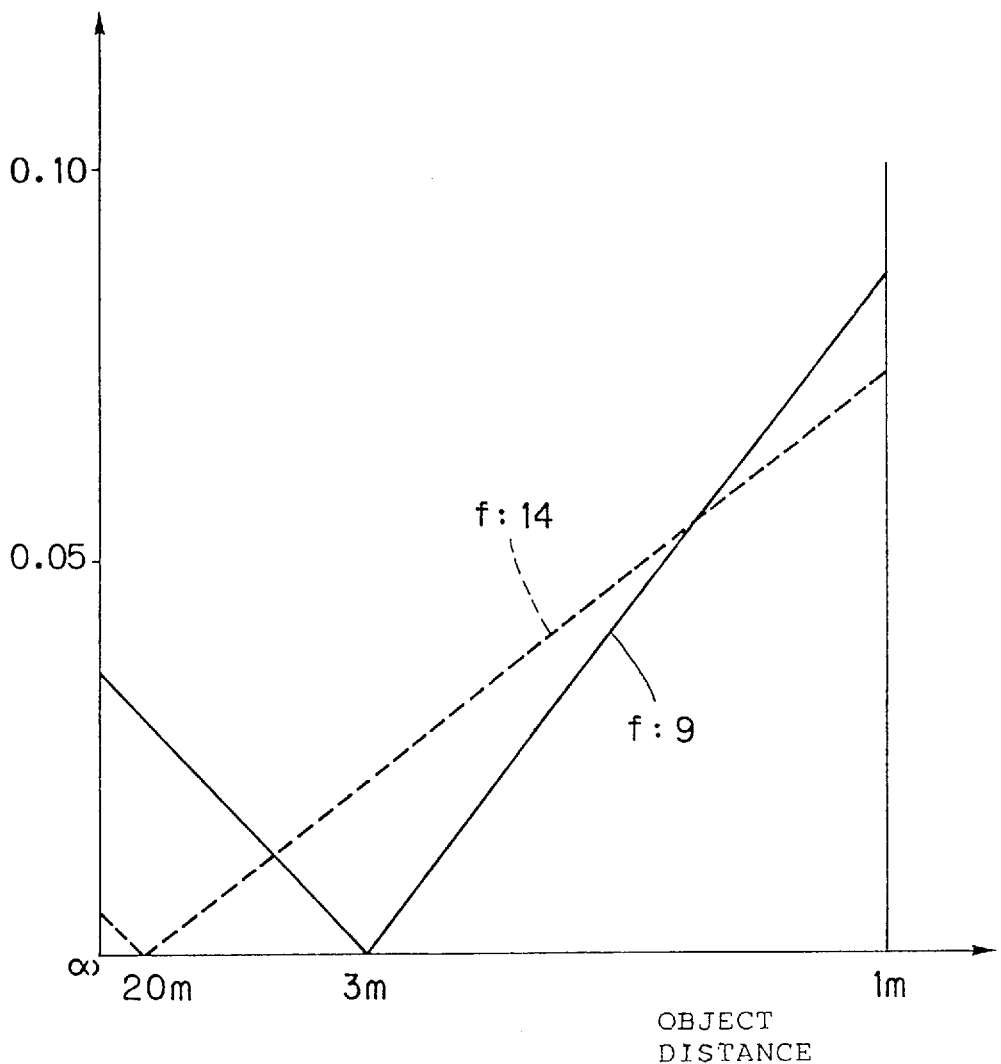

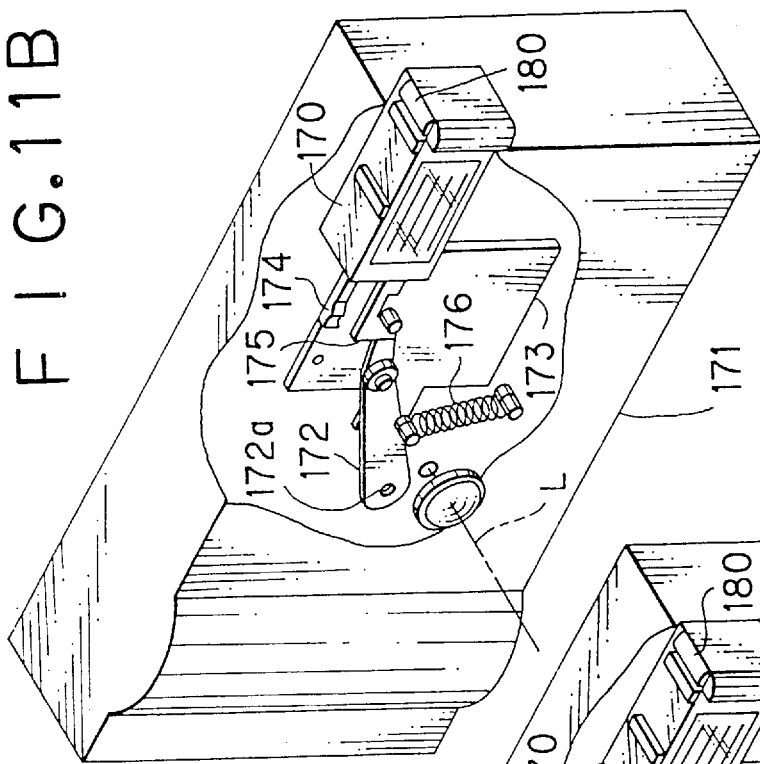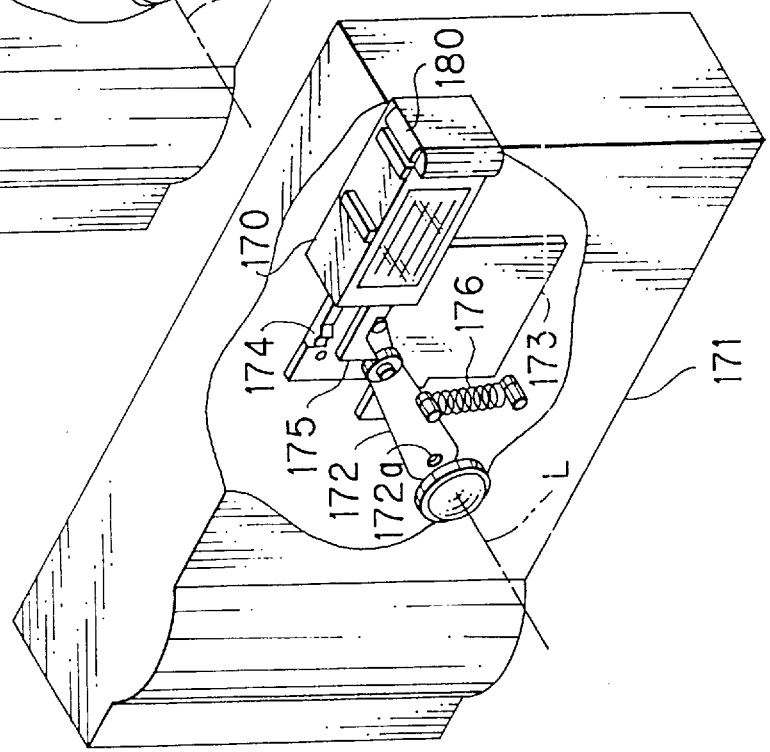

F I G. 16
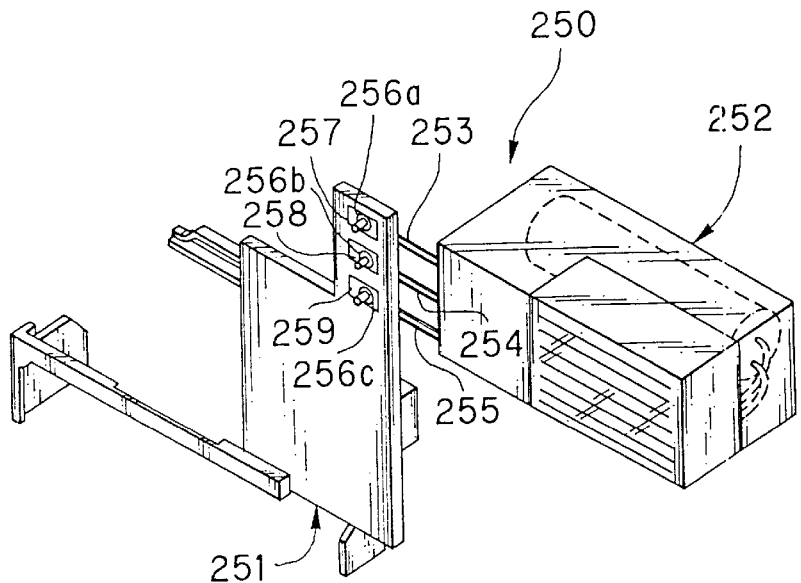
F I G. 17
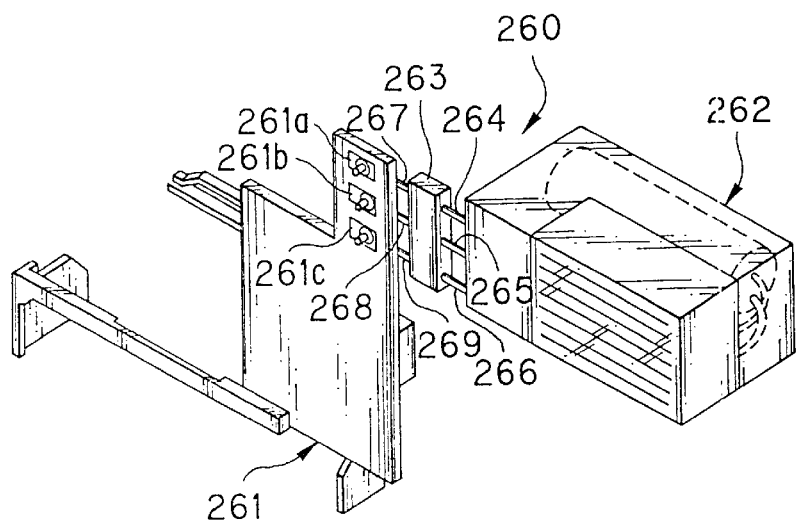

F I G.18
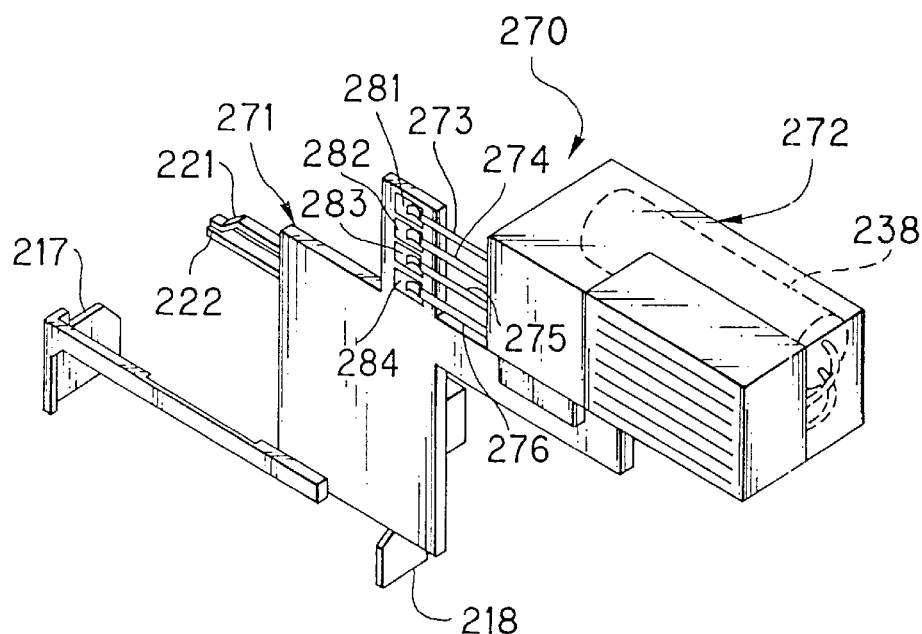
F I G.19
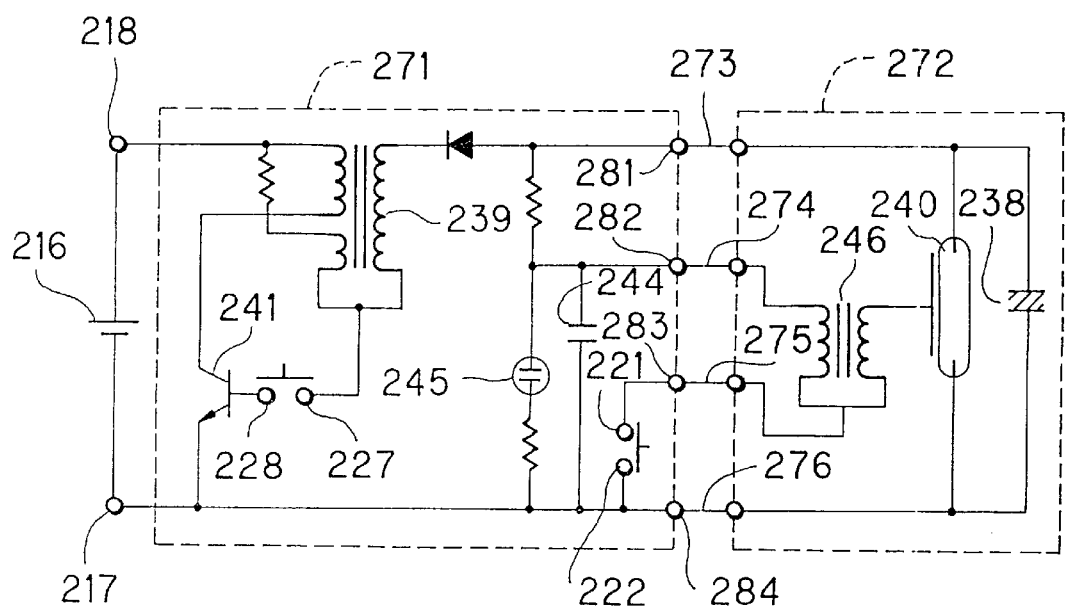

F I G. 20
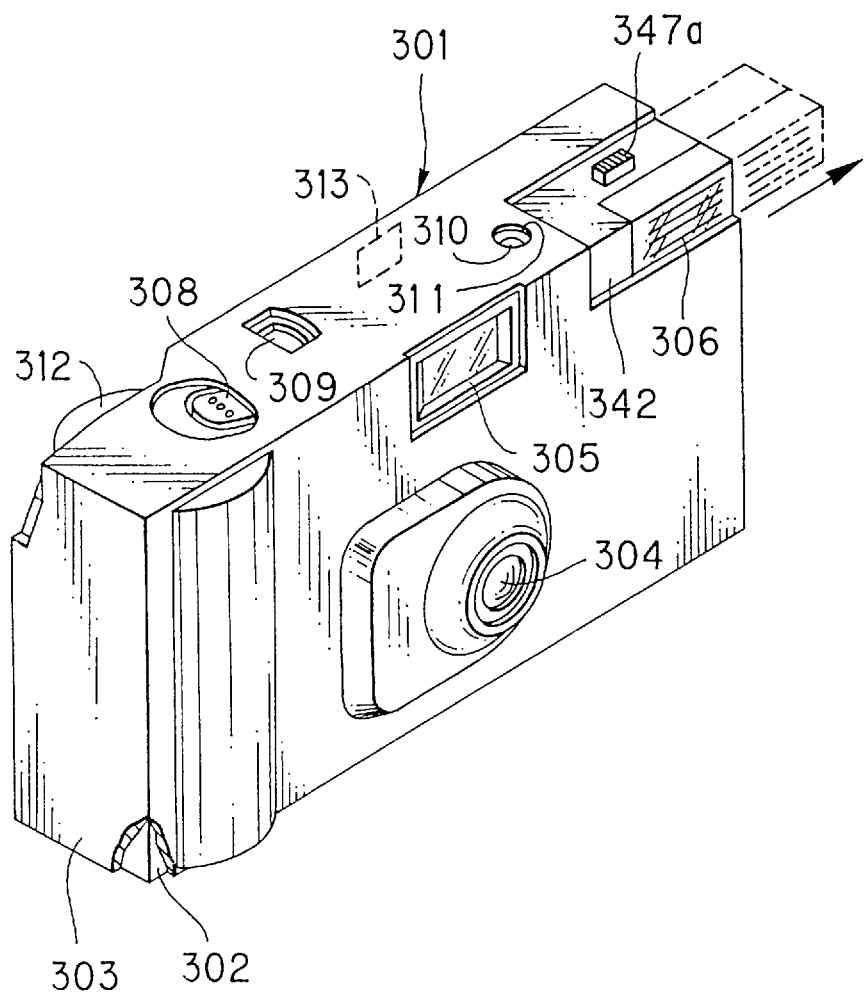

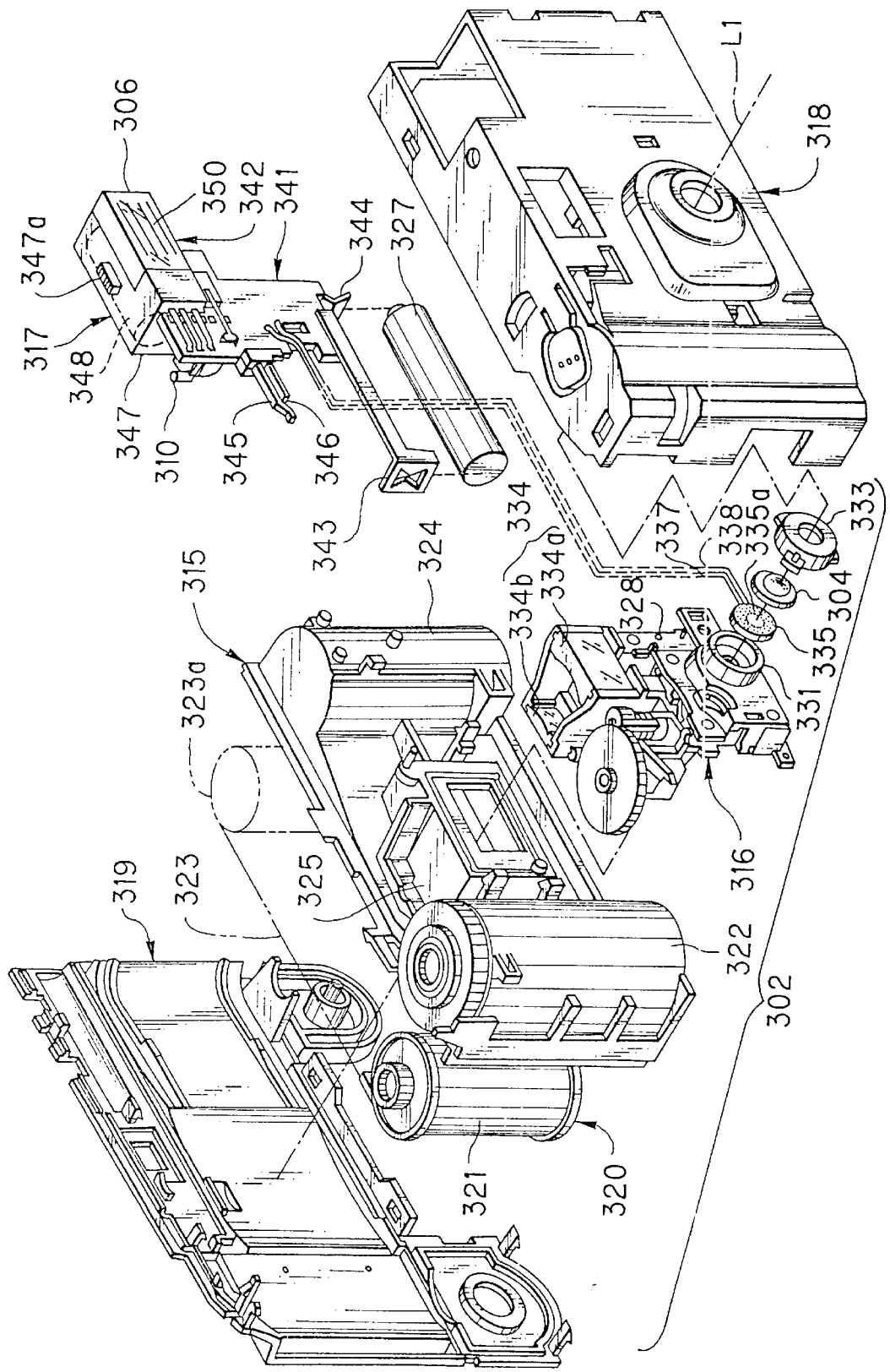

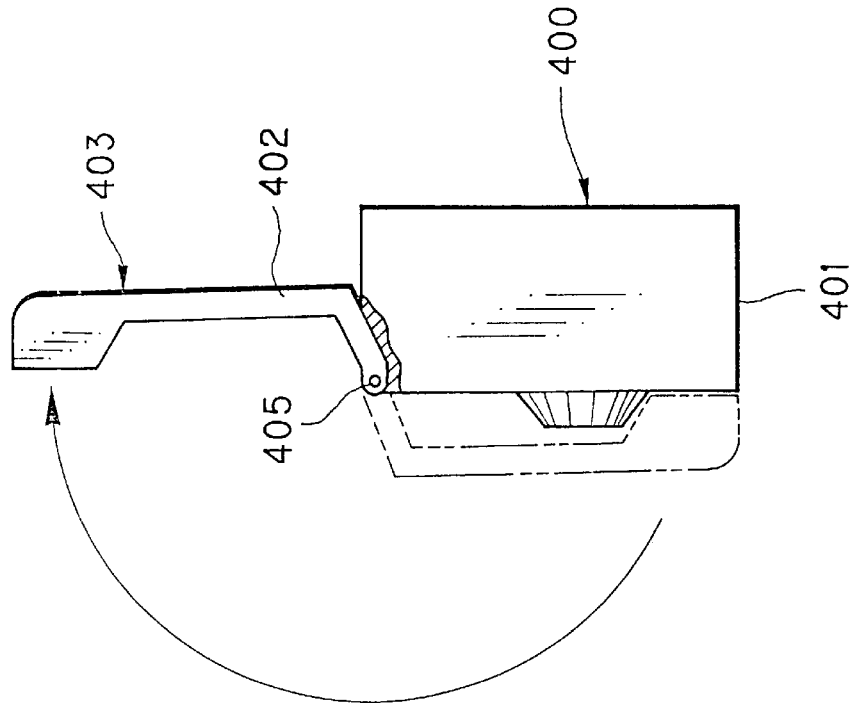
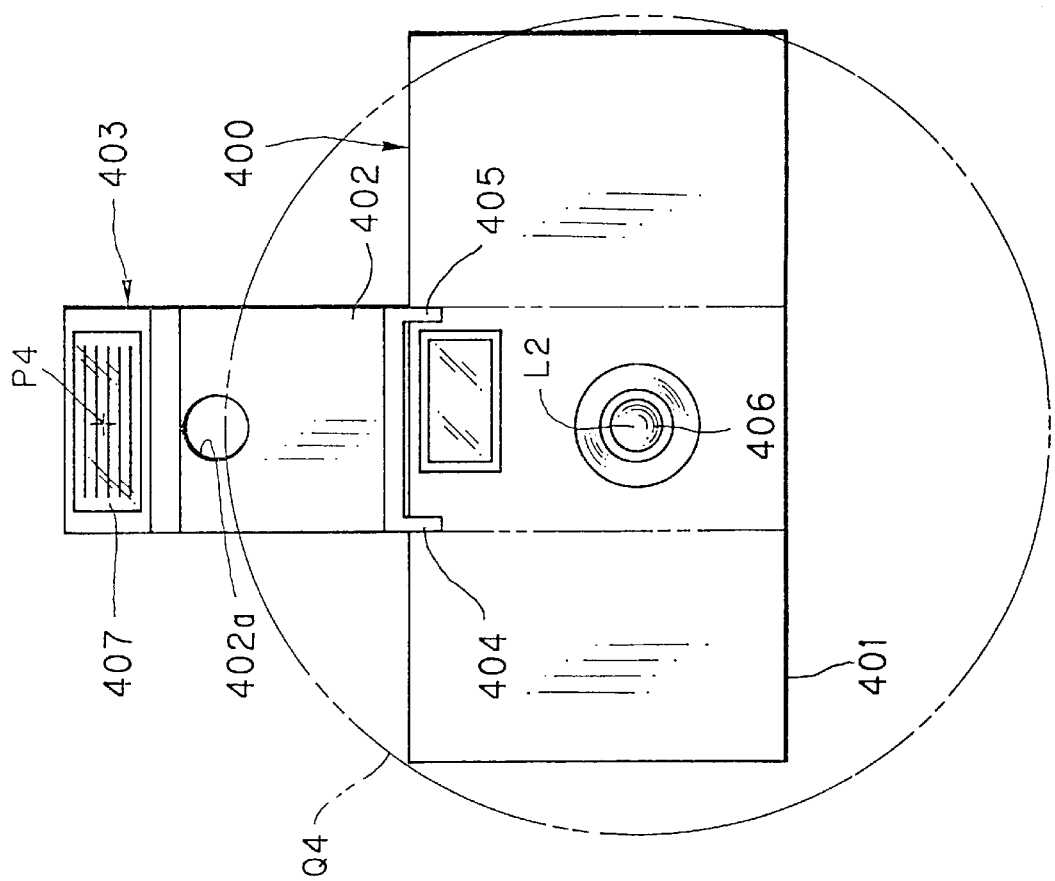

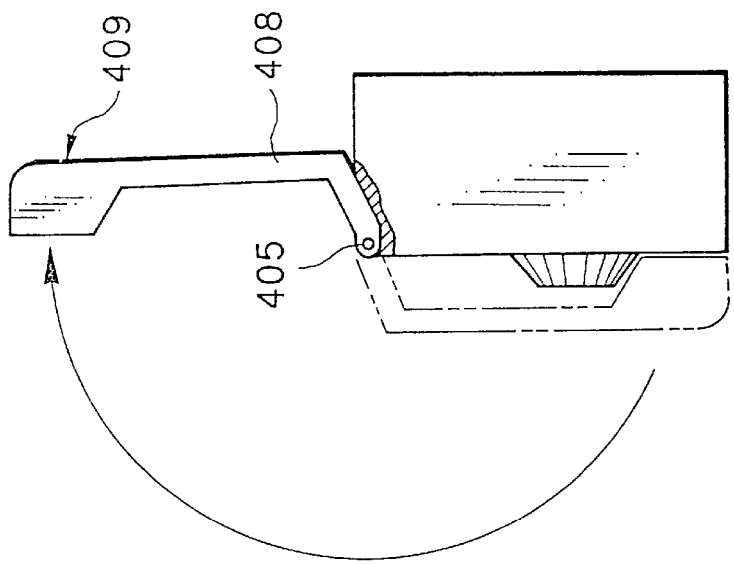
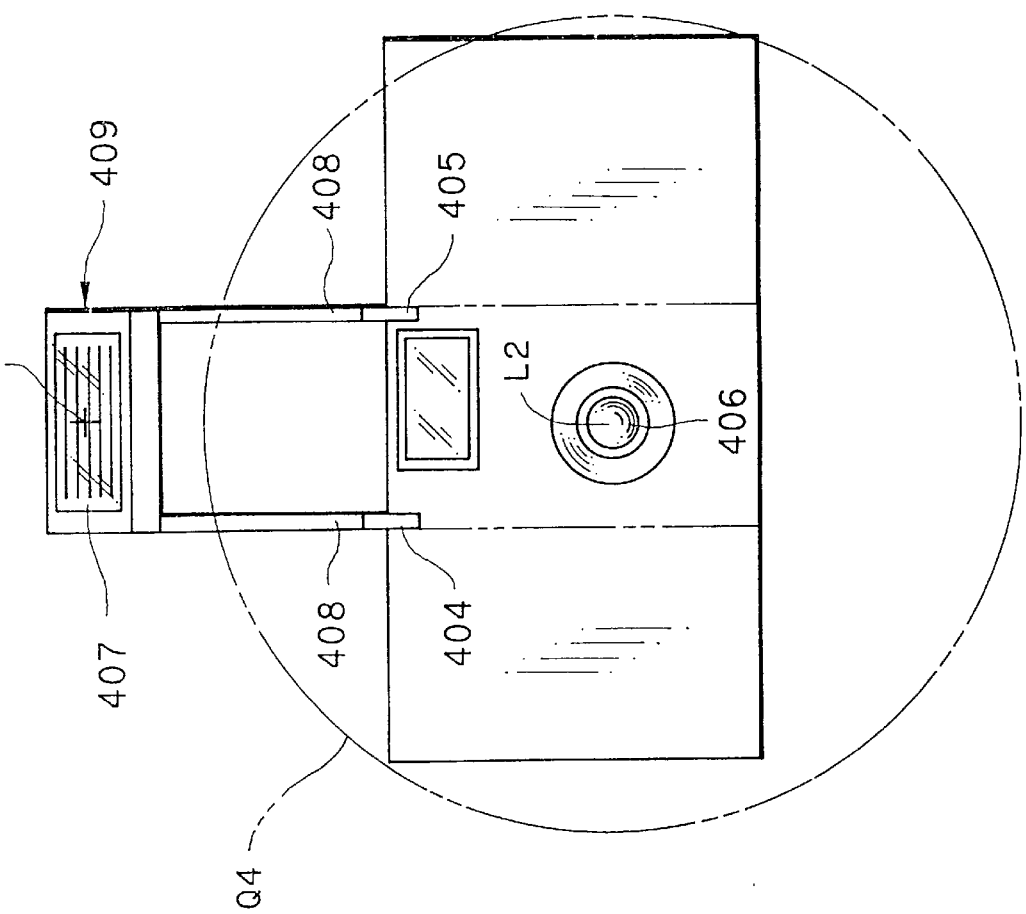

F I G. 28
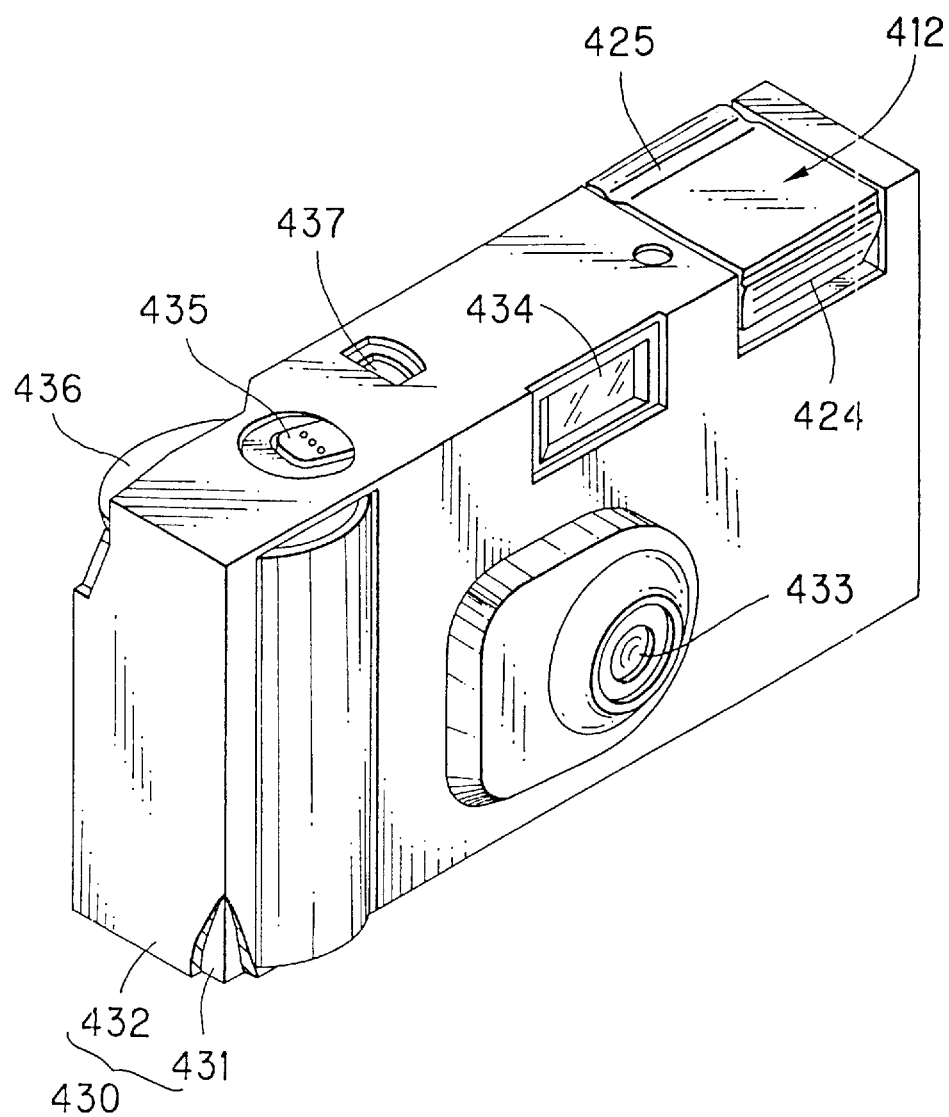

F I G. 31A
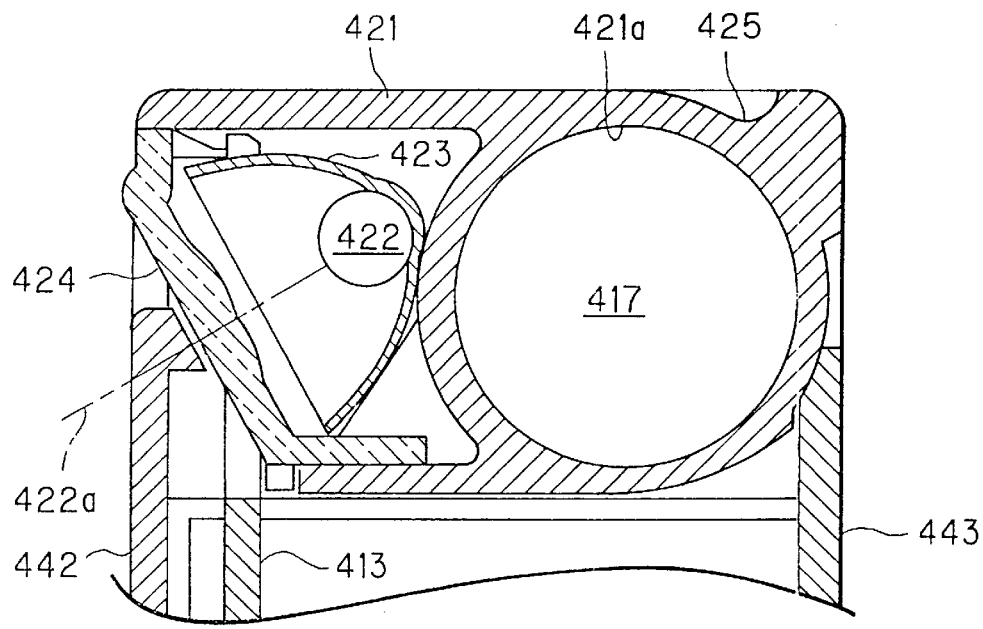
F I G. 31B
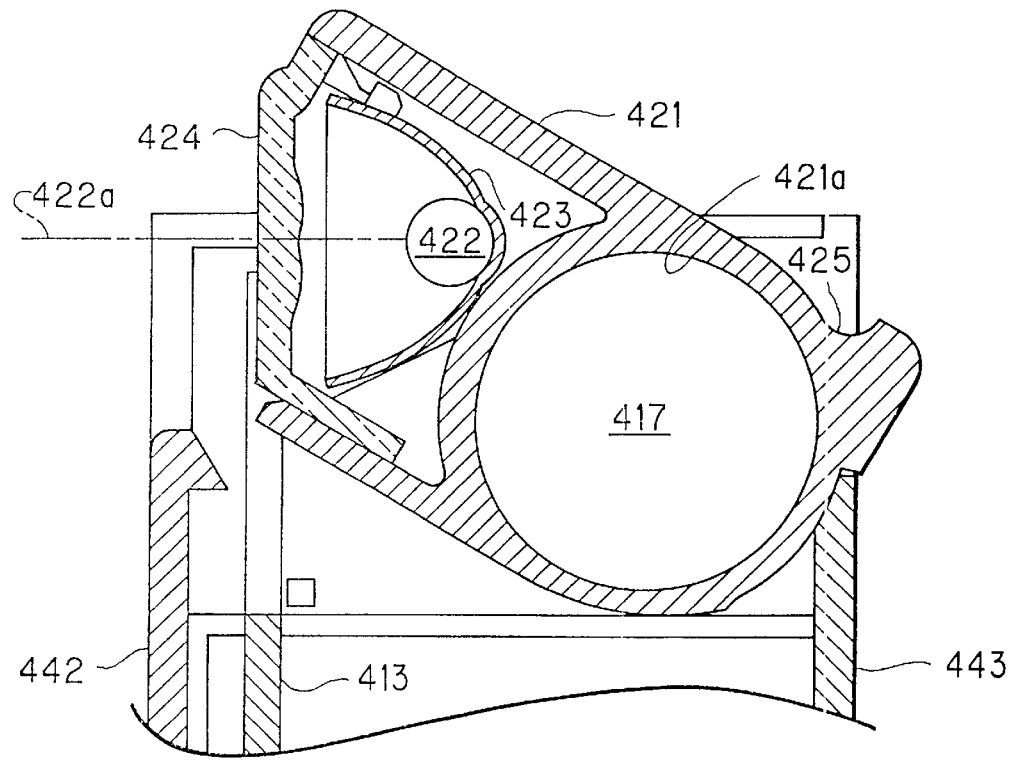

F I G. 32
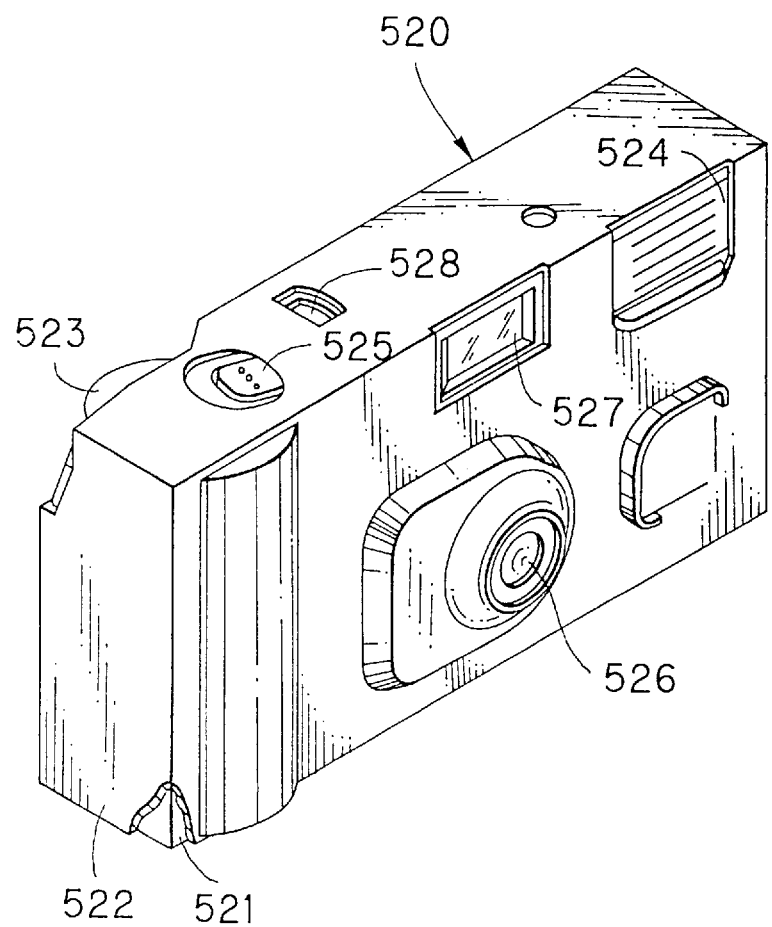

F I G. 35
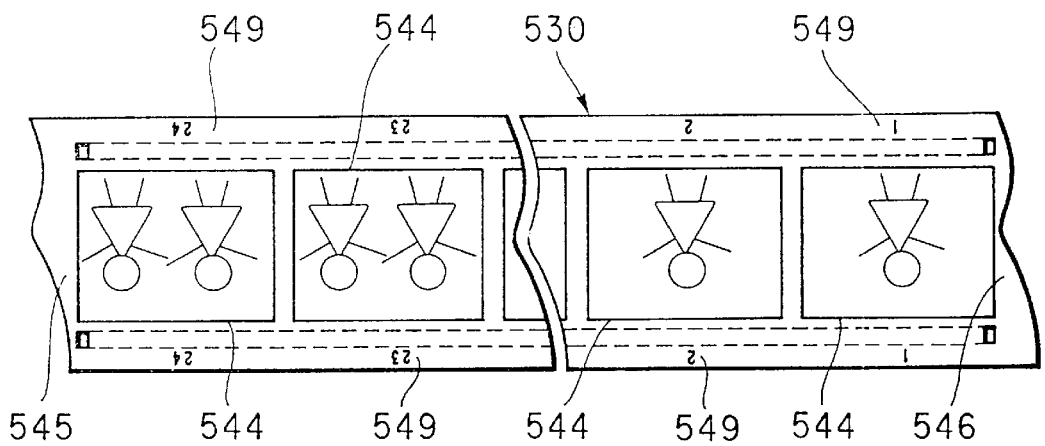
F I G. 36
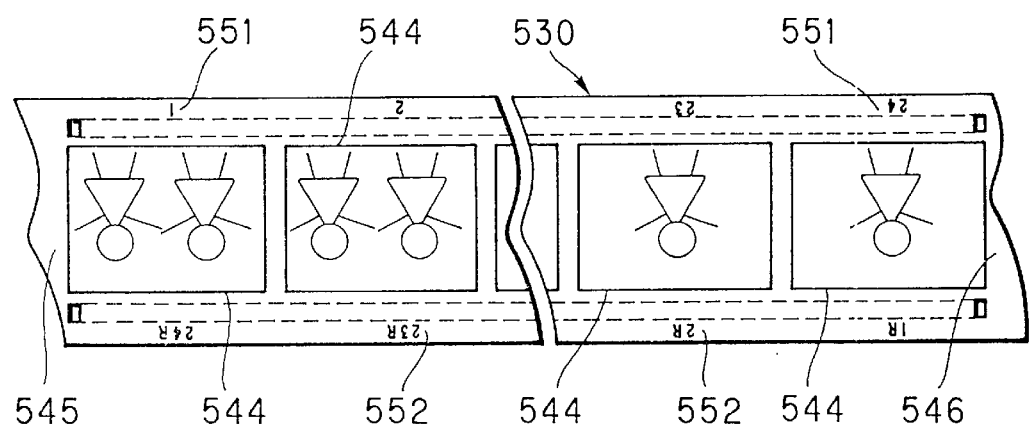
F I G. 37
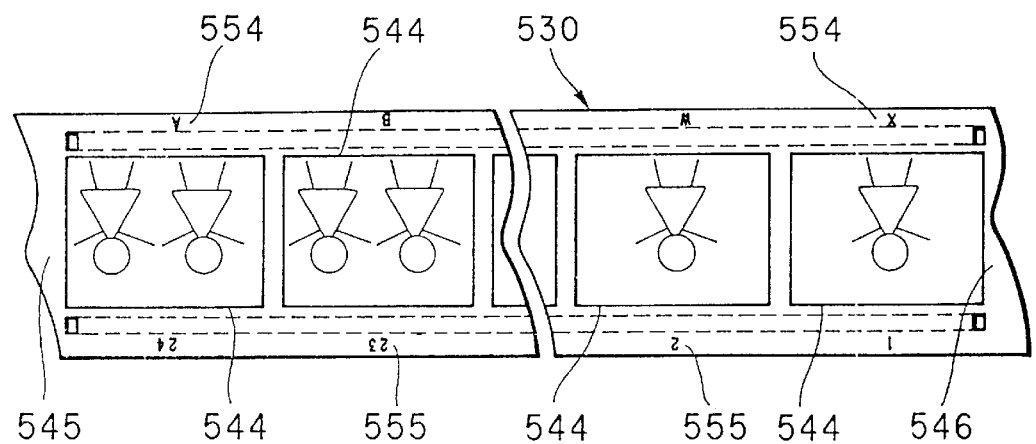

LENS-FITTED PHOTO FILM UNIT AND ELECTRONIC FLASH DEVICE FOR USE THEREWITH

This application is a continuation of application Ser. No. 08/641,429, filed May 1, 1996, now abandoned, which is a division of Ser. No. 08/443,980, filed May 18, 1995 now abandoned.

BACKGROUND OF THE INVENTION

1. Field of the Invention

The present invention relates to a lens-fitted photo film unit and an electronic flash device for use therewith. More particularly, the present invention relates to a lens-fitted photo film unit in which an electronic flash device is improved in fashion consistent to structural simplification.

2. Description Related to the Prior Art

A lens-fitted photo film unit is commercially sold so that every one wishing to enjoy photography is enabled to take photographs. The photo film unit includes a film housing, which incorporates a simplified photograph-taking mechanism and pre-loaded with photo film. There are photo film units of various types provided with additional functions: including a model "FUJICOLOR QUICK SNAP FLASH" (trade name; manufactured by Fuji Photo Film Co., Ltd.) incorporating an electronic flash device.

The flash device includes a flash circuit, which, in general, has a main capacitor and a neon lamp connected to an end of the main capacitor. When the main capacitor is charged at a predetermined level of voltage, the neon lamp is driven to indicate the standby status of flash emission.

Instead of a neon lamp, it is known in the art to use a light-emitting diode (LED), which is connected within flash circuits illustrated in FIGS. 40 and 41. The LED is less costly than a neon lamp, and can be advantageous for incorporation in the lens-fitted photo film unit in view of its low price.

FIG. 40 illustrates a conventional flash circuit, where a transistor 640 and a transformer 641 constitutes a self-starting blocking oscillator known in the field of electronic flashes. Through a primary winding 641*a*, a current on the primary side flows, and alternately increases and decreases. This causes a secondary winding 641*b* to generate an alternating current of high voltage. The alternating current is rectified by a diode 642, to charge a main capacitor 644. The three windings 641*a* to 641*c* of the transformer 641 come to have back electromotive force upon change from an increase to a decrease in the current of the primary side. A light-emitting diode (LED) 643 to indicate the standby of flash emission is connected to two ends of the tertiary winding 641*c*, so that the back electromotive force is applied to the LED 643 in its forward direction.

In the course of generating of the back electromotive force, the LED 643 is driven as the potential difference between its cathode and anode becomes greater. As illustrated in FIG. 42A, the blocking oscillator has low frequency in oscillation (as low as 1 kHz) at the start of the charging. The period of absence of the back electromotive force is long, while a period of generation of the back electromotive force is short. Even when the LED 643 is turned on electrically, it may not be visible. In accordance with increase in voltage of the main capacitor 644, the load to the secondary winding 641*b* is increased, to heighten the frequency of oscillation of the blocking oscillator. Therefore the interval of successive two times of light emission through the LED 643 becomes shorter and shorter. As a result, the LED 643 emits light quite faintly.

When the voltage across the main capacitor 644 comes to the predetermined level, intervals of the emission of the LED 643 are very short, that is, approximately 10 kHz. The emission appears consant and bright to human eyes, indicating standby. In the flash circuit of FIG. 40, the changes in frequency in the oscillation during the charging are utilized to change the light emission of the LED 643, and adapted to the timely indication for the flashing. FIG. 41 illustrates another conventional flash circuit, which is similar to that of FIG. 40.

In the flash circuit where the LED is driven with the back electromotive force, the faint emission of light from the LED occurs immediately upon the start of the charging of the main capacitor. This is a problem in that a user of the photo film unit may erroneously believe the camera has achieved standby status of the flashing before the main capacitor comes to have the predetermined level of voltage. As the light emitted from the LED is becoming gradually brighter, there is no conspicuous change even upon reaching the predetermined voltage in the main capacitor. It is nearly impossible to indicate the standby status opportunely to the user. Another problem lies in that the LED is caused to emit light in the short period of generation of the back electromotive force. Thus the LED does not emit highly bright light even while the main capacitor has the predetermined level of voltage.

Another problem lies in that part of a current which should come to the tertiary winding flows into a base of the transistor. The current which should flow through the tertiary winding is decreased, which influences the oscillating operation and lengthens time required for charging in unwanted fashion. It would be conceived that an additional resistor might be used for dividing part of voltage of charging the main capacitor, to apply the divided voltage to the LED, which would be driven in response to charging the main capacitor at the predetermined level. However this conception is quite undesirable because the main capacitor would be discharged by way of the resistor or the LED.

SUMMARY OF THE INVENTION

In view of the foregoing problems, an object of the present invention is to provide a lens-fitted photo film unit with an electronic flash device in which a light-emitting diode (LED) for standby indication can be utilized without affecting the voltage boosting or distinct status recognition.

Another object of the present invention is to provide a lens-fitted photo film unit with an electronic flash device having a reduced size.

A further object of the present invention is to provide a lens-fitted photo film unit with an electronic flash device conveniently recycled.

An additional object of the present invention is to provide a lens-fitted photo film unit with an electronic flash device with which "red eye phenomenon" can be prevented even with flash emission.

Still another object of the present invention is to provide a lens-fitted photo film unit with an electronic flash device of which a flash tube can be moved with a simplified structure.

Another object of the present invention is to provide a lens-fitted photo film unit having photo film on which, after exposures and development, a user can visually discern plural frames without errors in recognition.

In order to achieve the above and other objects and advantages of this invention, a flash circuit board includes an oscillator, connected to a power source, for converting a current thereof into a current of high voltage to be supplied to a main capacitor. The oscillator includes a transistor for oscillation. A primary winding is connected between the power source and a collector of the transistor. A secondary winding is combined in mutual induction with the primary winding, and is connected between the main capacitor and a base of the transistor. A tertiary winding is combined in mutual induction with the secondary winding, and is connected between the power source and the base of the transistor. A light-emitting diode is connected in parallel with the tertiary winding, has a cathode connected to one end of the tertiary winding with the power source, and is driven to emit light in response to charging of the main capacitor at a predetermined level.

In the present invention, the light-emitting diode (LED) can be utilized without any problem of affecting oscillation for the voltage boosting. The LED emits bright light distinctly recognized for standby indication.

In a preferred embodiment, a photo film has speed of ISO 800 or higher, to allow the main capacitor to have small capacitance adapted to the high speed of the photo film.

With the photo film having the speed of ISO 800 or higher, the main capacitor in the flash device has a minimum capacitance required in view of the film speed and the flash effective range as predetermined. It is possible without changing the flash effective range to reduce the size of the main capacitor in comparison with the counterpart adapted to the photo film unit with the ISO 400 film conventionally used. It is possible to reduce the size of the flash device, and thus the general size of the photo film unit. With the small main capacitor, the charging time of the flash device is advantageously shorted.

Further, a flash-emitting section includes a flash tube for generating flash light, a concave reflector disposed behind the flash tube for condensing the flash light from the flash tube toward a front, and a transparent protector disposed in front of the flash tube for covering the flash tube. The flash device includes a flasher/capacitor unit constituted by the flash-emitting section and the main capacitor in unification. A securing portion is disposed for securing the flasher/capacitor unit to the flash circuit board in detachable fashion. A connecting portion is disposed for electrically connecting the flasher/capacitor unit to the flash circuit board while secured with the flasher/capacitor unit by the securing portion.

The flash-emitting section and the main capacitor, which are not conductive to reuse due to a high defect percentage, are unified as a flasher/capacitor unit, which is separably associated with the printed circuit board both electrically and mechanically. It is therefore easy to separate the flasher/capacitor unit from the printed circuit board. The flasher/capacitor unit and the printed circuit board can be inspected separately from one another. Methods of inspecting those different components can be designed optimally for each of the components. The speed of the inspection can be raised to shorten the inspecting time in the course of recycling operation. If the flasher/capacitor unit is found defective, another new unit can be applied instead, to render the recycling efficient for the flash device. Another advantage of the flasher/capacitor unit is high manufacturing device productivity. The flasher/capacitor unit may be assembled in a manual assembly line. The board unit inclusive of the printed circuit board is assembled in an automated assembling line, different from that for the flasher/capacitor unit. It is simple and efficient to combine the flasher/capacitor unit and the printed circuit board, produced separately from each other.

In another preferred embodiment, the flash-emitting section is mounted on a film housing in such a movable fashion that $d \geq r$ while the flash-emitting section is used, and that $d < r$ while the flash-emitting section is unused, where d is a distance between a center of the flash-emitting section and an optical axis of the taking lens, and r is a radius of a virtual circle having a center located on the optical axis of the taking lens, and meeting a condition:

$$GN<1/[0.37-\{0.73\cdot\tan^{-1}(r/400)\}/2.50°]$$

where GN is a guide number of the flash device.

The flash-emitting section is mounted so movably that the center of the flash-emitting section is located in the virtual circle in the standard photography, and located outside the virtual circle in the flash photography, wherein the virtual circle represents the range which is defined around the optical axis of the taking lens and in which red eye phenomenon may occur. It is possible to prevent of red eye phenomenon in flash photography, and to give the photo film unit a portable shape in the standard photography without use of the flash device.

In a variant of embodiment, the flash-emitting section is mounted rotatably on the main capacitor.

The flash-emitting section is directly mounted on the cylindrical main capacitor, about which it can be swung. No complicated member is required for moving the flash-emitting section. The flash device can be constructed compactly and at low cost. In contrast, there is a disclosure JP-A (Japanese Patent Laid-open Publication No.) 6-43535 corresponding to U.S. patent application Ser. No. 859,993, in which a movable flash-emitting section is suggested. This has problems in that complicated members are required for moving the flash-emitting section. The flash device cannot be reduced in size, and must be costly. There are also difficulties in handling during assembly. In the present invention, the flash-emitting section consists of unification of the flash tube, the concave reflector, and the diffusing plate, and is mounted on the main capacitor to constitute the flash device with the printed circuit board. It is easy to handle the simplified flash device during assembly. The flash-emitting section is movable between the contained position where it is contained in the film housing and a flashing position where it projects outside the film housing. It is possible to position the optical axis of the flash light away from the optical axis of the taking lens, for effectiveness of avoiding occurrence of red eye phenomena.

Furthermore, a lens-fitted photo film unit includes a cassette pre-contained in the film housing to the right of the taking lens as viewed from a rear of the film housing. The photo film is pre-drawn out of the cassette, wound as a roll, and contained to the left of the taking lens as viewed from the rear. A winding mechanism is mounted on the film housing, associated with a trailer of the photo film, and operated after each exposure, for winding a frame of the photo film into the cassette. A first series of edge numbers, recorded on the photo film as latent images, is located in at least one of the upper and lower margins of the photo film defined with reference to a width direction thereof and outside effective frame areas, formed at a pitch of the frame, and oriented upside down to orientation of the film housing.

The photo film unit has the photo film on which the edge numbers has vertical orientation equal to images recorded on the effective frame areas. It is thus possible for a customer to designate images without error in reading the edge numbers.

BRIEF DESCRIPTION OF THE DRAWINGS

The above objects and advantages of the present invention will become more apparent from the following detailed description when read in connection with the accompanying drawings, in which:

FIG. 4 is a graph illustrating a result of measuring a voltage of a main capacitor and charging time;

FIG. 7 is a perspective view illustrating another preferred lens-fitted photo film unit;

FIG. 10 is a graph illustrating a relationship between an object distance and a diameter of circles of confusion;

FIGS. 11A and 11B are explanatory views, in perspective, illustrating another photo film unit with a stop-down lever;

FIGS. 16 to 18 are still other preferred flash devices;

FIG. 19 is a schematic diagram illustrating circuitry of the flash device of FIG. 18;

FIG. 20 is a perspective view illustrating a further preferred lens-fitted photo film unit;

FIG. 21 is an exploded perspective view illustrating the photo film unit of FIG. 20;

FIGS. 27A and 27B are explanatory views, in elevations, illustrating still another preferred photo film unit in which a flash device is swingable about a top edge of the film housing;

FIGS. 27C and 27D are explanatory views, in elevations, illustrating a variant photo film unit partly similar to that of FIGS. 27A and 27B;

FIG. 28 is a perspective view illustrating an additional preferred lens-fitted photo film unit;

FIGS. 31A and 31B are explanatory views, in cross sections, illustrating swung positions of a flash-emitting section;

FIG. 32 is a perspective view illustrating still another preferred lens-fitted photo film unit;

FIGS. 35 to 39 are explanatory views illustrating variants of photo films pre-contained in a photo film unit;

DETAILED DESCRIPTION OF THE PREFERRED EMBODIMENT(S) OF THE PRESENT INVENTION

Figure 1:
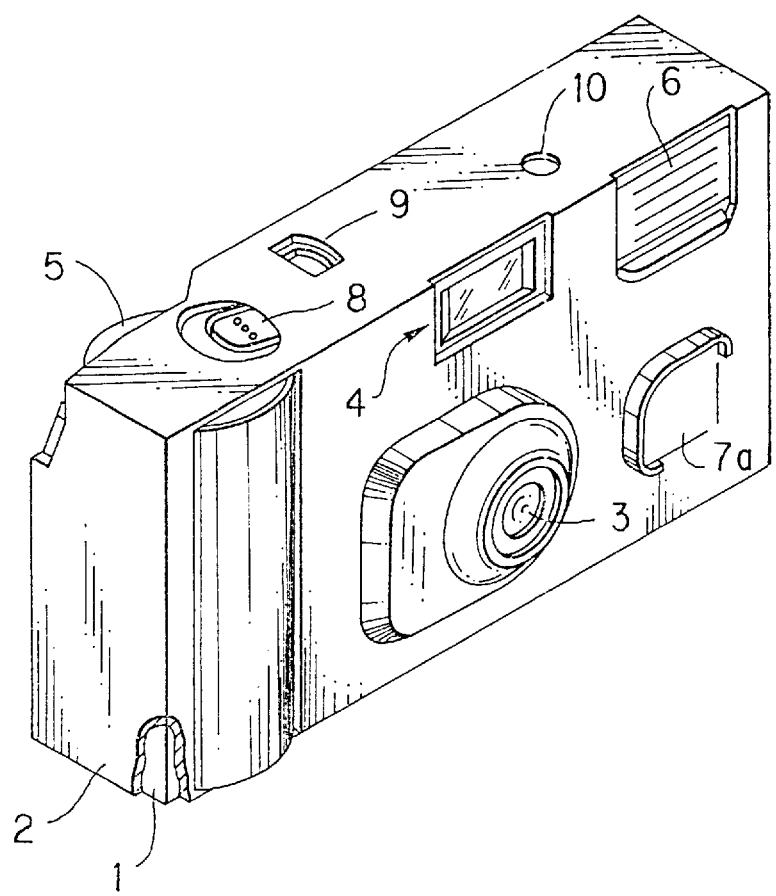
FIG. 1 is a perspective view illustrating a lens-fitted photo film unit.

In FIG. 1, a lens-fitted photo film unit with an electronic flash device is constituted by a photo film housing 1, which includes a photograph-taking mechanism of a simple structure and pre-contains photo film. Generally the film housing 1 is covered in a cardboard wrapper 2. The cardboard wrapper 2 has openings through which taking lens 3, a viewfinder 4, a film winding wheel 5 and the like appear externally. The film housing 1 as covered in the cardboard wrapper 2 can be operated for photography.

In the center of the front of the film housing 1, the taking lens 3 is disposed. The viewfinder 4 is located above the taking lens 3. A flash-emitting section 6 is located to the right of the viewfinder 4. Under the flash-emitting section 6, there is disposed a push button 7a for turning on/off a flash charging switch 7 (See FIG. 2). In the top face of the photo film unit, there are a shutter button 8, a counter window 9 for indicating the number of remaining photographable frames of the film, and an indicator window 10 for recognition of the full flash charging.

Figure 2:
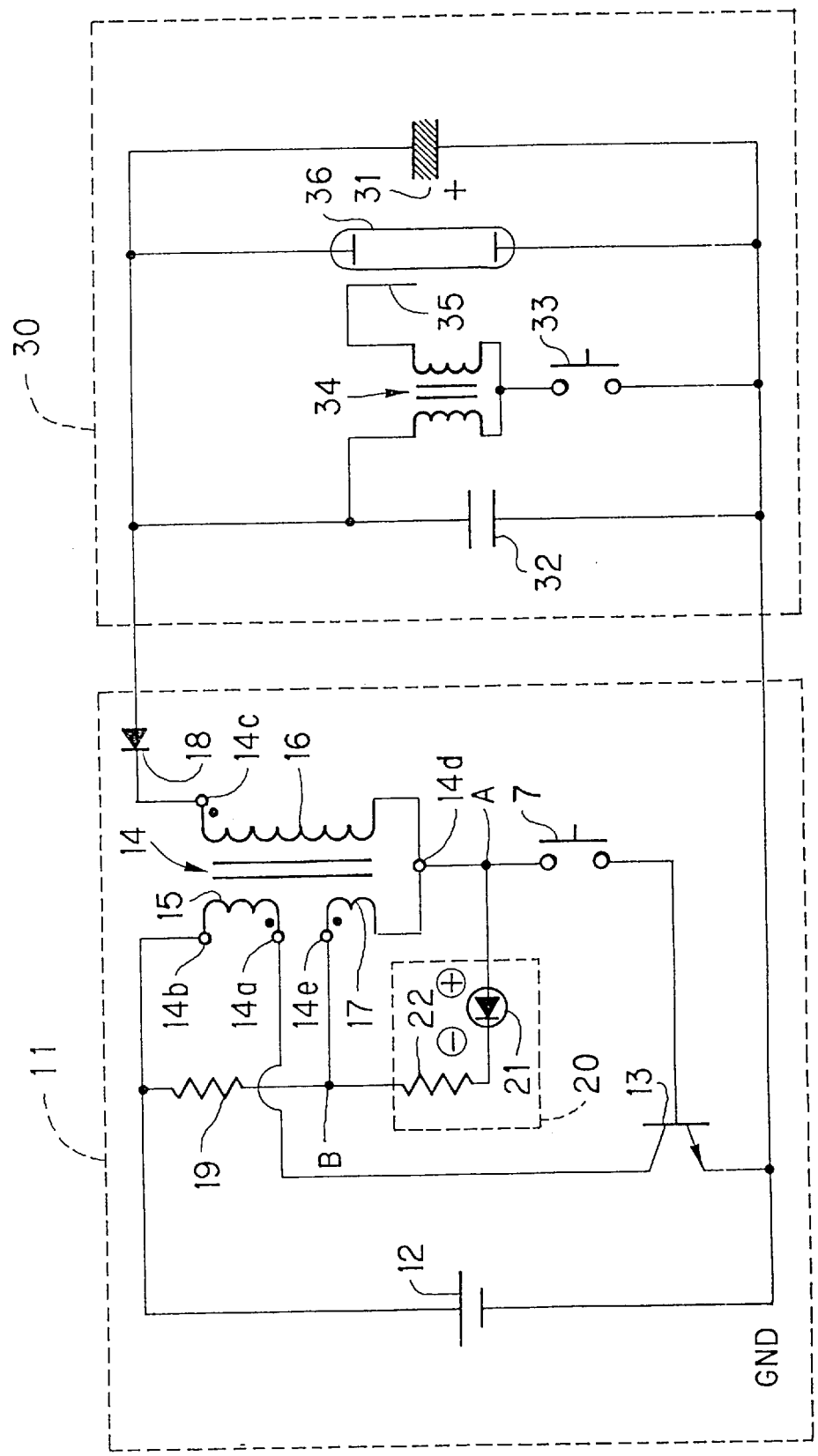
FIG. 2 is a schematic diagram illustrating circuitry of an electronic flash device incorporated in the photo film unit of FIG. 1.

The flash circuit is illustrated in FIG. 2. A booster 11 has a dry battery 12, a transistor 13 for oscillation, a transformer 14 for oscillation, the flash charging switch 7, and a diode 18 as a rectifier. The battery 12 is a power source of the flash circuit, and has electromotive force of 1.5 V. The booster 11 also includes a charge indicator 20 for signaling termination of charging the flash device. The transistor 13 and the oscillating transformer 14 in combination constitute a self-starting blocking oscillator for converting a direct current of low voltage into current of high voltage.

The oscillating transformer 14 is constituted of a primary winding 15, a secondary winding 16 and a tertiary winding 17 combined in mutual induction. In the oscillating transformer 14, two ends of the primary winding 15 are a first terminal 14a and a second terminal 14b. One end of the secondary winding 16 is a fifth terminal 14c. The other end of the secondary winding 16 is a fourth terminal 14d, which is common with one end of the tertiary winding 17. The other end of the tertiary winding 17 is a third terminal 14e.

The second terminal 14b of the primary winding 15 is connected to a positive terminal of the battery 12. To the first terminal 14a, a collector of the transistor 13 is connected. The third terminal 14e of the tertiary winding 17 is connected to the positive terminal of the battery 12 via a resistor 19. The fourth terminal 14d is connected to the base of the transistor 13 via the flash charging switch 7.

The emitter of the transistor 13 is connected to a negative terminal of the battery 12, is grounded and is connected to a positive side of a flash discharging section 30, in other words, to a positive terminal of a main capacitor 31. The fifth terminal 14c of the secondary winding 16 is connected to the cathode of the rectifier diode 18, of which the anode is connected to the negative side of the flash discharge section 30, in other words, to the negative terminal of the main capacitor 31.

When the flash charging switch 7 is turned on, the base of the transistor 13 is provided with base voltage via the resistor 19 and the tertiary winding 17. A base current flows to the base to cause the transistor 13 to operate. Oscillation is started by increase of the base current in positive feedback from the oscillating transformer 14. In course of the oscillation at the transistor 13, high voltage is generated in the secondary winding 16 in proportion to the number of turns of the primary winding 15 and the secondary winding 16. The flash discharge section 30 is supplied with only a current on the secondary side flowing via the rectifier diode 18, from the fifth terminal 14c toward the fourth terminal 14d. When the collector current (the current on the primary side), is saturated to generate the back electromotive force in the oscillating transformer 14, the rectifier diode 18 prevents current flow in a direction from the fourth terminal 14d toward the fifth terminal 14c.

In the charge indicator 20, the cathode of a light-emitting diode (LED) 21 is connected to the third terminal 14e via a resistor 22. Its anode is connected to the fourth terminal 14d. The LED 21 is a type of GaP emitting red light, and has such a characteristic that it emits light in response to application of forwardly directed voltage VF of 1.8 V. The voltage VF is hereinafter called a rise voltage. The resistor 22 is adapted to adjustment of magnitude of a current flowing the LED 21, and has resistance R from 10 to 22Ω.

The LED 21 is driven by the potential difference between the connecting points A and B, of which the point A connects the anode to the fourth terminal 14d and the point B connects the resistor 22 to the third terminal 14e. Let the emitter of the transistor 13 have the reference potential (zero volts, or ground). While there is no back electromotive force at the oscillating transformer 14, the potential Va of the point A is unchanged. According to the increase in voltage at which the main capacitor 31 is charged, the electromotive force of the tertiary winding 17 is decreased, to lower the potential Vb of the point B. Before the main capacitor 31 comes to have a predetermined voltage of charging, the LED 21 does not emit light, because the potential difference (Va−Vb), which is a difference in potential between the points A and B, is either too small or voltage in a direction reverse to the LED 21. When the main capacitor 31 is provided with at least the predetermined voltage of charging, the LED 21 responds to application of forwardly directed voltage of at least a rise voltage VF, to emit light to indicate stand by made for flash, unless there is back electromotive force.

With the LED 21 connected, the oscillating operation does not receive any influence, because the LED 21 never emits light in response to turning on of the flash charging switch 7, and because the current flowing forward across the LED 21 is never supplied to the transistor 13. The LED 21 is disposed inside the indicator window 10, and can be visually checked for existence of luminance.

Note that the LED 21 does not emit light while there is back electromotive force in the oscillating transformer 14. The main capacitor 31 having been charged with at least the predetermined voltage, the LED 21 is caused to emit light continually with interruptions. However, the interruptions due to the back electromotive force are so short that the LED 21 appears to emit light continuously to the unaided eye.

The flash discharge section 30 consists of the main capacitor 31, a trigger capacitor 32, a synchro switch or trigger switch 33, a trigger transformer 34, a trigger electrode 35, an electronic flash tube 36, and the like. The current on the secondary side is rectified within the booster 11, supplied to the flash discharge section 30, and charged in the main capacitor 31 and the trigger capacitor 32. The synchro switch or trigger switch 33 is turned on as soon as the shutter blade is fully opened, to discharge the trigger capacitor 32. A current generated from the trigger capacitor 32 flows into the primary side of the trigger transformer 34, so that high voltage is applied to the trigger electrode 35 connected to the secondary side of the trigger transformer 34. The application of the high voltage to the trigger electrode 35 ionizes the xenon gas enclosed in the flash tube 36, releases its positive and negative electrodes from insulation, and discharges the main capacitor 31 which causes the flash tube 36 to emit light. In the photo film unit, the minimum level of the voltage of charging of the main capacitor 31 is determined as 270 V in view of appropriate flash photography. Preferred flashing is enabled at the voltage of charging of 290 V or more.

Operation of the above flash circuit is described now. The user manually rotates the winding wheel 5 of the photo film unit, and charges the shutter to stand by for an exposure. When the flashing operation is required, the push button 7a is depressed to turn on the flash charging switch 7. The flash charging switch 7 is held depressed until the LED 21 in the indicator window 10 starts emitting light to be recognized by the user.

When the flash charging switch 7 is turned on, a base current flows at the transistor 13 by cooperation of the resistor 19 and the tertiary winding 17, so that the transistor 13 starts operation. A current starts flowing along the tertiary winding 17, to generate electromotive force along the primary winding 15. In response to this, a current starts flowing in a direction from the second terminal 14b toward the first terminal 14a across the primary winding 15. The current on the primary side is the collector current of the transistor 13. The start of flow of the current on the primary side generates electromotive force along the secondary winding 16 at high voltage. A current starts flowing in a direction from the fifth terminal 14c toward the fourth terminal 14d across the secondary winding 16. The current on the secondary side flows into the base of the transistor 13, so that the collector current from the primary winding 15 increases further.

In the transistor 13, the base current is increased by the positive feedback of the transistor 13 and the oscillating transformer 14. The collector current of the transistor 13, namely the current on the primary side, is increased. When the transistor 13 is saturated, the collector current is saturated and becomes unchanged. Now that there is no change (increase) in the current on the primary side, back electromotive force is generated along the windings 15 to 17 of the oscillating transformer 14. The back electromotive force causes the potential Va of the base of the transistor 13 to decrease abruptly, so that the potential Va becomes lower than potential of the emitter. Responsively the base current of the transistor 13 is abruptly decreased to zero. Then no collector current (on the primary side) flows.

The back electromotive force from the oscillating transformer 14 becomes zero. The potential of the base of the transistor 13 becomes higher than that of the emitter. Responsively a base current flows again, to enable the transistor 13 of which the collector current flows. Similar operation of the transistor 13 and the oscillating transformer 14 in the positive feedback cause the collector current to increase from the second terminal 14b toward the first terminal 14a across the primary winding 15. Electromotive force is generated along the secondary winding 16. A current on the secondary side flows from the fifth terminal 14c toward the fourth terminal 14d. The oscillation continues in this manner.

The current on the secondary side flows from the fifth terminal 14c toward the fourth terminal 14d with the electromotive force of high voltage at the secondary winding 16. In the course of oscillation, the current on the secondary side is supplied to the flash discharge section 30, and charges the main capacitor 31 and the trigger capacitor 32. Even with the back electromotive force at the secondary winding 16, no current directed from the fourth terminal 14d toward the fifth terminal 14c is supplied to the flash discharge section 30 by virtue of the rectifier diode 18.

Figure 3A:
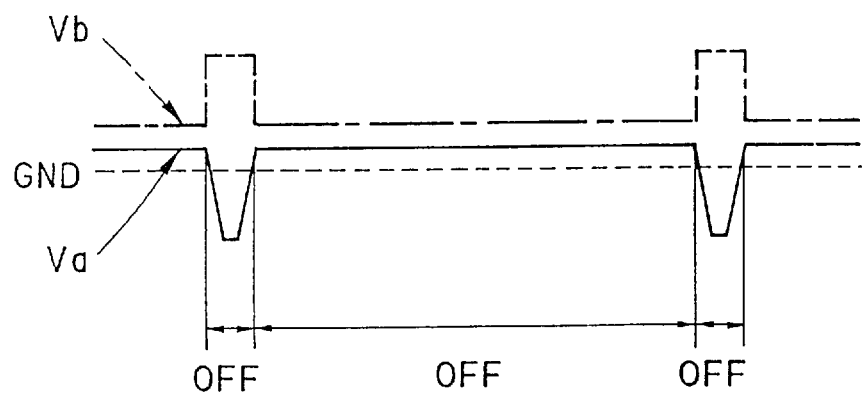
FIGS. 3A and 3B are graphs illustrating potential differences across a light-emitting diode and its periods of light emission.

With reference to the potential at the emitter of the transistor 13, the potential Va of the point A is unchanged while there is no back electromotive force at the oscillating transformer 14, and higher to the extent of the potential difference between the base and the emitter of the transistor 13, as illustrated in FIG. 3A. When the voltage of the main capacitor 31 is zero immediately after the start of the charging the main capacitor 31, the potential Vb is higher than the potential Va of the point A. There is a voltage directed in reverse to the LED 21, which, therefore, does not emit light as no current flows across it.

While the main capacitor 31 is being charged, the voltage between the terminals of the main capacitor 31 increases. In the present flash circuit as embodied actually, the main capacitor 31 is charged negatively. The positive terminal of the main capacitor 31 keeps the potential of zero volt, while the potential of its negative terminal is lowered. During the charging of the main capacitor 31, the potential of the cathode of the rectifier diode 18, namely of the fifth terminal 14c, is lowered. The current on secondary side under the electromotive force along the secondary winding 16 is decreased. As the secondary winding 16 is combined with the tertiary winding 17 in mutual induction, the decrease of the current on the secondary side lowers the electromotive force of the tertiary winding 17. The potential Vb of the point B at one end of the tertiary winding 17 is gradually lowered. When no back electromotive force takes place, the potential Vb of the point B becomes lower than the potential Va of the point A, to apply a forwardly directed voltage to the LED 21. However, before the main capacitor 31 comes to have the predetermined voltage of charging, the potential difference (Va−Vb) is so small that the LED 21 does not receive the rise voltage VF required for driving the LED 21. The LED 21 does not emit light.

Figure 3B:
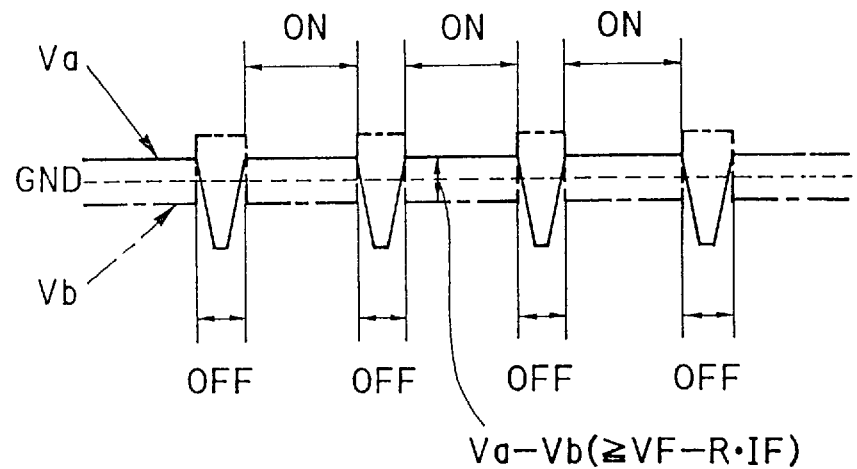

When the main capacitor 31 comes to have 270 V of the predetermined voltage of charging, (Va−Vb) becomes equal to or slightly higher than (VF−R·IF) unless the back electromotive force exists, as illustrated in FIG. 3B, where IF is magnitude of current flowing across the LED 21 and the resistor 22 when the forwardly directed voltage VF is applied to the LED 21. In other words, R·IF, at which the voltage in the resistor 22 is lowered, is subtracted from the potential difference (Va−Vb), to obtain a difference which is the rise voltage VF (=1.8 V) for the LED 21. The voltage is ready to be applied forwardly to the LED 21. Accordingly the LED 21 is driven.

The rise voltage VF, immediately after the main capacitor 31 has come to have the predetermined voltage, causes the current IF to have a magnitude between 1 and 10 mA through the LED 21, causing faint illumination.

In the further charging of the main capacitor 31, the voltage comes up nearly to 290 V. The potential Vb of the point B is further lowered. The potential difference (Va−Vb) rises. The voltage of 2.0 V or more is applied to forward bias the LED 21. The forward flowing current IF across the LED 21 comes up to 10 mA or more, so that LED 21 emits light constantly and brightly. Although the LED 21 does not emit light during existence of the back electromotive force, its existence is comparatively longer than its absence. The LED 21 blinks at high speed, because the oscillation has considerably high frequency while the main capacitor 31 has the predetermined voltage or higher. The light output of the LED 21 is adequate and stable, for a bright and distinct sign of light.

The user checks the light emission of the LED 21 through the indicator window 10, and releases the flash charging switch 7 from being depressed. After this release the oscillation is stopped to stop charging the main capacitor 31. Responsively, the LED 21 stops emitting light. The shutter button 8 is depressed. The shutter blade is driven. In response to its movement to the fully open position, the synchro switch or trigger switch 33 is turned on. The trigger capacitor 32 is discharged. High voltage is applied to the trigger electrode 35. Responsively the main capacitor 31 is discharged, to cause the flash tube 36 to emit illumination. Note that it is also possible to operate the shutter at the same time as the start of light emission of the LED 21 with the main capacitor 31 provided with the predetermined voltage of charging.

Figure 5A:
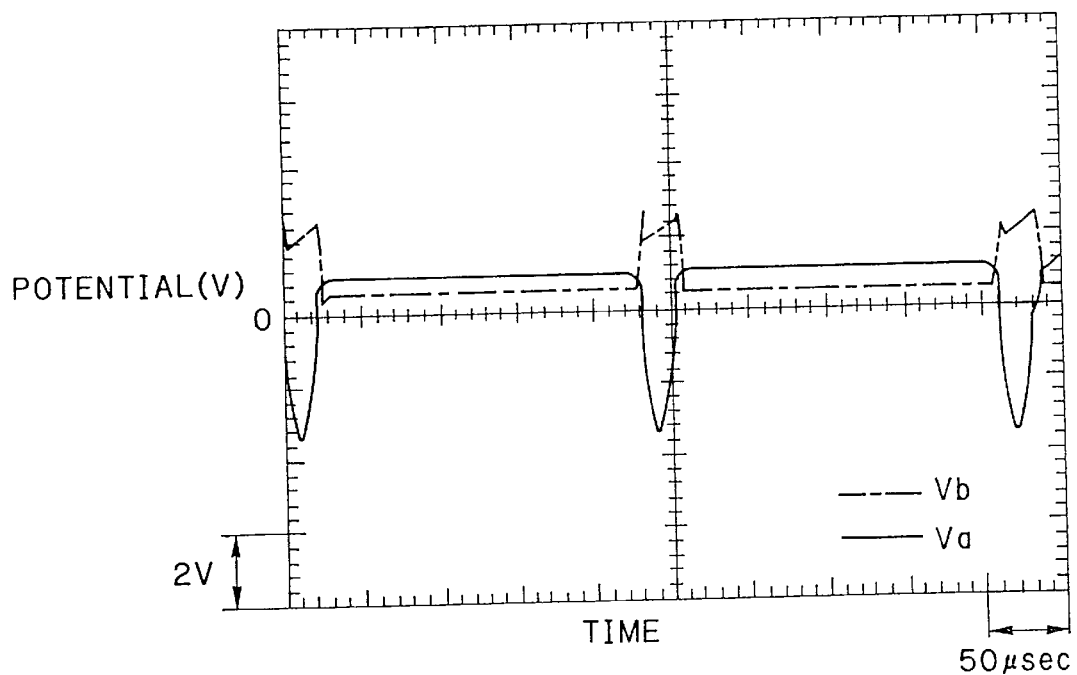
FIG. 5A and 5B are graphs illustrating results of measuring potential differences across the light-emitting diode.
Figure 5B:
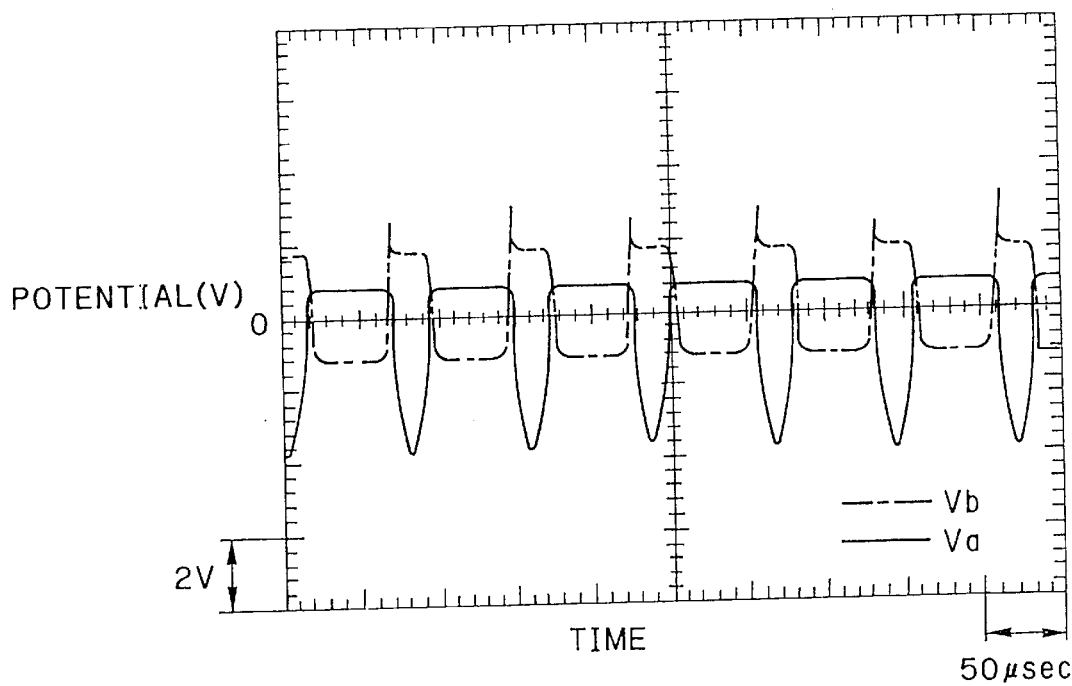

FIGS. 4, 5A and 5B are graphs illustrating results of measuring changes in the voltage of charging the main capacitor 31 and the potentials Va and Vb in the flash circuit. FIG. 4 shows a relationship between the voltage of the main capacitor 31 and the charging time. The flash charging switch 7 was turned on at the time T0. After the light emission at the LED 21, the flash charging switch 7 was turned off at the time T1. FIGS. 5A and 5B show changes in the potentials Va and Vb at the points A and B. FIG. 5A shows the change immediately after the start of charging. FIG. 5B shows the change during the charging of the main capacitor 31 at the voltage 290 V. Note that the experimental measurement approximated the actual operation of the flash device for exposure: prior to the experiment, the main capacitor 31 was charged provisionally; the flash device was driven to flash; and the main capacitor 31 was charged for the second time, and subjected to the measurement of the present experiment. In FIG. 4, the voltage of the main capacitor 31 was higher than zero volts. A waveform of the potential Vb in FIG. 5A was lower than the potential Va after the start of charging the main capacitor 31. In measuring the potentials of the points A and B, the potential (grounded as zero volts) of the emitter of the transistor 13 was referred to.

The LED 21 was of a GaP type, and had a rise voltage VF of 1.8 V. The main capacitor 31 had a static capacitance of 90 μF. The dry battery 12 as power source had a voltage of 1.5 V, as it was initially unused. The oscillating transformer 14 had the proportion 11:240:2 in the number of turns of the primary winding 15, the secondary winding 16 and the tertiary winding 17.

As per measurement, the time required for the main capacitor 31 to have the voltage of 270 V (predetermined voltage), 290 V and 300 V, and the emission light amount (GN: guide number) of the flash tube 36 with the main capacitor 31 discharged, are obtained and shown in Table 1:

TABLE 1

| Voltage of charging | 270 V | 290 V | 300 V |
|---|---|---|---|
| Charging time | 2.5 sec | 3.1 sec | 3.5 sec |
| GN of flash device | 7.0 | 7.5 | 7.8 |

As shown in Table 1, the main capacitor 31 in the present flash circuit came to have the voltage of 270 V at the lapse of 2.5 seconds after turning on of the flash charging switch 7. The LED 21 started emitting faint light. At the lapse of 3.1 seconds after turning on of the flash charging switch 7, the main capacitor 31 came to have the voltage of 290 V. At the time of 290 V, the potential difference (Va −Vb) between the points A and B was 2.20 V, which caused the LED 21 to emit distinct light, no longer faint. The LED 21 remained turned off before the main capacitor 31 came to have the predetermined voltage. The faint emission of the LED 21 with at least the predetermined voltage was continued only for a short time, e.g. 0.6 second, and followed by the distinct emission, which enabled the user to discern the status of standing by for flashing.

Note that the rise voltage VF of the LED 21, the proportion of the numbers of the turns of the oscillating transformer 14, the resistance R of the resistor 22, and the capacitance and the predetermined voltage of the main capacitor 31 are not limited to those as embodied above, and can be changed as desired to accommodate the required illumination of the flash device, the voltage of the power source and the like.

Figure 6:
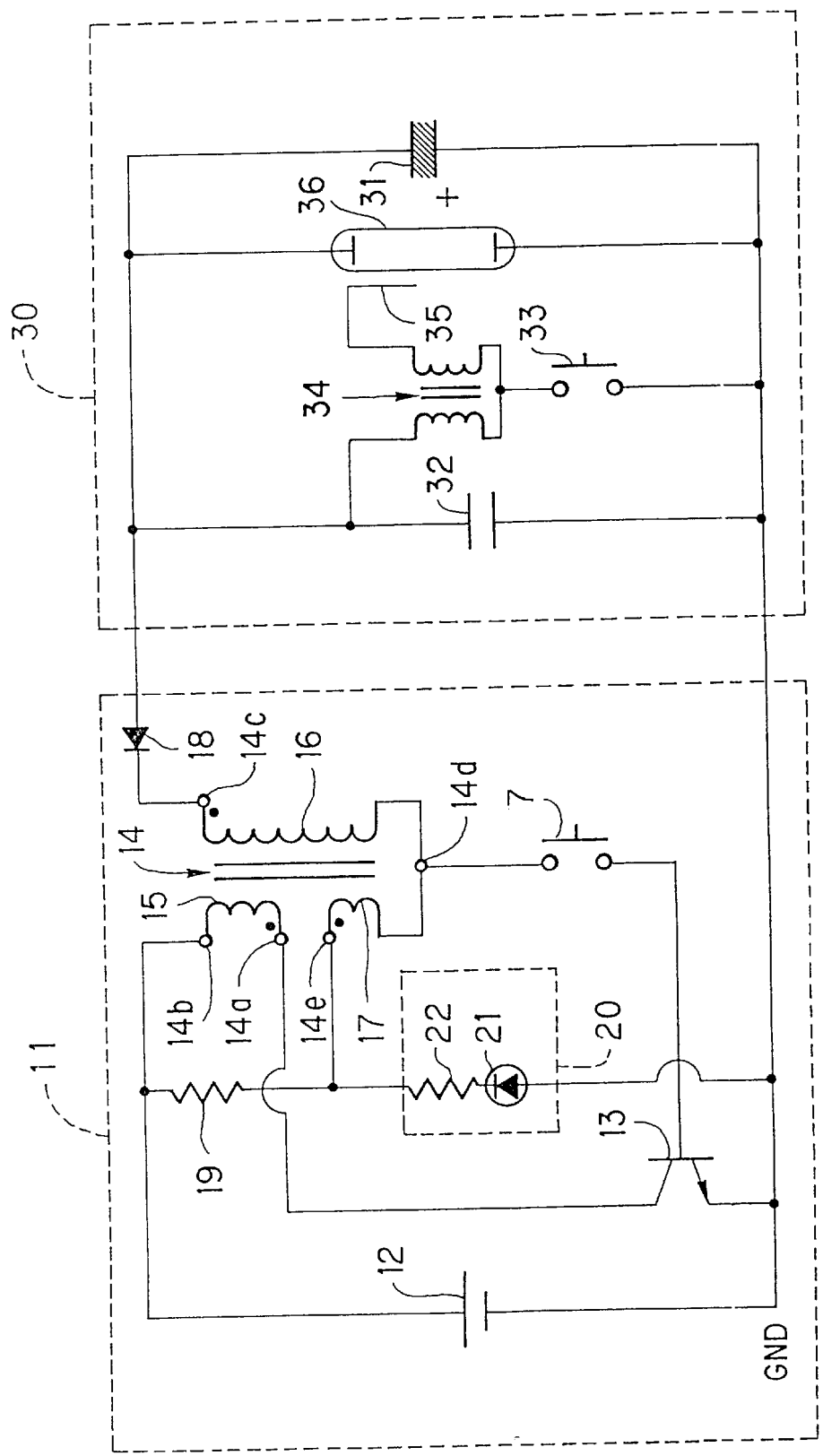
FIG. 6 is a schematic diagram illustrating other preferred circuitry of a flash device, in which an anode of the light-emitting diode is grounded.

In the above embodiment, the LED 21 is driven by the potential difference between the points A and B. It is alternatively possible to ground the anode of the LED 21 as illustrated in FIG. 6. Elements similar to those of the above embodiment are designated with identical reference numerals. In comparison with the above, the potential of the anode of the LED 21 is lower in correspondence with the potential difference between the emitter and the base of the transistor 13. The number of turns of the tertiary winding 17 or a rise voltage VF of the LED 21 is determined compatibly to the potential of the anode of the LED 21. When the main capacitor 31 comes to have the predetermined voltage, the LED 21 is caused to emit light. The present flash circuit is favorable in making it possible to reduce load to the LED 21, because a reverse directed voltage applied to the LED 21 can be reduced when back electromotive force takes place.

Other preferred embodiments are referred to now, in which the size of the flash device is reduced by changing the size of the main capacitor, as appropriate with reduction of the general size of the photo film unit.

In FIG. 7, a lens-fitted photo film unit 101 is constituted by a photo film housing 102, which includes a photograph-taking mechanism of a simple structure. Generally the film housing 102 is covered in a cardboard wrapper 103. In the center of the front of the film housing 102, a taking lens 104 is disposed. An objective window 105 of a viewfinder is located above the taking lens 104. A flash-emitting section 106 is located to the right of the objective window 105. Under the flash-emitting section 106, there is disposed a push button 107 for turning on/off a flash charging switch 128 (See FIG. 9). In the top face of the photo film unit, there are a shutter button 108, a counter window 109 for indicating the number of remaining photographable frames of photo film 123, and an indicator window 111 for a neon lamp 110 indicating the flash charging. The neon lamp 110 is driven when the main capacitor is charged fully, that is, to predetermined voltage. The rear face of the film housing 102 has a film winding wheel 112. The cardboard wrapper 103 has openings through which the taking lens 104, the objective window 105, the film winding wheel 112 and the like appear externally.

Figure 8:
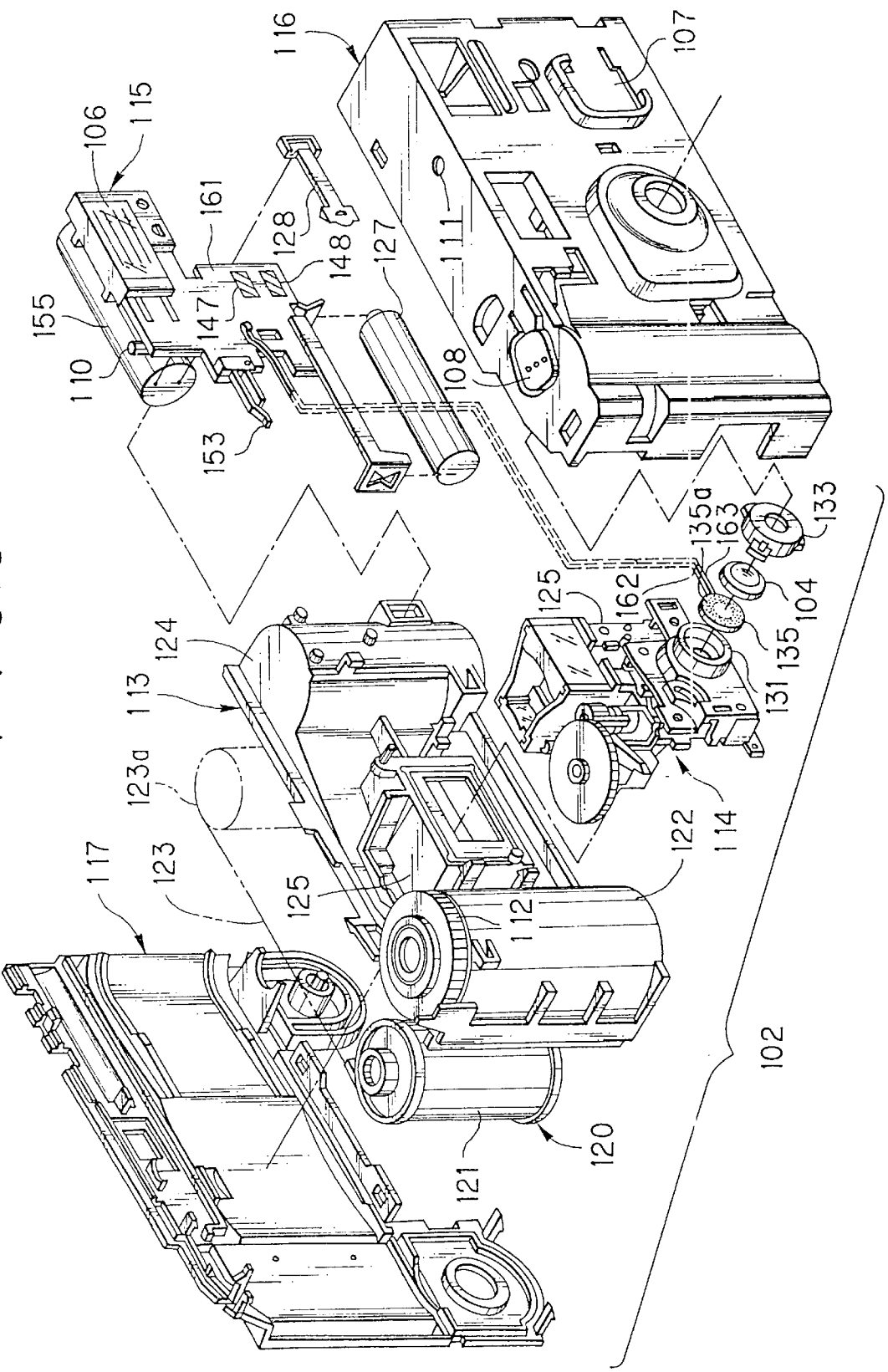
FIG. 8 is an exploded perspective view illustrating the photo film unit of FIG. 7.

The film housing 102, as illustrated in FIG. 8, includes a film containing section 113, a photograph-taking section 114, a flash device 115, a front cover 116, and a rear cover 117, all of which are retained together via engagement of hooks in removable fashion. The film containing section 113 has a cassette containing chamber 122, a film roll chamber 124, and an exposure chamber 125 between the cassette containing chamber 122 and the roll chamber 124. The cassette containing chamber 122 contains a cassette shell 121 of a photo film cassette 120. The roll chamber 124 contains a roll 123a of the photo film 123 pre-drawn out of the cassette shell 121. The photo film 123 has speed as high as ISO 800.

The cassette shell 121 and the roll 123a are contained respectively into the cassette containing chamber 122 and the roll chamber 124, before the rear cover 117 is fixed to the rear of the film containing section 113 via engagement of hooks. The cassette containing chamber 122, the roll chamber 124 and the exposure chamber 125 are closed in light-tight fashion. The photograph-taking section 114 and the flash device 115 are assembled to the front of the film containing section 113. A 1.5 V dry battery 127 of the UM-3 type and a segment of the flash charging switch 128 are mounted on the film containing section 113, before the front cover 116 is attached finally.

On the front of the photograph-taking section 114, a lens holder 131 is mounted to operate also for covering a shutter. The taking lens 104 is fixedly mounted on the photograph-taking section 114 by attachment of a lens cover 133. There is a liquid crystal display panel (LCD) 135 of a disk shape between the lens holder 131 and the taking lens 104 for regulating the aperture stop of the taking lens 104. The LCD 135 includes a transparent electrode shaped like a doughnut or ring, that is, defining a central hole. When a photographic subject is being taken in a normal photography, that is, with ambient light without being flashed, a doughnut portion 135a is turned opaque, to limit the aperture stop of the taking lens 104. For flash photography, regular voltage is applied to the electrode of the LCD 135, to turn the doughnut portion 135a transparent, so that the aperture stop of the taking lens 104 is fully open.

Figure 9:
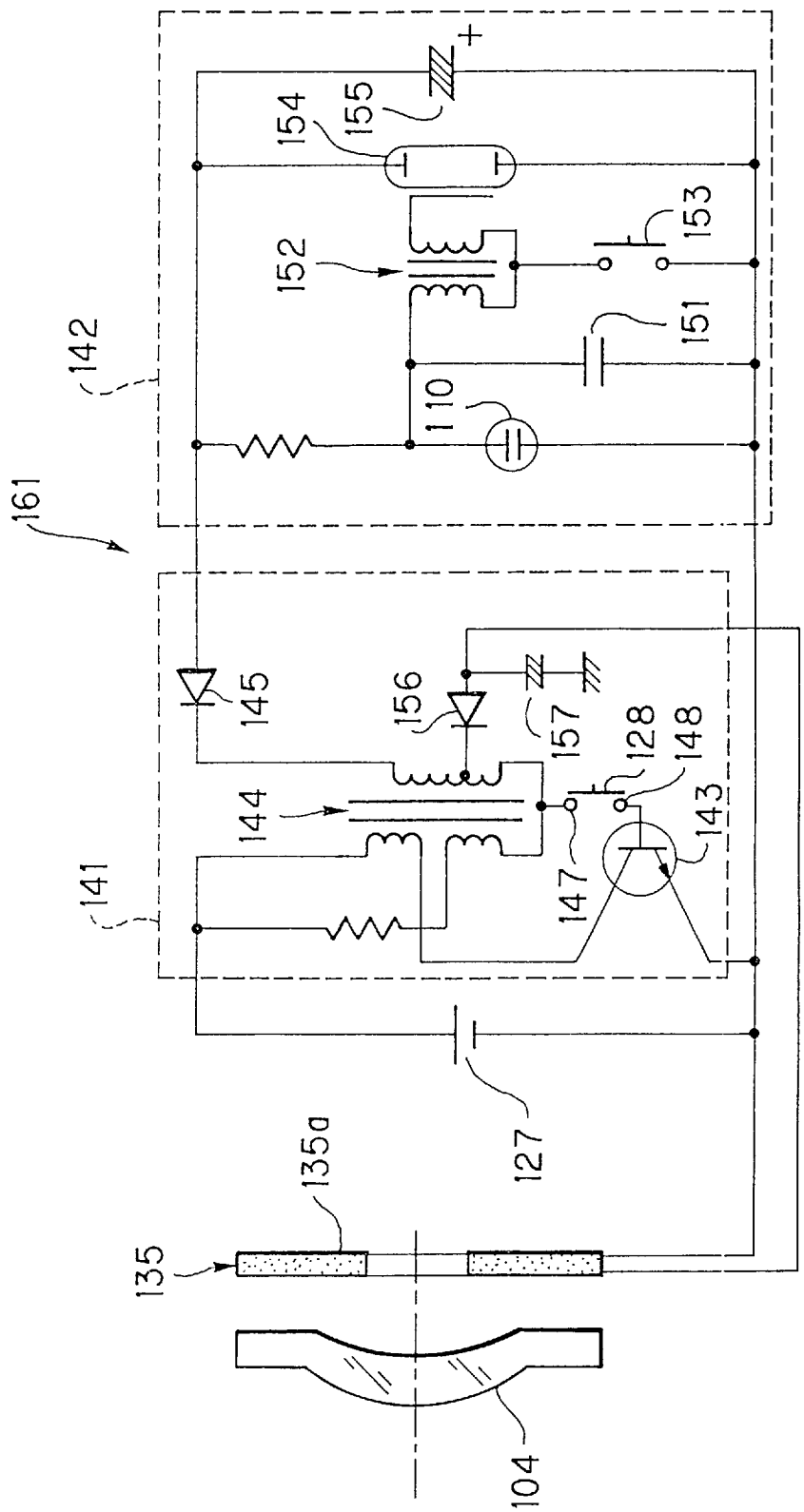
FIG. 9 is a schematic diagram illustrating circuitry of a flash device with a liquid crystal display panel.

The LCD 135 is connected to the flash circuit of the flash device 115, as illustrated in FIG. 9. The flash circuit includes a booster 141 and a flash discharge section 142. The booster 141 includes a blocking oscillator well-known in the field of electronic flash device. The blocking oscillator includes a transistor 143 for oscillation, the oscillating transformer 144, and a half-wave rectifier diode 145. With the push button 107 depressed, the flash charging switch 128 is pushed to short-circuit printed contact points 147 and 148. The transistor 143 is turned on. The oscillating transformer 144 is actuated, to supply the flash discharge section 142 with a current via the rectifier diode 145.

The flash discharge section 142 includes the neon lamp 110, a trigger capacitor 151, a trigger transformer 152, a synchro switch or trigger switch 153, an electronic flash tube 154, and a main capacitor 155. The trigger capacitor 151 and the main capacitor 155 are charged by a current from the booster 141. The neon lamp 110 emits light when the main capacitor 155 is charged to the predetermined level, for example 300 V.

There is a tap on the secondary winding of the oscillating transformer 144. A diode 156 and a capacitor 157 are connected at the tap, and constitute a power source for the LCD 135. When the main capacitor 155 is fully charged, the electrode of the LCD 135 receives application of regular voltage, to change the doughnut portion 135a from transparency to opacity. The LCD 135 and a printed circuit board 161 of the flash device 115 are connected respectively via leads 162 and 163.

In the present embodiment, the photo film 123 has high speed such as ISO 800. Let the photo film unit with the flash device 115 have a flash effective range and an exposure stop equally to a photo film unit containing an ISO 400 film. The flash device 115 and the main capacitor 155 can have preferable specifics as Table 2 below:

TABLE 2

| Speed of photo film | ISO 400 | ISO 800 |
| --- | --- | --- |
| GN of flash device | 1 | 0.7 |
| Capacitance of main capacitor | 1 | 0.5 |
| Diameter of main capacitor | 15 mm | 12 mm |

Note that the guide number of the flash device 115 and the static capacitance of the main capacitor 155 are proportional values relatively defined while the counterparts of the photo film unit of ISO 400 are defined as 1.

As is apparent from Table 2, the main capacitor 155 can have a smaller size than would used in a conventional manner, so that the flash device 115 can be reduced in size. It is also possible in view of the reduced capacitance to use the battery 127 of a type smaller than the UM-3 type. This also enables the photo film unit to be shaped in a still smaller size. The charging time can be shortened. The photo film unit can be operated to achieve stand-by mode quickly for flash photography.

The taking lens 104, for example, has a focal length of 30 mm, and a speed of 9 in f-number. The aperture stop is f:9 when all the LCD 135 is transparent, and f:14 when the doughnut portion 135a is turned opaque. As illustrated in FIG. 10, the diameter of the confusion circles are minimized when the object distance is 3 meters with the aperture stop f:9, and when the object distance is 20 meters with the aperture stop of f:14, in consideration of a shift of the focus in the stopping down. This makes it possible for the taking lens 104 to be focussed at a distance from 2 to 4 meters with the aperture stop f:9, and at a distance from 1 meter to the infinity with the aperture stop f:14. When the aperture stop is f:14, the quality of an image is raised by the effect of the stopping down.

To effect an exposure with flash, the push button 107 of the photo film unit 101 is depressed at first. The contact point 147 and 148 are short-circuited at the flash charging switch 128. The trigger capacitor 151 and the main capacitor 155 start charging. When the voltage of the main capacitor 155 comes to a predetermined level, the neon lamp 110 starts blinking. The LCD 135 becomes transparent, to open the exposure stop fully.

The taking lens 104 is directed toward an object as desired. The shutter button 108 is depressed, to open/close the shutter blade in the photograph-taking section 114. In synchronism with this, the synchro switch or trigger switch 153 is short-circuited. The electric charge in the trigger capacitor 151 flows along the primary side of the trigger transformer 152. High voltage generated on the secondary side of the trigger transformer 152 instantaneously lowers resistance in the flash tube 154. The charge in the main capacitor 155 is discharged through the flash tube 154, to emit flash light toward the object of nearly 3 meters for an adequate exposure.

In non-flash photography, lack of light at the neon lamp 110 is checked. The taking lens 104 is directed toward a photographic object without depressing the push button 107. Then the shutter button 108 is depressed. While there is no blinking of the neon lamp 110, the main capacitor 155 has only electrical charge lower than the predetermined level. The doughnut portion 135a of the LCD 135 remains opaque, to stop down the aperture stop to the f:14. It is possible in standard photography to photograph an image of a high quality, as objects from 1 meter to infinity are well in focus.

Note that, although the LCD 135 is driven upon the termination of charging the main capacitor 155, it is also possible to drive the LCD 135 at the same time as depression of the flash charging switch 128 to start charging.

In the above embodiment, the aperture stop is controlled by use of the LCD. Alternatively an electrochromic panel can be used. The electrochromic panel includes a glass plate and a membrane of substance disposed on the glass plate and changeable between a colored status and a colorless status in reaction to an electric current. Furthermore it is possible to dispose the LCD or the electrochromic panel on the rear of the taking lens.

In the above embodiment, the switch segment having resiliency is used. Only when the push button is depressed, the switch segment is deformed to charge the main capacitor. When the push button is released from being depressed, the main capacitor is not charged. This is advantageous in that the battery will never be used up as it does not require any operation of turning off the flash charging switch.

For successive exposures with flash, the push button might require consecutive depression. It is possible to modify the flash charging switch in a type latchable in both on- and off-positions. To avoid omission of turning off of the same flash charging switch, it is desirable to associate the popping up of the flash-emitting section with the turning on of the flash charging switch: the flash-emitting section can be preferably linked with the flash charging switch in such a manner that a manual operation of retracting the flash-emitting section turns off the flash charging switch.

Another preferred embodiment is referred to, in which the aperture stop is changed upon the start of charging the flash device. In FIGS. 11A and 11B, a flash-emitting section 170 is mounted in slidable fashion horizontally to a film housing 171. In standard photography, the flash-emitting section 170 has a position contained in the contour of the film housing 171. As illustrated in FIG. 11A, a stop-down lever 172 is inserted in a photographic light path L. A stop-down hole 172a causes the aperture stop to have the speed f:14.

For flash photography, the flash-emitting section 170 is slid in a direction projected from the contour of the film housing 171. The flash charging switch between a printed circuit board 173 and a switch segment 174 is turned on to start charging the flash device. A claw 175 disposed on a lateral face of the flash-emitting section 170 rotates the stop-down lever 172 clockwise against the bias of a spring 176, to retract the stop-down lever 172 from the photographic light path, as illustrated in FIG. 11B. The aperture stop, therefore, is changed to f:9.

Figure 12:
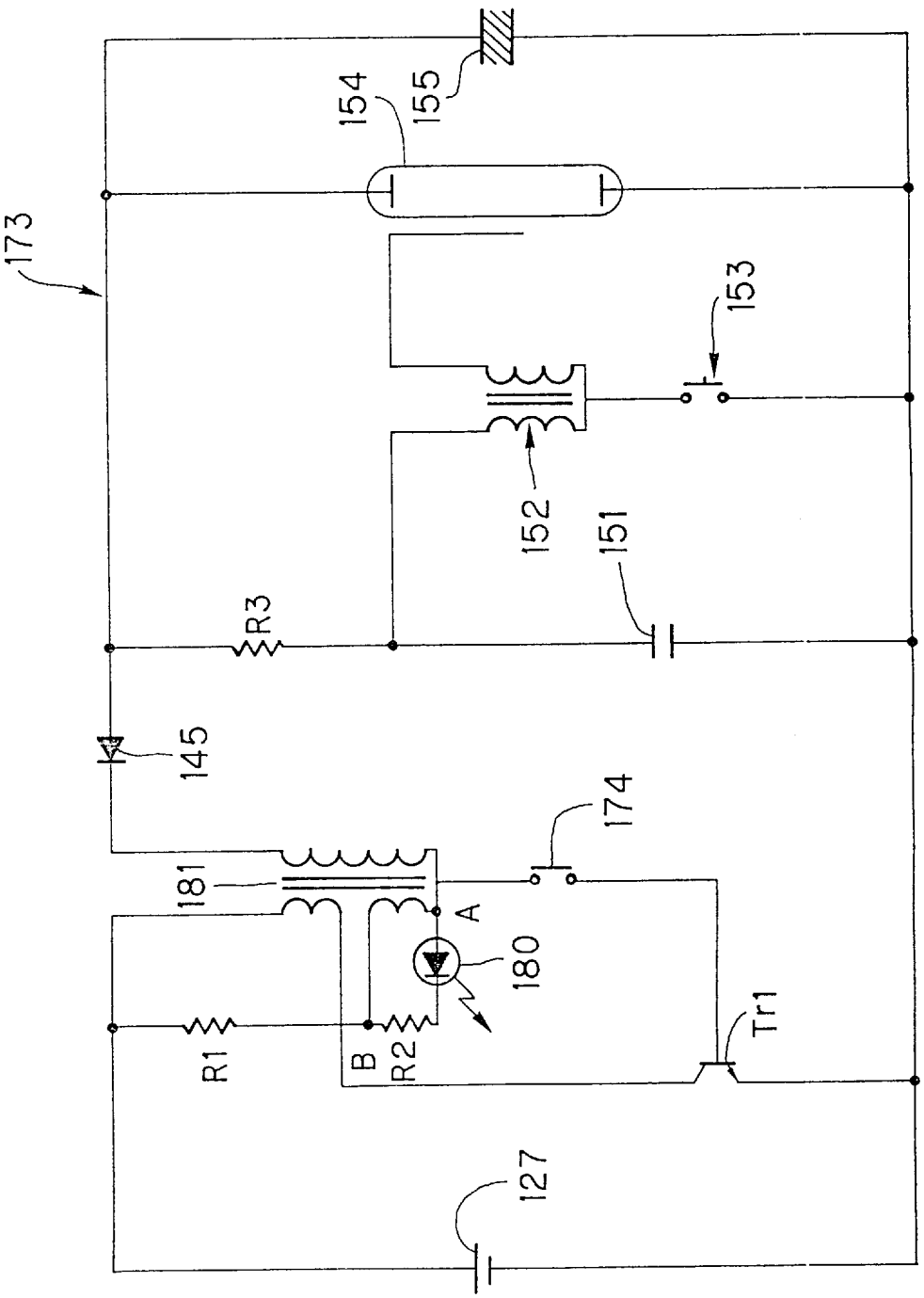
FIG. 12 is a schematic diagram illustrating circuitry of a flash device of the photo film unit of FIGS. 11A and 11B.
Figure 13A:
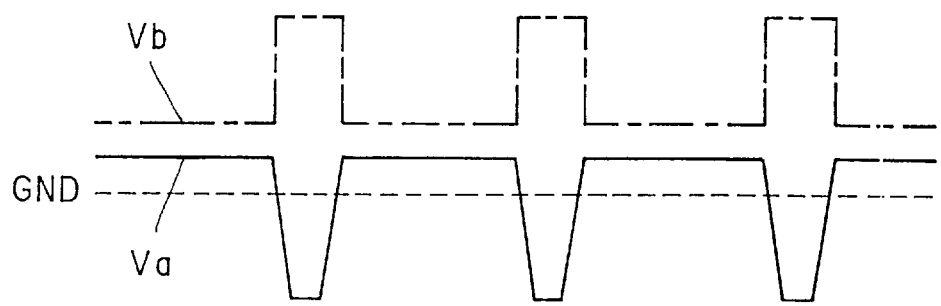
FIGS. 13A and 13B are graphs illustrating potential differences across a light-emitting diode and its periods of light emission.
Figure 13B:
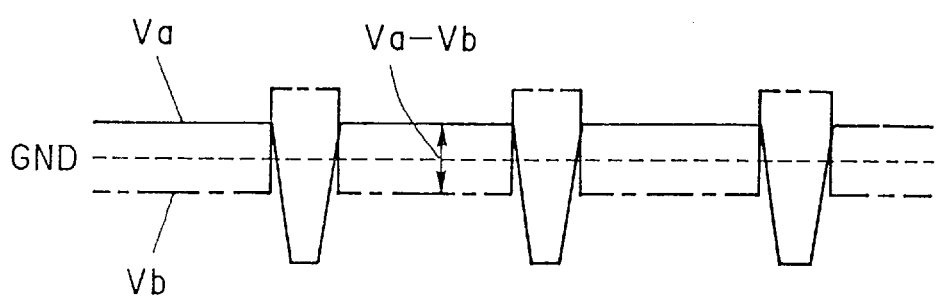

On a corner of the flash-emitting section 170, an LED 180 is disposed, and is controlled to emit light upon the termination of the charging. In FIG. 12 illustrating the flash circuit, the LED 180 is connected between the point A at the base of a transistor Tr1 and the point B at a resistor R1 for the primary winding. The LED 180 is connected in parallel with a resistor R2. As illustrated in FIG. 13A, the potential Vb of the point B is higher than the potential Va of the point A, so the LED 180 does not emit light. In course of charging, the potential Vb of the point B is gradually lowered, until the potential Vb of the point B becomes lower than the potential Va of the point A, as illustrated in FIG. 13B. When the main capacitor 155 comes to have substantially 270 V of the predetermined voltage of charging, (Va−Vb) becomes more than (VF+R2·IF), where IF is magnitude of a current flowing forward across the LED 180. The LED 180 starts emitting light. The current IF has an order of magnitude less than 10 mA through the LED 180, which has a small output and illuminates faintly. In the further charging of the main capacitor 155, the voltage comes up near to 300 V at the lapse of 0.6 second. The potential difference (Va−Vb) rises. The forwardly flowing current IF across the LED 180 comes up to 10 mA or more, so that the LED 180 emits light stably and distinctly. As constructed above, the LED 180 can signal the termination of the full charging clearly to a user, and can avoid failure in photography due to inappropriate exposure. Note that (Va—Vb) is the potential difference between the points A and B. VF is the forward directed voltage across the LED 180. R2 has resistance from 10 to 22ω.

In the present embodiment, the flash-emitting section is slidable. Alternatively it is possible to construct a flash charging switch in a slidable type, and to dispose the flash-emitting section in fixed fashion. It is preferred to associate a stop-down lever or member with the slide of the flash charging switch: the stop-down member, in response to the slide of the flash charging switch, can be moved into, or away from, the photographic light path, to change the aperture stop. It is possible additionally to incorporate a sensor for detecting low brightness to be photographed, and to automate the start of charging.

The present invention is of course applicable to photo film units having a taking lens at an f-number different from that of the above, or having a focal length different from that of the above. The speed of the photo film is as high as ISO 800, but may be even higher, for example ISO 1600. It is possible to determine the capacity of a main capacitor in adaptation with the even higher speed of the film. In the above embodiments, the aperture stop is constructed changeable. The present invention is also applicable to a photo film unit of which an aperture stop is fixed, with the ISO 800 film contained and a suitable main capacitor incorporated.

Other preferred embodiments are referred to, in which a photo film unit is provided with a flash device easy to be recycled with efficiency.

Figure 14:
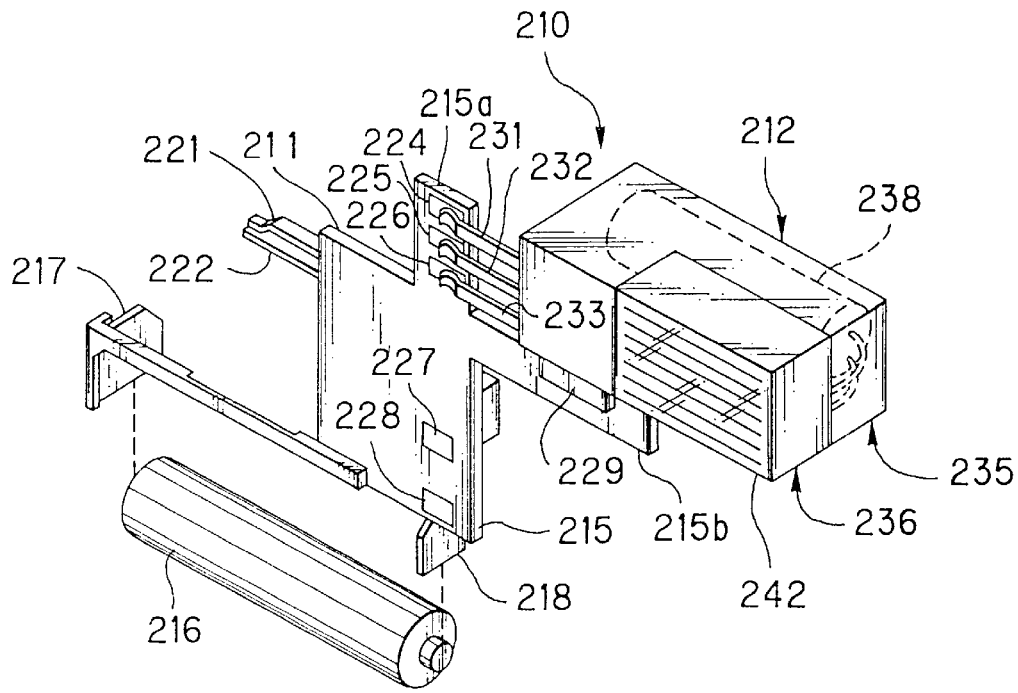
FIG. 14 is another preferred flash device with improvement for recycling.

In FIG. 14, a flash device 210 includes a board unit 211 a n d a flasher/capacitor unit 212. The board unit 211 consists of a printed circuit board 215 with a flash circuit of FIG. 15 mounted thereon. A bottom of the printed circuit board 215 has a battery holder with segments 217, 218 for holding a dry battery 216. A left edge of the printed circuit board 215 has synchro contact points 221 and 222, which are disposed in a rotational locus of a shutter blade and short-circuited by the shutter blade as rotated. A projected portion 215a on the top of the printed circuit board 215 has three printed contact points 224, 225 and 226. The printed circuit board 215 also has a projected portion 215b directed to the right. A front of the printed circuit board 215 has a pair of printed contact points 227 and 228, which are short-circuited for charging.

A bottom of the flasher/capacitor unit 212 has a pair of rails 229 which are formed integrally therewith, and sandwich the top of the projected portion 215b of the printed circuit board 215, to mount the flasher/capacitor unit 212 to the projected portion 215b. The flasher/capacitor unit 212 is slidable in the longitudinal direction of the projected portion 215b. With the flasher/capacitor unit 212 mounted on the projected portion 215b, contact segments 231, 232 and 233 are contacted on the contact points 224 to 226 of the printed circuit board 215 for electric connect ion.

Figure 15:
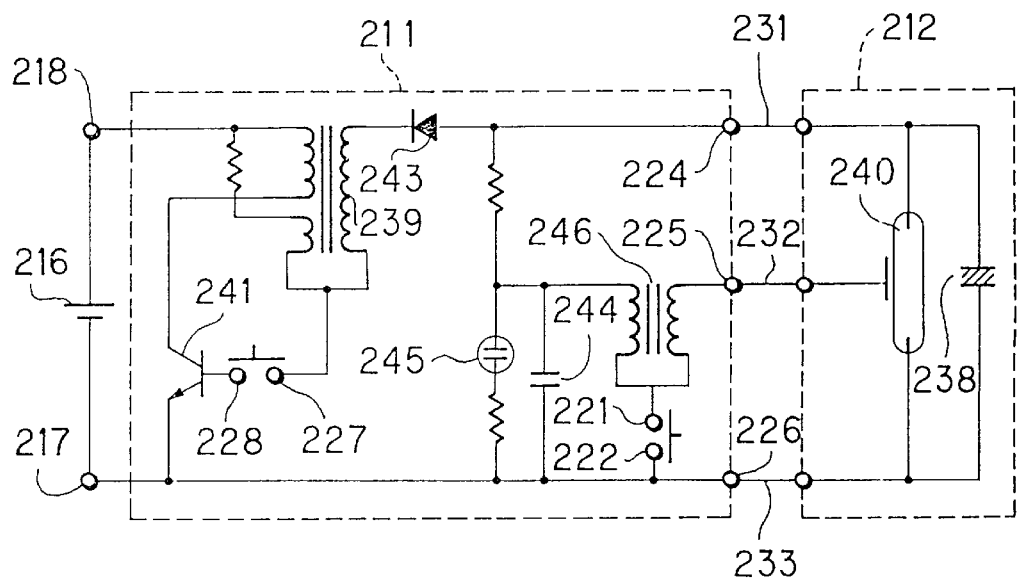
FIG. 15 is a schematic diagram illustrating circuitry of the flash device of FIG. 14.

The flasher/capacitor unit 212 includes a housing 235 and a flash-emitting section 236 mounted in its front corner. The flasher/capacitor housing 235 contains a main capacitor 238, and connected in parallel with a flash tube 240 of the flash-emitting section 236, as illustrated in FIG. 15. The flash-emitting section 236 includes a protector 242 of transparent plastics, the flash tube 240 and a known concave reflector, both of which are contained in the protector 242. A front wall of the protector 242 is a diffusing plate. The contact segments 231, 232 and 233 are mounted through a left w a ll of the flasher/capacitor housing 235. The contact segments 231 and 233 are respectively connected to electrodes of the main capacitor 238 and the flash tube 240 as illustrated in FIG. 15. The contact segment 232 is connected to a trigger terminal of the flash tube 240.

In FIG. 15 illustrating the flash circuit, the contact points 227 and 228 are short-circuited, so that the direct current from the battery 216 is converted into an alternating current and boosted in high voltage by an oscillating transistor 241 and an oscillating transformer 239. Then the alternating current is converted by a rectifier 243 into a direct current, which flows through the contact points 224 and 226 and the contact segments 231 and 233, and is applied to the main capacitor 238. When the main capacitor 238 and a trigger capacitor 244 are sufficiently charged, a small neon lamp 245 is driven to signal the termination of charging to a user. After the synchro contact points 221 and 222 are short-circuited, the charge stored in the trigger capacitor 244 is boosted by a trigger transformer 246, and applied to the trigger terminal of the flash tube 240 via the contact point 225 and the contact segment 232. Immediately a part of the xenon gas in the flash tube 240 is ionized to lower the resistance in the flash tube 240 instantaneously, to trigger th e flash emission of the flash tube 240.

In charging of the flash device 210, a current of nearly 40 mA flows through the contact segments 231 and 233 and the contact points 224 and 226. In flash emission, slight current or no current flows through them. In the flash emission, voltage of nearly 4 kV is applied to the contact segment 232 and the contact point 225, through which, however, slight current or no current flows. The connection by way of the contacts between the contact segments 231 to 233 and the contact points 224 to 226 is hardly involved with any problem of accidental disconnection, as the connection by way of the contacts is sufficient for the small current.

As described above, the flasher/capacitor unit 212 is movably mounted on the projected portion 215b of the printed circuit board 215. The contact segments 231 to 233 are connected to the contact points 224 to 226 by way of the contact, neither undetachably nor by soldering. It follows in the flash device 210 as withdrawn that the flasher/capacitor unit 212 can be pulled in the longitudinal direction of the projected portion 215b while the board unit 211 is held immovably, easily to separate the flasher/capacitor unit 212 from the board unit 211.

The flasher/capacitor unit 212 removed from the flash device 210 is connected to a regular voltage apparatus for high voltage, and tested for flash emission. The flasher/capacitor unit 212 can be inspected for its performance only in a short time and with great efficiency. To inspect operation of the board unit 211, it is connected to a test flash tube and a test main capacitor having for example 1 $\mu$F. The main capacitor 238 as used in the photo film unit has capacitance of nearly 160 $\mu$F. The test main capacitor makes it possible to test the board unit 211 in a still shorter time than with the flasher/capacitor unit 212 connected to the board unit 211 to be tested.

As a result of the test, the board unit 211 and the flasher/capacitor unit 212 is either reused if without defects, or discarded as waste if defective. It has been found that the board unit 211 in general is usable several times. It is general that the flasher/capacitor unit 212 is usable nearly one time, and replaced with a new one without reuse, because the front of the protector 242 is scratched or dusty, or the main capacitor 238 has degraded with time.

In FIG. 16, a flash device 250 includes conductor wires 253, 254 and 255 having rigidity, for connecting a flasher/capacitor unit 252 to a printed circuit board 251. Tips of the conductor wires 253 to 255 are bent at a right angle, inserted into holes 256a, 256b and 256c formed at printed contact points 257, 258 and 259 of the printed circuit board 251, and fixed thereon by soldering. The conductor wires 253 to 255 are so rigid that they do not require any support for fixation between the printed circuit board 251 and 255. The flasher/capacitor unit 252 is attached to the printed circuit board 251 only by the conductor wires 253 to 255.

To separate the flasher/capacitor unit 252 from the printed circuit board 251, the solder on the tips of the conductor wires 253 to 255 are heated, while the tips are pulled out of the hole 256a, 256b and 256c. The conductor wires 253 to 255 can be separated easily from the contact points 257 to 259.

In FIG. 17, a flash device 260 includes a connector 263 for connection between a printed circuit board 261 and a flasher/capacitor unit 262. The connector 263 includes three plug holes and three conductor wires 267, 268 and 269 having rigidity. The flasher/capacitor unit 262 has contact pins 264, 265 and 266, which are inserted in the plug holes of the connector 263 in detachable fashion. The printed circuit board 261 has three printed contact points 261a, 261b and 261c. The conductor wires 267 to 269 are soldered on the contact points 261a to 261c. In the embodiment, the contact segments 264 to 266 are rigid enough to support the flasher/capacitor unit 262 on the printed circuit board 261 via the connector 263. When the flasher/capacitor unit 262 is pulled manually to the right as viewed in the drawing, away from the printed circuit board 261 as held in stationary fashion, the contact segments 264 to 266 are easily removed from the connector 263, to separate the printed circuit board 261 from the flasher/capacitor unit 262.

A flash device 270 in FIGS. 18 and 19 includes four contact segments 273, 274, 275 and 276 which connect a printed circuit board 271 to a flasher/capacitor unit 272. The flasher/capacitor unit 272 is slidably mounted on the printed circuit board 271 via a structure the same as that of the embodiment of FIG. 14. The contact segments 273 to 276 are contacted on printed contact points 281, 282, 283 and 284 in slidable fashion. The contact segments 273 and 276 are connected respectively to electrodes of the main capacitor 238 and the flash tube 240. The contact segments 274 and 275 are connected respectively to opposite terminals of the trigger transformer 246. This being so, all the voltage and currents through the contact segments 273 to 276 and the contact points 281 to 284 are kept low. The present embodiment is more desirable than the embodiment of FIG. 14, because only the voltage through the contact segment 232 and the contact point 225 cannot help being high.

In the flasher/capacitor units as described above, it is preferred to associate relevant parts with one another in simple coupling or engagement, for example by way of pins, in view of facility in assembly and disassembly of the flasher/capacitor units. This makes it possible to raise efficiency in renewing parts of each flasher/capacitor unit. The suitability of the flash device for recycling is improved by the present invention. In the embodiments of FIGS. 14 and 18 where the flasher/capacitor unit 212, 272 is electrically connected to the printed circuit board 215, 271 only by way of contacts, the flasher/capacitor unit 212, 272 are slidable. It is possible to construct a lens-fitted photo film unit or a compact camera such that the flasher/capacitor unit 212, 272 is displaced in a direction away from a taking lens for flashing in exposure. The flash device with this slidable flasher/capacitor unit is favorable in reducing so-called red-eye phenomena, in which pupils of eyes of human beings as principal objects are photographed in red color due to influences of flash light.

Note that, instead of the connector 263 in FIG. 17, other types of connectors may be used. For example, two members as connectors can be plugged together.

Other preferred embodiments are referred to now, in which "red eye" phenomena can be prevented with high reliability.

In FIG. 20, a lens-fitted photo film unit 301 is constituted by a photo film housing 302, which includes a photograph-taking mechanism of a simple structure. Generally the film housing 302 is covered in a cardboard wrapper 303. In the film housing 302, a taking lens 304 is disposed. An objective window 305 of a viewfinder 324 is located above the taking lens 304. A flash-emitting section 306 is located beside the objective window 305. In the top face of the photo film unit 301, there are a shutter button 308, a counter window 309 for indicating the number of remaining photographable frames of photo film 323, and an indicator window 311 for a neon lamp 310 indicating the flash charging. The neon lamp 310 is driven when the main capacitor is charged fully, that is, to predetermined voltage. The rear face of the film housing 302 has a film winding wheel 312 and an eyepiece window 313 of the viewfinder 324. The cardboard wrapper 303 has openings through which the taking lens 304, the objective window 305, the film winding wheel 312 and the like appear externally.

The film housing 302, as illustrated in FIG. 21, includes a film containing section 315, a photograph-taking section 316, a flash device 317, a front cover 318, and a rear cover 319, all of which are retained together via engagement of hooks in removable fashion. The film containing section 315 has a cassette containing chamber 322, a film roll chamber 324, and an exposure chamber 325 between the cassette containing chamber 322 and the roll chamber 324. The cassette containing chamber 322 contains a cassette shell 321 of a photo film cassette 320. The roll chamber 324 contains a roll 323a of the photo film 323 pre-drawn out of the cassette shell 321.

The cassette shell 321 and the roll 323a are contained respectively into the cassette containing chamber 322 and the roll chamber 324, before the rear cover 319 is fixed to the rear of the film containing section 315 via engagement of hooks. The cassette containing chamber 322, the roll chamber 324 and the exposure chamber 325 are closed in light-tight fashion. The photograph-taking section 316 and the flash device 317 are assembled to the front of the film containing section 315. A dry battery 327 is mounted on the film containing section 315, before the front cover 318 is attached finally.

The photograph-taking section 316 has a plastic base portion 328, in front of which a lens holder 331 is mounted to operate also for covering a shutter. The taking lens 304 is fixedly mounted on the photograph-taking section 316 by attachment of a lens cover 333. A top of the photograph-taking section 316 has a shutter drive mechanism, the counter mechanism, and the viewfinder 334. The viewfinder 334 is a reversed Galilean type consisting of an objective concave lens 334a and an eyepiece convex lens 334b.

There is an LCD 335 of a disk shape between the lens holder 331 and the taking lens 304 for regulating the aperture stop of the taking lens 304. The LCD 335 is connected to a printed circuit board 341 via leads 337 and 338. The LCD 335 includes a transparent electrode shaped like a doughnut or ring, that is, defining a central hole. When a photograph is being taken without using the flash, a doughnut portion 335a is turned opaque, to limit the aperture stop of the taking lens 304. For flash photography, regular voltage is applied to the electrode of the LCD 335, to turn the doughnut portion 335a transparent, so that the aperture stop of the taking lens 304 is fully open.

The flash device 317 includes the printed circuit board 341 and a flasher/capacitor unit 342 mounted slidably thereon. A bottom of the printed circuit board 341 has a battery holder with segments 343, 344 for holding the battery 327. A left edge of the printed circuit board 341 has synchro contact points 345 and 346, which are disposed in a rotational locus of a shutter blade and short-circuited by the shutter blade as rotated.

Figure 23:
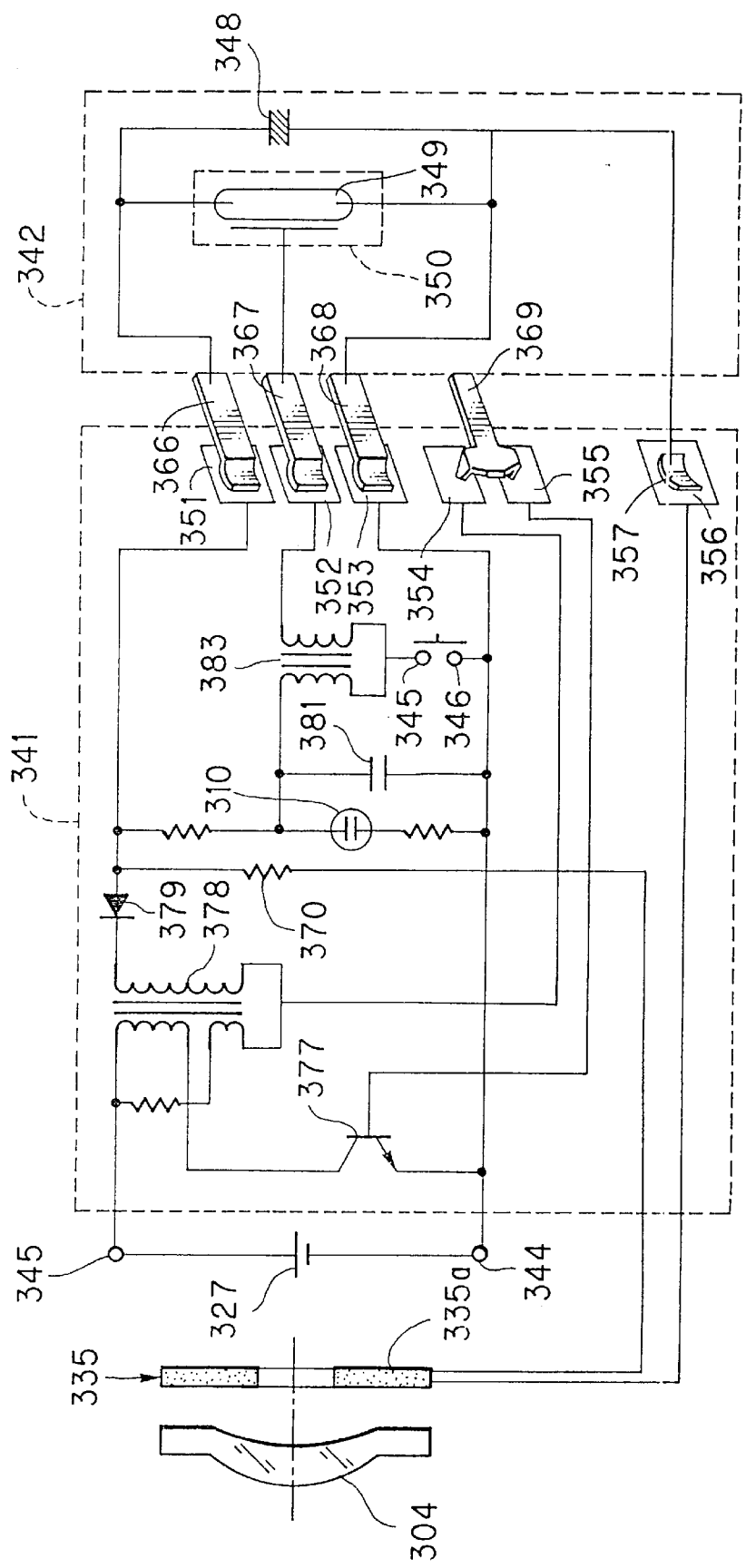
FIG. 23 is a schematic diagram illustrating circuitry of the flash device of FIGS. 22A and 22B.

The flasher/capacitor unit 342 includes a housing 347 and the flash-emitting section 306 mounted in its front corner. The flasher/capacitor housing 347 contains a main capacitor 348, and connected in parallel with a flash tube 349 of the flash-emitting section 306, as illustrated in FIG. 23. The flash-emitting section 306 includes a protector 350 of transparent plastics, the flash tube 349 and a known concave reflector. A front wall of the protector 350 is a diffusing plate or a lens. A button portion 347a is formed integrally with the flasher/capacitor housing 347, and operable for sliding the flasher/capacitor unit 342.

Figure 22A:
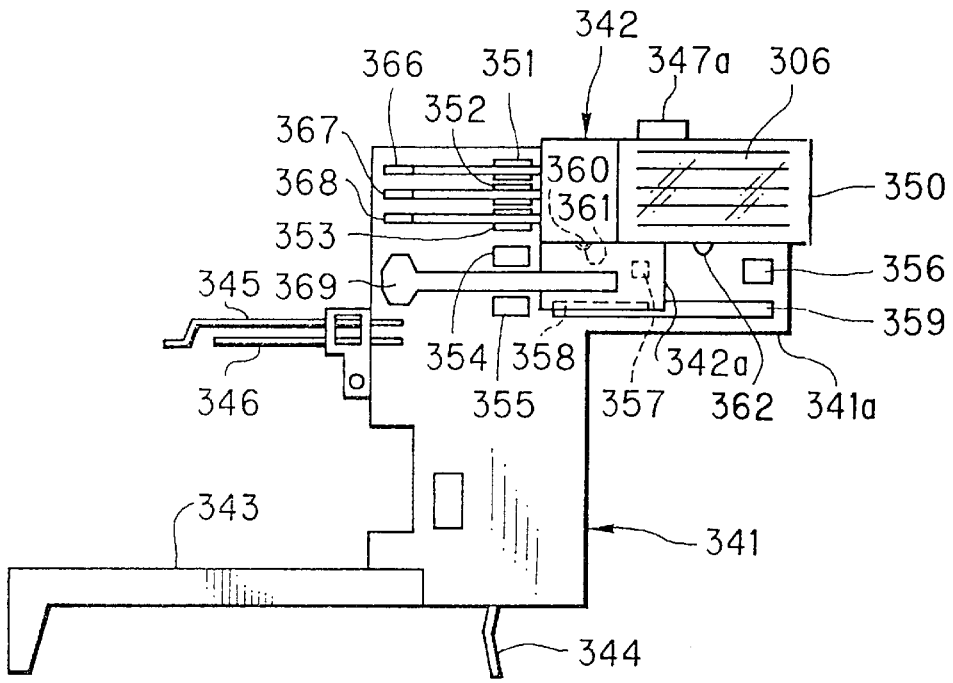
FIGS. 22A and 22B are plan views illustrating relative positions of a printed circuit board and a flasher/capacitor unit of a flash device.
Figure 22B:
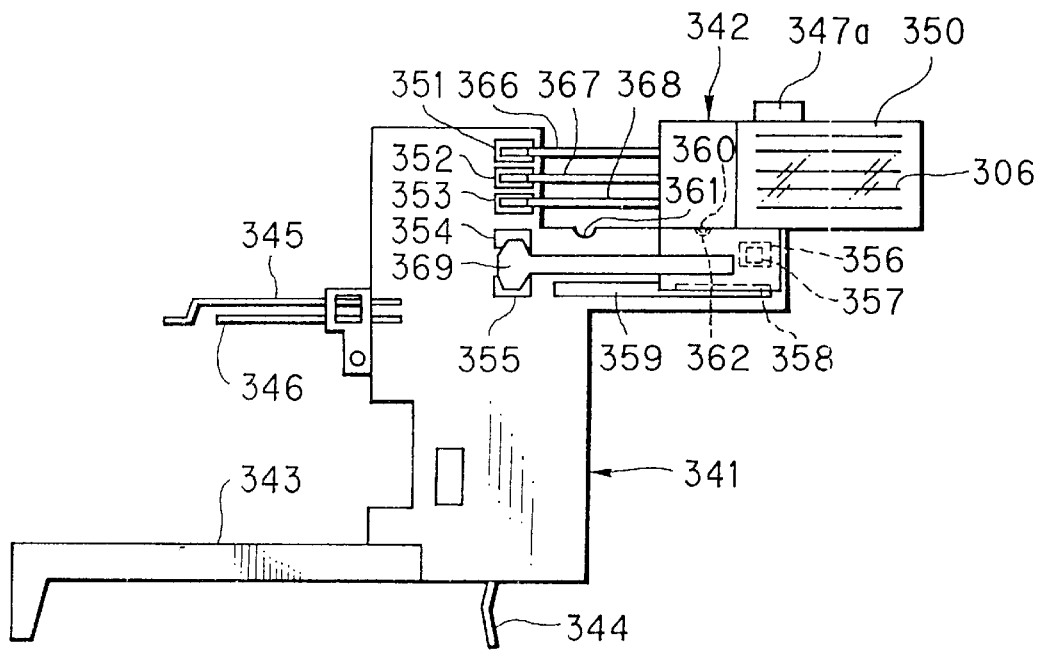

In FIGS. 22 and 23, a front of the printed circuit board 341 has three printed contact points 351 to 353 to be connected electrically to the flasher/capacitor 342, and a pair of printed contact points 354 and 355, which are short-circuited for charging. The printed circuit board 341 also has a projected portion 341a, on which the flasher/capacitor unit 342 is mounted slidably via a leg portion 342a. The projected portion 341a also has a printed contact points 356, in association with which a segment 357 is mounted inside the leg portion 342a.

The leg portion 342a has a channel shape sandwiching the projected portion 341a. Bottoms of the leg portion 342a have a ridge 358, which is engaged in a slot 359 formed in the printed circuit board 341. A top of the projected portion 341a has semi-circular recesses 361 and 362, which are engaged clickedly with a projection 360 formed under the flasher/capacitor unit 342.

A left edge of the flasher/capacitor unit 342 has brush-like segments 366, 367 and 368. A face of the leg portion 342a has a short-circuiting segment 369 of metal fixed thereon. The segments 366 and 368 are connected to electrodes of the main capacitor 348 and the flash tube 349. The segment 367 is connected to the trigger terminal of the flash tube 349. The segment 357 is connected to one terminal of the main capacitor 348.

In the position where the projection 360 is clicked with the recess 362, the segments 366 to 368 are contacted on the contact points 351 to 353 of the printed circuit board 341, to connect the flasher/capacitor unit 342 to the printed circuit board 341 electrically. The tip of the short-circuiting segment 369 short-circuits the contact points 354 and 355, to operate the flash circuit. The contact point 356 is contacted on the segment 357, to connect the LCD 335 in parallel with the main capacitor 348 via a resistor 370. The flash-emitting section 306 is set in a position for prevention of a red eye phenomenon, to be described later in detail. In the position where the projection 360 is clicked with the recess 361, the flasher/capacitor unit 342 is contained in the contour of the film housing 302 in compact fashion, and disconnected electrically from the printed circuit board 341. The LCD 335 is released from application of voltage.

The flasher/capacitor unit 342 is slid to the right of the projected portion 341a. The contact points 354 and 355 are short-circuited by the segment 369, so that the current from the battery 327 is boosted in high voltage by an oscillating transistor 377 and an oscillating transformer 378. Then the alternating current is converted by a rectifier 379 into a direct current, which flows through the contact points 351 and 353 and the contact segments 366 and 368, and is applied to the main capacitor 348.

When the main capacitor 348 and a trigger capacitor 381 are sufficiently charged, a small neon lamp 310 is driven to signal the termination of charging to a user. After the synchro contact points 345 and 346 are short-circuited, the charge stored in the trigger capacitor 381 is applied to the trigger terminal of the flash tube 349 via the contact point 352 and the contact segment 367. Immediately the flash emission of the flash tube 349 is triggered.

The LCD 335 is connected in parallel with the main capacitor 348 via the resistor 370, the contact point 356 and the segment 357. When the neon lamp 310 is turned on, simultaneously regular voltage is applied to the electrode of the LCD 335. The doughnut portion 335a is changed from opacity to transparency, to change the speed of the taking lens 304, for example from f:11.8 to f:9.4. This enables the flash device 317 to have a smaller guide number (GN) required for the flash photography, in fashion favorable for avoidance of red eye phenomena.

To prevent occurrence of red eye phenomena, there is a known preventing method as disclosed in commonly assigned U.S. Pat. No. 4,051,494 corresponding to JP-B (Japanese Patent Publication No.) 58-20021, according to which the guide number (GN) of the flash device with ISO 100 photo film satisfies the formula:

$$GN < 1/[0.37 - \{0.73 \cdot \tan^{-1}(d/400)\}/2.5°]$$

where $\underline{d}$ is a distance of a center of a flash-emitting section and the optical axis of a taking lens, under the conditions where the illuminance index of a photographic field is 3, and the object distance is 4 meters or less.

The formula is experimental for approximately determining a region of preventing red eye phenomena. The values 0.37 and 0.73 have been obtained experimentally. The value 400 is an object distance (4 m=400 cm). 2.5° is an angle defined between the optical axis L1 and a line extended from the center P1 of the flash-emitting section to the eye of a human being as principal object, letting the optical axis L1 be positioned through the center of the eye. 2.5° is a minimum value at which red eye phenomena are prevented.

The photo film unit of the present embodiment has specifics as below:

Speed of the photo film 323: ISO 400,
Speed of the taking lens 304 as opened fully (with the LCD 335 all transparent): f:9.4,
Object distance: 4 meters,
GN: 8.9.

Let $r$ be a radius of a virtual circle Q1 in which red eye phenomena may occur. The radius $r$ is calculated from the equation, which is derived from the above relationship between of GN and $d$, as follows:

$$r = 400 \cdot \tan\{2.5° \cdot (0.37 - 1/GN)/0.73\}$$

When 8.9 is substitute d for GN in the equation, $r$ is determined as 61.6 mm.

Figure 24A:
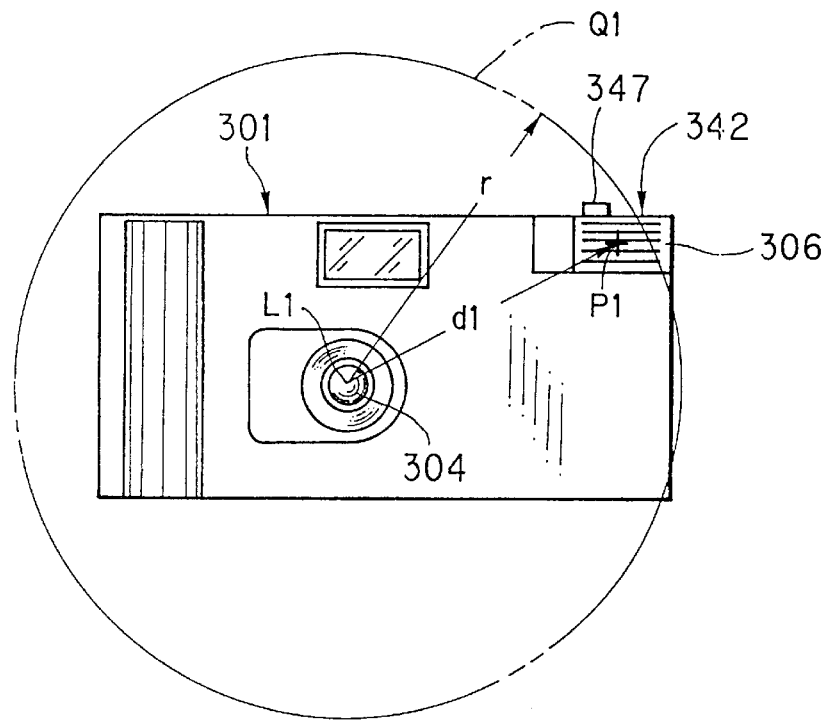
FIGS. 24A and 24B are explanatory views, in front elevations, illustrating relative positions of a virtual circle and a center of a flash-emitting section.
Figure 24B:
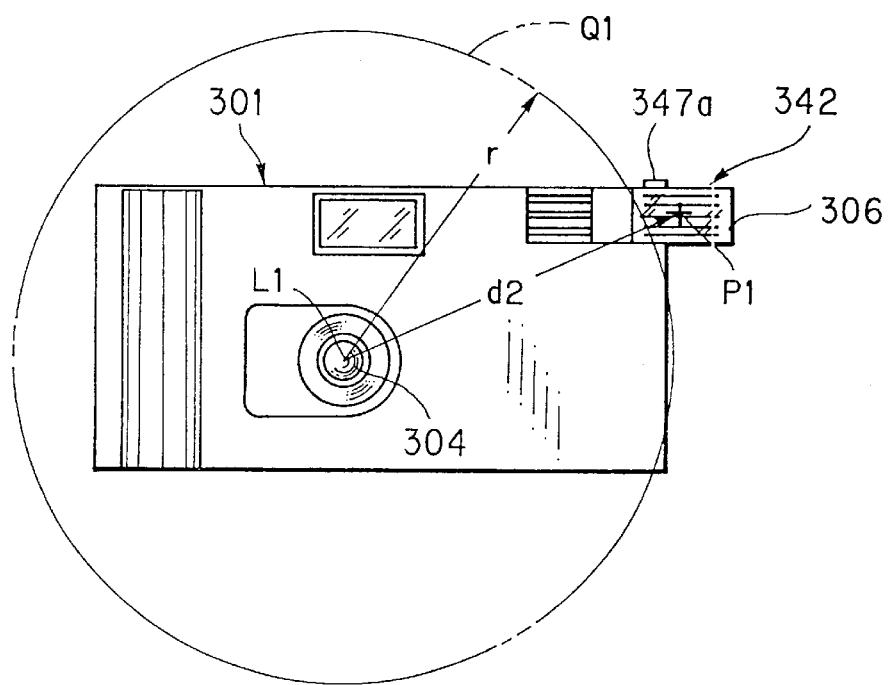

In the standard photography, the distance d1 between the optical axis L1 of the taking lens 304 and the center P1 of the flash-emitting section 306 is, for example, 57.6 mm (<61.6 mm=r). The flasher/capacitor unit 342 is contained compactly within the contour of the film housing 302, as illustrated in FIG. 24A. In the flash photography, the flasher/capacitor unit 342 is slid by pressing the button portion 347a, as illustrated in FIG. 24B. The distance d2 between the optical axis L1 and the center P1 is now 69.6 mm (>61.6 mm=r). The center P1 comes out of the virtual circle Q1, so that no red eye phenomenon occurs.

The flash photography with the photo film unit 301 is now described. At first, the button portion 347a is operated to slide the flasher/capacitor unit 342 in the direction to project from around the contour of the film housing 302. The projection 360 is disengaged from the recess 361 in movement of the flasher/capacitor unit 342, until the projection 360 is engaged with and stopped by the recess 362. The center P1 the flash-emitting section 306 is moved out of the virtual circle Q1. The segments 366 to 368 are contacted on the contact points 351 to 353, to connect the flasher/capacitor unit 342 electrically to the flash circuit of the printed circuit board 341. The tip of the short-circuiting segment 369 short-circuits the contact points 354 and 355, to start charging the main capacitor 348 and the trigger capacitor 381. The segment 357 is contacted on the contact point 356, to connect the LCD 335 in parallel with the main capacitor 348.

When the voltage of the main capacitor 348 and the trigger capacitor 381 becomes their predetermined levels, the neon lamp 310 starts blinking. The LCD 335 is changed transparent. The aperture stop of the taking lens 304 is fully open, as f:11.8 is decreased to f:9.4.

An object as desired is targeted through the viewfinder 334. The shutter button 308 is depressed, to operate the shutter mechanism in the photograph-taking section 316. The shutter blade is opened/closed, to short-circuit the synchro segments 345 and 346 in synchronism therewith. The flash tube 349 emits flash light, to illuminate the object within the range of 4 meters. The center P1 of the flasher/capacitor unit 342 is out of the virtual circle Q1, so that red eye phenomenon does not occur.

When no flash is required, the flasher/capacitor unit 342 is retracted in the contour of the film housing 302. The center P1 of the flash-emitting section 306 is located within the virtual circle Q1, to make the photo film unit 301 portable. The flasher/capacitor unit 342 is disconnected from the printed circuit board 341, so that the battery 327 is prevented from consumption due to omission of turning off the switch. The segment 357 is detached from the contact point 356. The doughnut portion 335a of the LCD 335 is turned opaque, to stop down the aperture stop at f:11.8. The shutter button 308 is depressed, to allow the standard photography with ambient light, with the object in-focus from 1 m to infinite distance.

Figure 25:
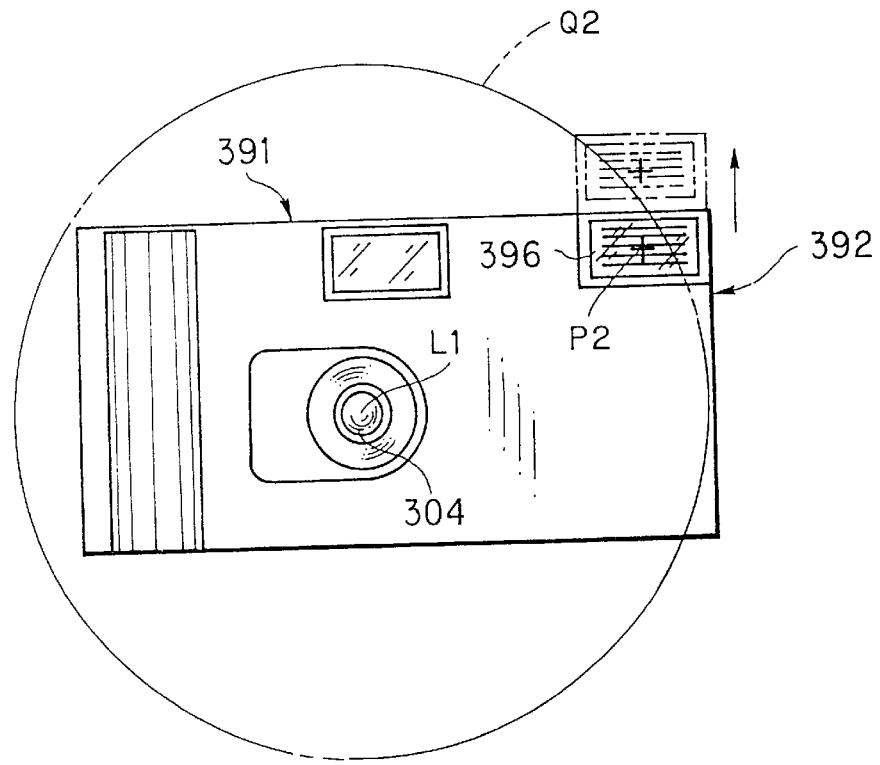
FIGS. 25 and 26 are explanatory views, in front elevations, illustrating other preferred photo film units.
Figure 26:
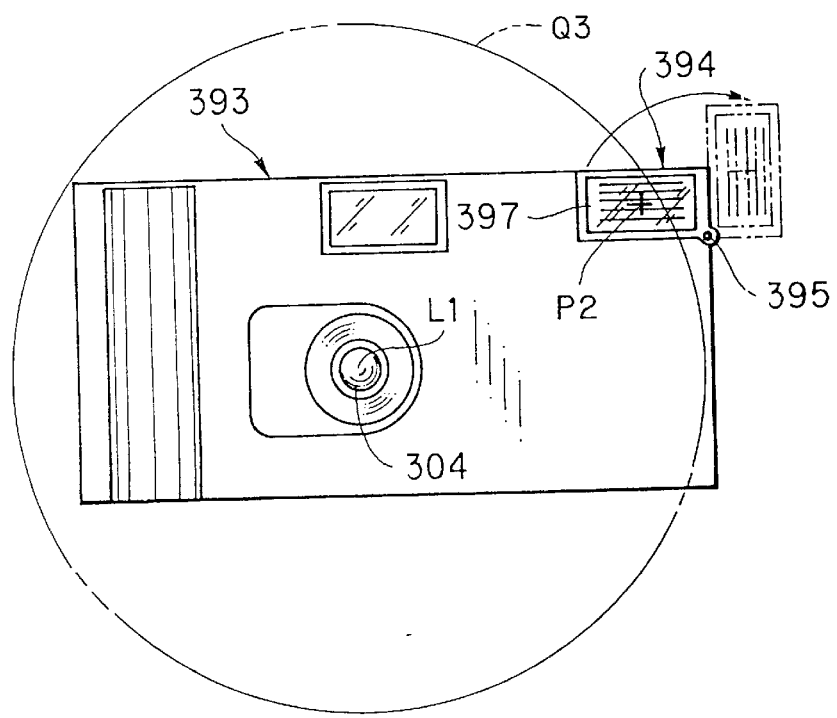

FIGS. 25 to 27 illustrate variants of flasher/capacitor units. A photo film unit 391 in FIG. 25 has a flasher/capacitor unit 392 movable in a vertical direction. A photo film unit 393 in FIG. 26 has a flasher/capacitor unit 394 swingable via a hinge 395. Flash-emitting sections 396 and 397 are so moved as to move their centers P2 and P3 out of the virtual circles Q2 and Q3.

A photo film unit 400 in FIGS. 27A and 27B has a flasher/capacitor unit 403, which is mounted on a film housing 401 via an arm 402 and hinges 404 and 405. The arm 402 has a height nearly as great as the film housing 401, and renders the flasher/capacitor unit 403 swingable about the hinges 404 and 405. When no flashing is required, a hole 402a is superposed on a taking lens 406. The flasher/capacitor unit 403 lies in a position under the taking lens 406, to make the photo film unit 400 portable, as illustrated in FIG. 27B. In the flash photography, the flasher/capacitor unit 403 is erected on the film housing 401, to locate the center P4 outside the virtual circle Q4, for prevention of red eye phenomenon. Reference sign L2 represents an optical axis of the taking lens 406.

A photo film unit in FIGS. 27C and 27D has two arms 408 which support a flasher/capacitor unit 409. Elements similar to those of FIGS. 27A and 27B are designated with identical reference numerals.

It is also possible to eliminate the hole 402a from the arm 402 of FIGS. 27A and 27B, and to form the arm 402 from transparent plate.

In the embodiment, the ISO 400 photo film is used. Guide number (GN) of the flash device is 8.9. Alternatively photo film of higher speed can be used. When ISO 800 film is used, the sufficient guide number associated with the film speed is 6.3. The radius of the virtual circle with the guide number is 50.5 mm, smaller than 61.6 mm. This is favorable in reducing the size of the photo film unit. In the above, the LED is used for stopping down the aperture stop. Alternatively the aperture stop can be stopped down by an additional stop-down mechanism. It is possible that the stop-down mechanism is separate from the flasher/capacitor unit. But it is preferable to link the flasher/capacitor unit with the stop-down mechanism, and to change the aperture stop in response to movement of the flasher/capacitor unit. In the above embodiment, the LCD is connected in parallel with the main capacitor via a switch inclusive of the contact points and the segment. Alternatively an LED may be connected in parallel with a dry battery.

Another preferred embodiment is illustrated in FIGS. 28 to 31B. FIG. 28 illustrates a lens-fitted photo film unit 430 with a flash device 410. A film housing 431 is mainly formed of plastics, and covered within a cardboard wrapper 432. The cardboard wrapper 432 has a decorative printed pattern, and is used for appearance of the photo film unit as merchandise. The cardboard wrapper 432 has openings through which a taking lens 433, a viewfinder 434, a shutter button 435, a winding wheel 436 a counter window 437 and a flash-emitting section 412 appear externally. With the film housing 431 covered in the cardboard wrapper 432, the film housing 431 is usable for effecting exposures.

Figure 29:
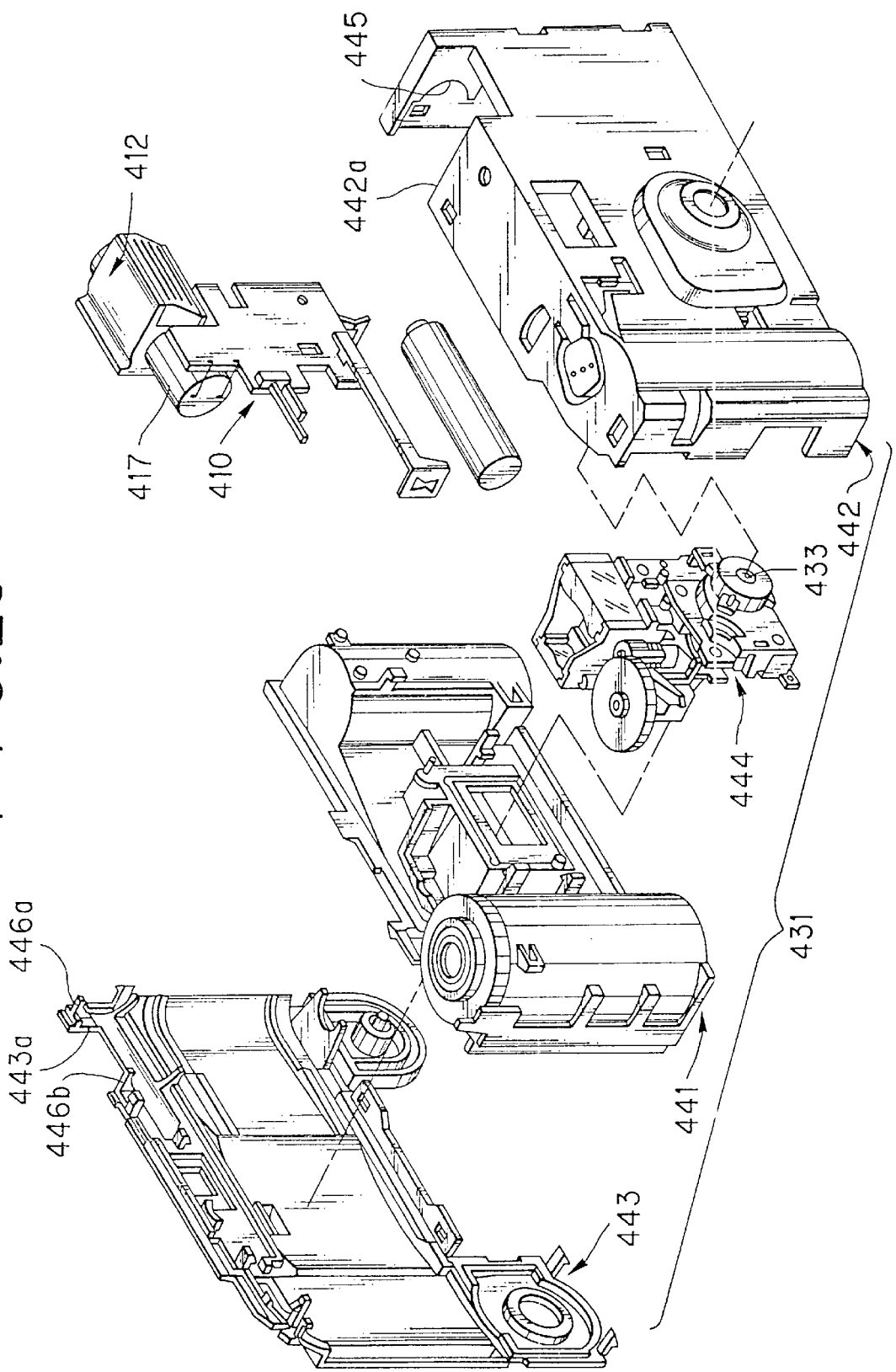
FIG. 29 is an exploded perspective view illustrating the photo film unit of FIG. 28.

The film housing 431, as illustrated in FIG. 29, includes a film containing section 441, a front cover 442 and a rear cover 443. The front of the film containing section 441 has a photograph-taking section 444. The top of the film containing section 441 has the flash device 410. The photograph-taking section 444 and the flash device 410 is sandwiched between the front cover 442 and the rear cover 443.

Figure 30:
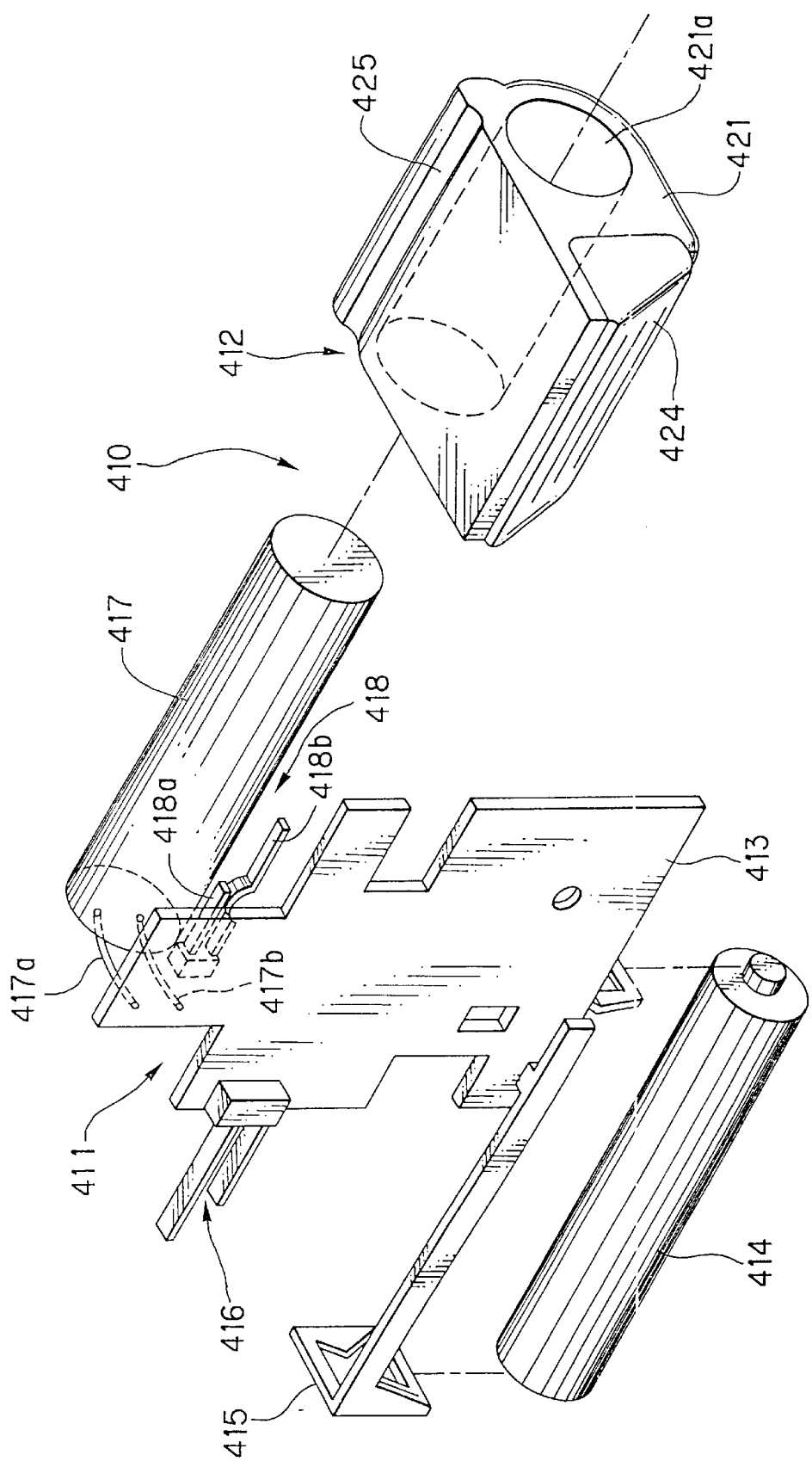
FIG. 30 is an exploded perspective view illustrating a flash device in the photo film unit of FIGS. 28 and 29.

In FIG. 30, the flash device 410 includes a board unit 411 and the flash-emitting section 412. The board unit 411 consists of a printed circuit board 413, which has a control circuit for charging and discharging. On the board unit 411 are mounted a battery holder 15 for holding a dry battery 414, and synchro contact points 416 to be short-circuited by operation of the shutter blade. The top of the printed circuit board 413 has a cylindrically shaped main capacitor 417, which is oriented horizontally, and attached via terminals 417a and 417b by way of soldering. Under the main capacitor 417 is disposed a flash charging switch 418 for actuating the charging circuit associated with the main capacitor 417. The flash charging switch 418 consists of two segments 418a and 418b, of which the former has a smaller length, and the latter is longer and projected from an edge of the printed circuit board 413. The segments 418a and 418b, when in a free state, are contacted to one another.

The flash-emitting section 412, as illustrated in FIGS. 31A and 31B, has a housing 421, a flash tube 422, a concave reflector 423. A diffusing plate 424 is attached in front of a front opening in the flasher housing 421. A top wall of the flasher housing 421 is flat, and has a groove 425 formed in its rear. In the rear of the housing is formed a cylindrical opening 421a which has a diameter as great as that of the main capacitor 417. The main capacitor 417 is inserted therein to mount the flash-emitting section 412 on the main capacitor 417. The terminals 417a and 417b have a diameter sufficient for rigidity or resistance to deformation, and operate for keeping the main capacitor 417 oriented horizontally. The main capacitor 417 is also used as a rotational shaft for the flash-emitting section 412. The flash-emitting section 412 is located in contact with a top face of the segment 418b of the flash charging switch 418. When the flash-emitting section 412 is swung to direct its front face downward, a bottom face of the flasher housing 421 presses the segment 418b down, to turn off the flash charging switch 418. When the flash-emitting section 412 is swung up, the segment 418b is released from depression of the flasher housing 421, to turn on the flash charging switch 418. The main capacitor 417 is caused to store the charge for flash emission. When the synchro contact points 416 are short-circuited upon opening of the shutter blade, the charge in the main capacitor 417 is discharged in the flash tube 422, which emits flash light.

The front cover 442 and the rear cover 443 have support portions 445, 446a and 446b, which have curvature associated with the contour of the main capacitor 417 and sandwiches the main capacitor 417 fixedly at its horizontal ends. Cutouts 443a and 442a are formed in the rear cover 443 and 442, and cause the top of the flash-emitting section 412 to appear externally. The flash device 410 is swingable between a non-using position and a using position. When the flash device 410 is in the non-using position, the flash-emitting section 412 is contained in the film housing 431, as illustrated in FIG. 31A. When the flash device 410 is in the using position, the front face of the flash-emitting section 412 is projected above the top of the film housing 431.

Assembly of the flash device 410 is described now. At first the board unit 411 and the flash-emitting section 412 are assembled separately. The main capacitor 417 is inserted into the opening 421a in the flash-emitting section 412. The terminals 417a and 417b are soldered to the printed circuit board 413. Now the board unit 411 and the flash-emitting section 412 are unified for the flash device 410, which can be handled with great ease.

The flash device 410 as assembled is transported to a line for assembling the photo film unit 430, and is incorporated into the film housing 431. For this, the front of the film containing section 441 is provided with the photograph-taking section 444 and the flash device 410. The flash device 410 has a unified arrangement such that it can be easily and simply mounted on the film containing section 441. After insertion of the battery 414 into the battery holder 415, the front cover 442 and the rear cover 443 is fitted on the film containing section 441. The support portions 445, 446a and 446b hold the main capacitor 417, to support the flash device 410 fixedly in the film housing 431. A lateral face of the flash-emitting section 412 is contacted on the inside of the film housing 431, so that the terminals 417a and 417b are unlikely to receive application of great force in the direction of bending the terminals 417a and 417b. The rotational axis of the flash-emitting section 412 is stabilized. Note that the flash-emitting section 412 of the flash device 410, when assembled, is oriented in the non-using position of FIG. 31A.

For a user to take a photograph with the photo film unit 430, he rotates the film winding wheel 436 to its limit position where it is stopped. He charges the shutter, to stand by for taking an exposure.

To effect the flash photography, the user's finger touches the groove 425 in the flash-emitting section 412 on the top of the photo film unit 430, to press its rear edge downward. The flash-emitting section 412 is rotated, to project its front edge over the film housing 431. An optical axis 422a of the flash light from the flash tube 422 is brought near to the top face of the film housing 431. The flash-emitting section 412 is rotated about the main capacitor 417 having the sufficiently great diameter. The ends of the main capacitor 417 are fixed by the support portions 445, 446a and 446b. The flash-emitting section 412 can be rotated stably even by small force. When the flash-emitting section 412 comes to the using position for flash emission, the segment 418b is released from being pressed by the flasher housing 421, so that the flash charging switch 418 is turned on, to charge the main capacitor 417.

The user targets an object to be photographed, and depresses the shutter button 435. The shutter blade is opened/closed, to short-circuit the synchro contact points 416. The charge in the main capacitor 417 is applied to the flash tube 422 to cause it emit flash light, so that the object is illuminated. The optical axis 422a is shifted at the top of the film housing 431, and located away from the light path from the object to the taking lens 433. This avoids occurrence of red eye phenomenon.

When the flash photography is terminated, the flash charging switch 418 still remains turned on. The main capacitor 417 after the flashing is recharged. No manual operation is required for recharging the flash device. With the shutter charged, an exposure with flash light can be effected upon simple depression of the shutter button 435.

With exposures finished, the top of the flash-emitting section 412 is depressed to movement to the non-using position of FIG. 31A. The bottom of the flash-emitting section 412 presses down the segment 418b. The segment 418a is released from contact with the segment 418b, to turn off the flash charging switch 418. The main capacitor 417 is stopped from being charged. The diffusing plate 424 comes partially covered within the film housing 431. The diffusing plate 424 can be protected from damage when the user carries the photo film unit 430 with him.

Regarding lens-fitted photo film units, improvements of edge numbers recorded on the photo film are described with the photo film units.

Figure 43:
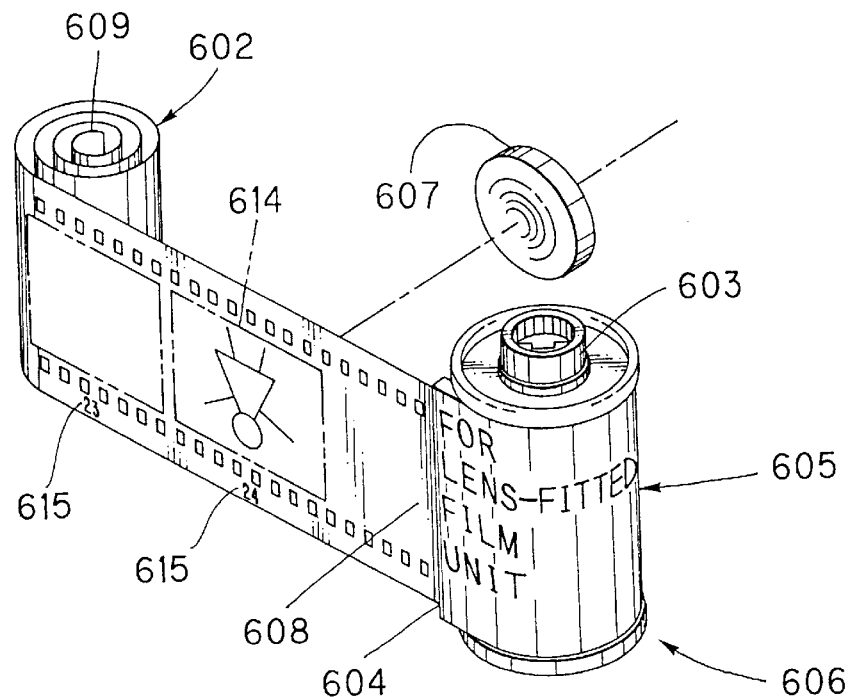
FIG. 43 is an explanatory view, in perspective, illustrating relative positions of conventional photo film, a cassette and a taking lens in a photo film unit.

Conventional photo film pre-loaded in a photo film unit is the 135 type with a cassette. As illustrated in FIG. 43, the photo film cassette includes a photo film 602 and a cassette shell 605 having a spool 603 and a film passageway 604. The cassette is of course compatible to general cameras of reusable types. The cassette shell 605 and the photo film 602 in the photo film unit have such arrangement that the cassette shell 605 is contained in the right of a taking lens 607 and that a roll of the photo film 602 from the cassette shell 605 is contained in the left of the taking lens 607, as viewed from the rear. After each of the exposures, the spool 603 in the cassette shell 605 is rotated, to wind one frame of the photo film 602 into the cassette shell 605. The order of exposing the photo film 602 in the photo film unit is from a film trailer 608 at the spool 603 toward a film leader 609 at a front end.

Figure 44:
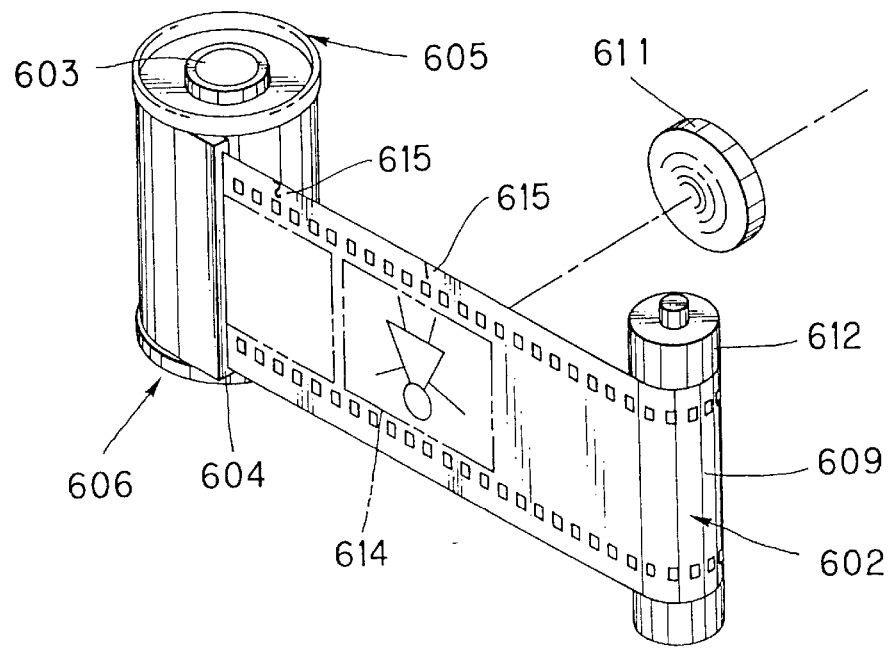
FIG. 44 is an explanatory view, in perspective, illustrating relative positions of conventional photo film, a cassette and a taking lens in a generally available camera.

In the most prevalent camera, the cassette shell 605 and the photo film 602 have such arrangement that the cassette shell 605 is contained in the left of a taking lens 611 and that the film leader of the photo film 602 from the cassette shell 605 is taken up on a spool 612 in the right of the taking lens 611, as illustrated in FIG. 44. After each of the exposures, the photo film 602 is wound up about the spool 612 by one frame. The order of exposing the photo film 602 is from the film leader 609 toward the film trailer 608.

The photo film 602 has latent images of edge numbers 615 located outside effective frame areas 614. The edge numbers 615 are arranged from the film leader 609 toward the film trailer 608, and oriented in a vertically similar manner to orientation of images in the effective frame areas 614. After exposures, the photo film 602 is forwarded to a photo laboratory, where the photo film 602 is subjected to photo-finishing. The photo film 602 is cut into pieces of six frames. Prints as produced are contained in containing sheaths, to be provided for the user as customer. As the edge numbers are oriented similarly to the orientation of the negative images, it is easy to read the edge numbers in extra printing.

However there is a problem in that, with the photo film unit, the orientation of the edge numbers 615 is upside down to the orientation of the images in the effective frame areas 614, as the arrangement of the photo film and the cassette in the photo film unit is reverse to that in the camera. When the user places an order for extra printing, he is likely to commit an error in reading the edge numbers while he observes the images as oriented normally.

Another problem lies in that the order of the exposures is reverse to the order of the edge numbers. It is likely that the wrong frames may be designated for extra printing though they are not desired, especially when the plural frames look nearly similar, for example, photographs in an experiment, or consecutive exposures for the same object at a regular interval of time. This is a problem common to a "pre-wind" type of camera, but is remarkably serious for lens-fitted photo film units, because they are used in great quantities.

Preferred embodiments for solving those problems are referred to now. FIG. 32 illustrates a lens-fitted photo film 520 of a type of which the general thickness is reduced. A film housing 521 incorporates a photograph-taking mechanism, and contained in a cardboard wrapper 522. The cardboard wrapper 522 has a shape in which a film winding wheel 523, a flash-emitting section of a flash device 524, and a shutter button 525 appear externally. The cardboard wrapper 522 has openings through which a taking lens 526, a viewfinder 527 and a frame counter disk 528 appear.

Figure 33:
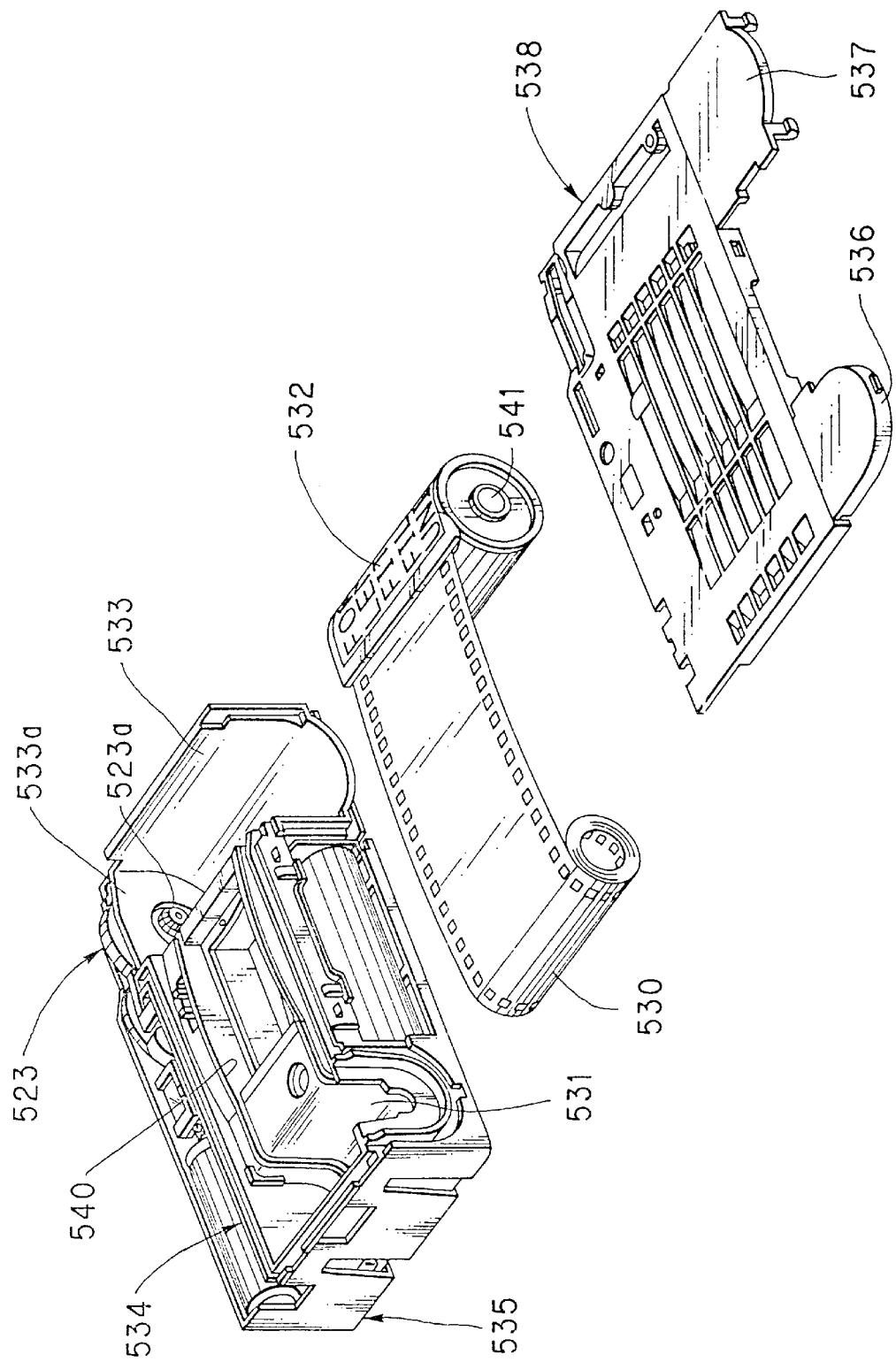
FIG. 33 is an exploded perspective view illustrating the photo film unit of FIG. 32.

The film housing 521, as illustrated in FIG. 33, has a roll chamber 531 containing photo film 530, and a cassette containing chamber 533 containing a cassette. The film housing 521 includes a main body 534, a front cover 535 and a rear cover 538. The main body 534 incorporates a photograph-taking mechanism. The front cover 535 covers the front of the main body 534. The rear cover 538 covers the rear of the main body 534, and includes lids 536 and 537, which covers bottoms of the roll chamber 531 and the cassette containing chamber 533.

Between the roll chamber 531 and the cassette containing chamber 533, there is formed an aperture 540 for defining a range in which the photo film 530 is exposed. An image is recorded in an effective frame area on the photo film 530 through the exposure aperture 540. In an upper wall 533a of the cassette containing chamber 533, an engaging portion 523a is projected from 523. The engaging portion 523a includes teeth arranged on a periphery of a column, and is engaged with a set of teeth formed on the inside of an upper end of a spool 541 of the cassette 532.

To load the film housing 521 with the photo film 530, the photo film 530 is at first drawn from the cassette 532 and wound as a roll as depicted. The length of drawing the photo film 530 is finely measured by counting perforations in the photo film 530. In engagement of the film winding wheel 523 with the spool 541 of the cassette 532, the photo film 530 is finely positioned into the film housing 521, because the engaging portion 523a has such minuteness in its tooth pitch as to keep the drawn length of the photo film 530 substantially unchanged even in fine rotation of the spool 541. No deviation in positions of effective frame areas and frame numbers of the photo film 530, which is precisely positioned when the film housing 521 is loaded with it.

Figure 34:
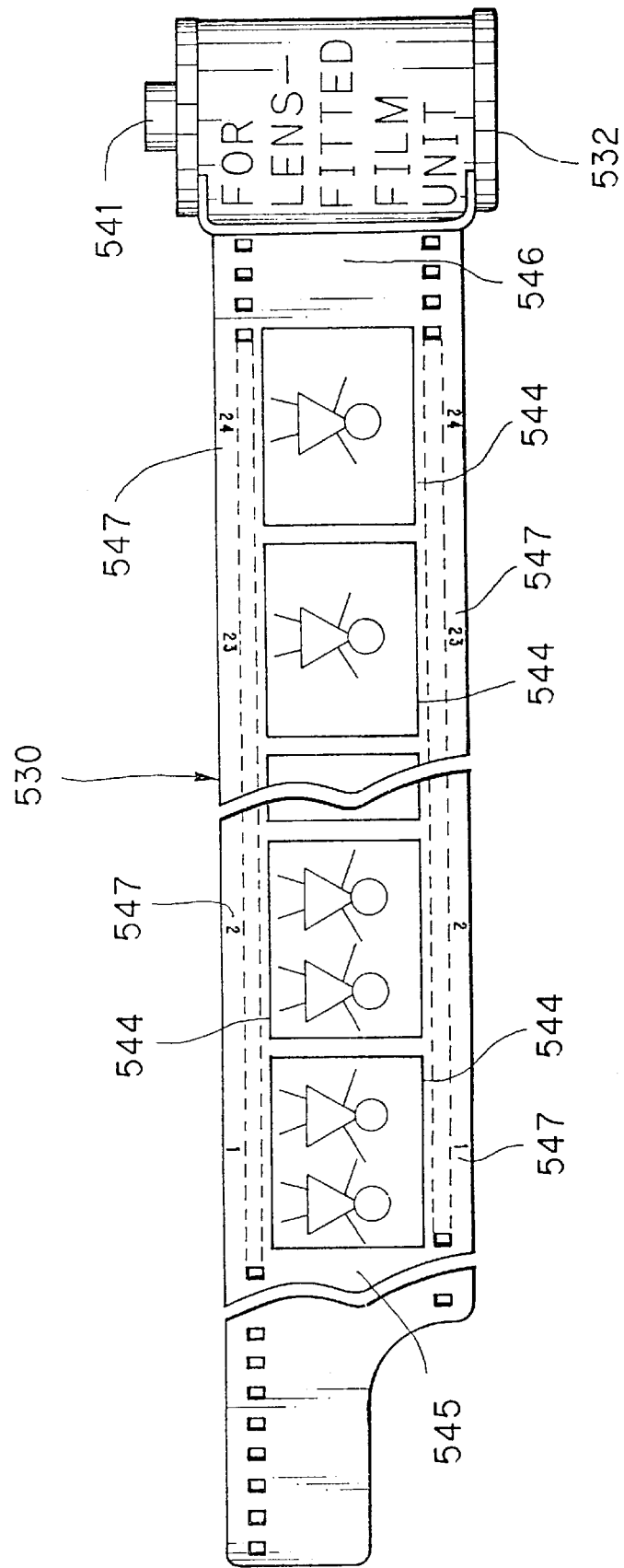
FIG. 34 is an explanatory view illustrating a photo film with a cassette pre-contained in the photo film unit.

The photo film cassette 532 to be used in the photo film unit 520 has indication "FOR LENS-FITTED FILM UNIT" printed on the periphery, as illustrated in FIG. 34. On upper and lower margins of the photo film 530 outside effective frame areas 544, there are recorded latent images of edge numbers 547 for frames in orientation upside down and in an increasing order from a film leader 545 toward a film trailer 546 at the spool 541.

The edge numbers 547 are formed by preexposure of the photo film 530 during its manufacture, where a light source such as light-emitting diodes for the edge numbers 547 are driven to expose the photo film 530 in synchronism with the conveyance of the photo film 530. The photo film 530 in the unexposed state has latent images of the edge numbers 547 completely invisible. The photo film 530 must be developed before the edge numbers 547 can be recognized.

Operation of the embodiment is referred to now. A user, having purchased the photo film unit 520, observes a field to be photographed through the viewfinder 527, targets an object to take an exposure. Exposures, for each of which the shutter button 525 is depressed and the film winding wheel 523 is rotated; are effected to use up the photo film 530. Each image is focussed through the taking lens 526 on the photo film 530. Latent images of the objects recorded on the photo film 530 have orientation upside down, in a similar manner to the edge numbers 547 having the orientation upside down.

When the photo film 530 is used up for exposures, the photo film unit 520 is deposited by the user to a photo laboratory. It is usual for the user to ask for both development and printing of the photo film 530. An operator or attendant of the photo laboratory peels the cardboard wrapper 522 from the film housing 521, opens the viewfinder 527, and takes out the cassette 532 with the photo film 530 wound inside. The cassette 532 has the indication "FOR LENS-FITTED FILM UNIT" enabling the operator easily to discern cassettes as used in cameras. This is convenient even when time lapses after taking out of the cassette 532, and even when an operator different from the initial one develops the photo film 530.

The cassette 532 is set in a film processor, to develop the photo film 530 from the cassette 532. The photo film 530 is next set into a printer/processor, where its frames are printed to produce photographic prints. The prints are contained in a container case. The photo film 530 is cut into pieces with six frames, contained in film sheaths, and returned to a user. In placing an order of extra printing, the vertical orientation of the images in the effective frame areas 544 is similar to that of the edge numbers 547. No error in recognizing the edge numbers 547 takes place in association with the effective frame areas 544.

Note that, although the edge numbers 547 are located both above and below the effective frame areas 544, it is possible to form the edge numbers 547 either above or below the effective frame areas 544. It is possible to orient either upper or lower ones of the edge numbers 547 normally, not upside down. This is favorable in compatibility with a camera of the most prevalent type, because the normally oriented edge numbers can be recognized correctly with the negative frames.

A variant of the photo film is referred to. In FIG. 35, edge numbers 549 are arranged increasingly from the film trailer 546 toward the film leader 545 of the photo film 530, and oriented upside down. The order of the edge numbers 549 coincides with the order of the exposures of the frames. This is favorable in convenience when the plural negative frames look nearly similar, for example, photographs in an experiment, or consecutive exposures for the same object at some interval of time. No error in recognizing the edge numbers 549 occurs, as the edge numbers 549 are oriented equally to the effective frame areas 544. Although the edge numbers 549 are located both above and below the effective frame areas 544, it is possible to form the edge numbers 549 either above or below the effective frame areas 544. It is possible to orient either upper or lower ones of the edge numbers 549 normally, not upside down. This is favorable in compatibility with a camera of the most prevalent type, because the normally oriented edge numbers can be recognized correctly with the negative frames.

Another variant of photo film is illustrated in FIG. 36. Edge numbers 551 are arranged increasingly from the film leader 545 toward the film trailer 546 above the effective frame areas 544, and oriented upside down. Edge numbers 552 are arranged increasingly from the film trailer 546 toward the film leader 545 below the effective frame areas 544, and oriented upside down. Note that it is possible to exchange the positions of the edge numbers 551 and the edge numbers 552. It is possible instead of the edge numbers 551 to orient upper edge numbers normally, not upside down. This is favorable in compatibility with a camera of the most prevalent type, because the normally oriented edge numbers, in the order following the exposing order, can be recognized correctly with the negative frames.

A further variant of photo film is illustrated in FIG. 37. Alphabetical signs 554 are arranged in order from the film leader 545 toward the film trailer 546 above the effective frame areas 544, and oriented upside down. Edge numbers 555 are arranged increasingly from the film trailer 546 toward the film leader 545 below the effective frame areas 544, and oriented upside down. Note that it is possible to exchange the positions of the alphabetical signs 554 and the edge numbers 555. It is possible to arrange alphabetical signs in order reverse to the alphabetical signs 554 as depicted, and to arrange edge numbers in reverse to the edge numbers 555.

Figure 38:
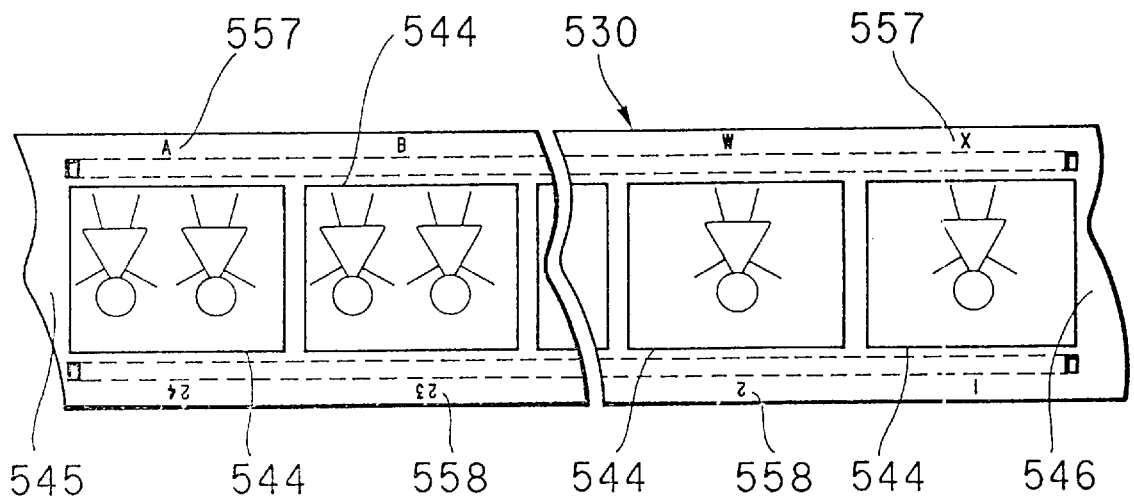

Still another variant of photo film is illustrated in FIG. 38. Alphabetical signs 557 are arranged in order from the film leader 545 toward the film trailer 546 above the effective frame areas 544, and oriented normally. Edge numbers 558 are arranged increasingly from the film trailer 546 toward the film leader 545 below the effective frame areas 544, and oriented upside down. Note that it is possible to exchange the positions of the alphabetical signs 557 and the edge numbers 558. It is possible to arrange alphabetical signs in order reverse to the alphabetical signs 557 as depicted, and to arrange edge numbers in reverse to the edge numbers 558.

Figure 39:
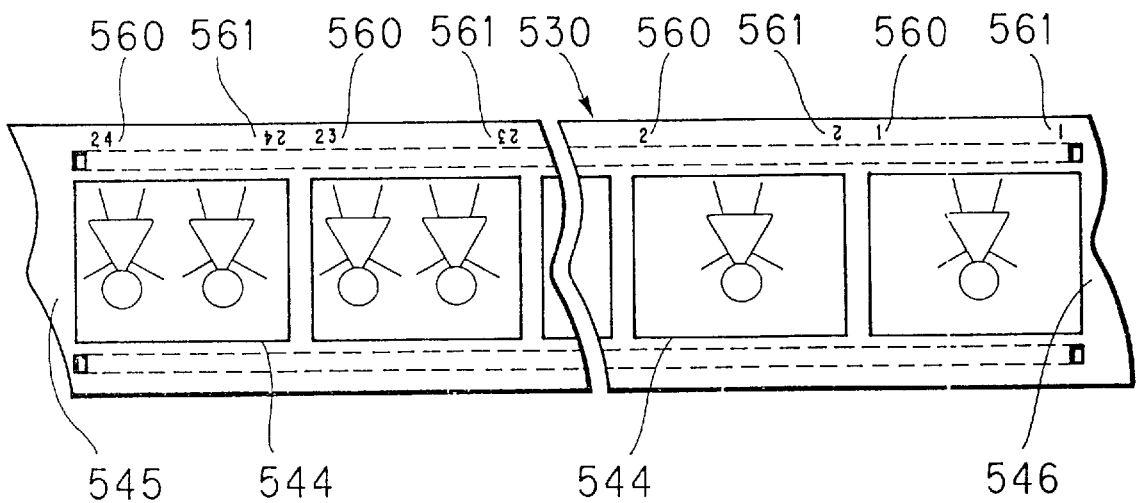
Figure 40:
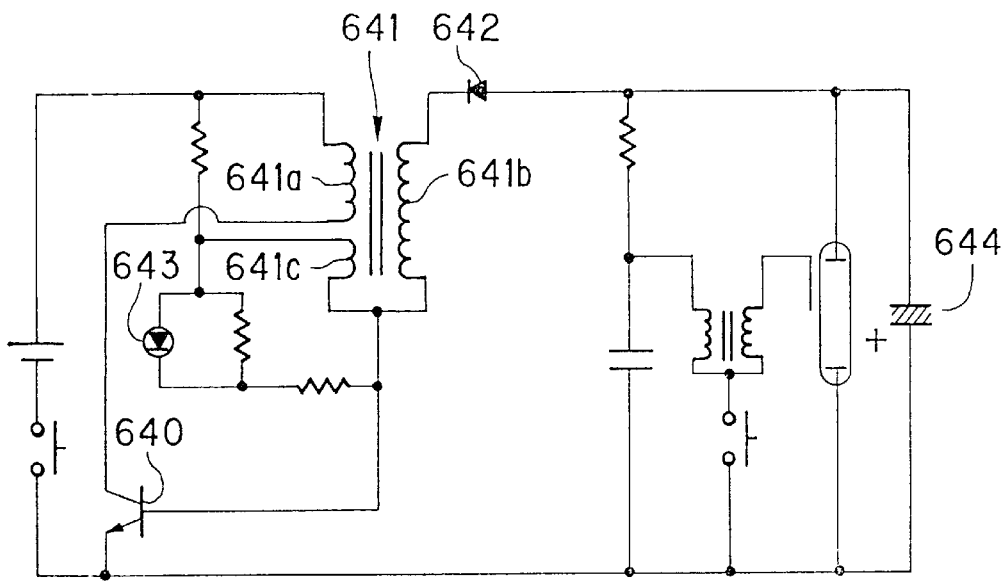
FIGS. 40 and 41 are schematic diagrams illustrating conventional circuitry of a flash device inclusive of a light-emitting diode.
Figure 41:
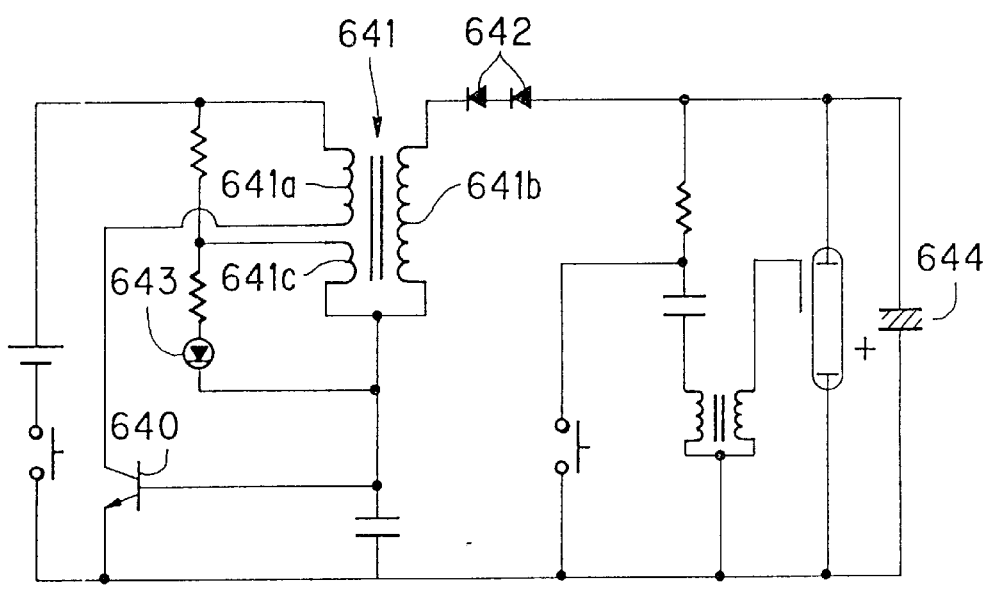
Figure 42A:
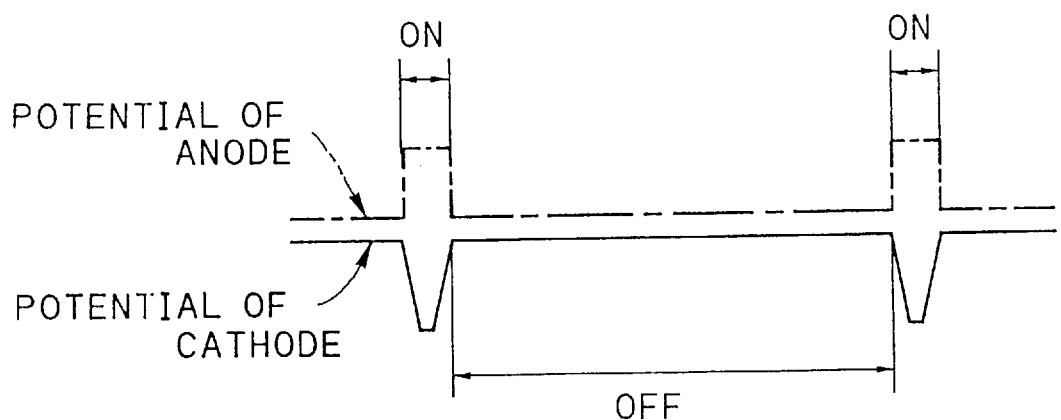
FIGS. 42A and 42B are graphs illustrating potential differences across the light-emitting diode of FIG. 40 and its periods of light emission, according to the prior art.
Figure 42B:
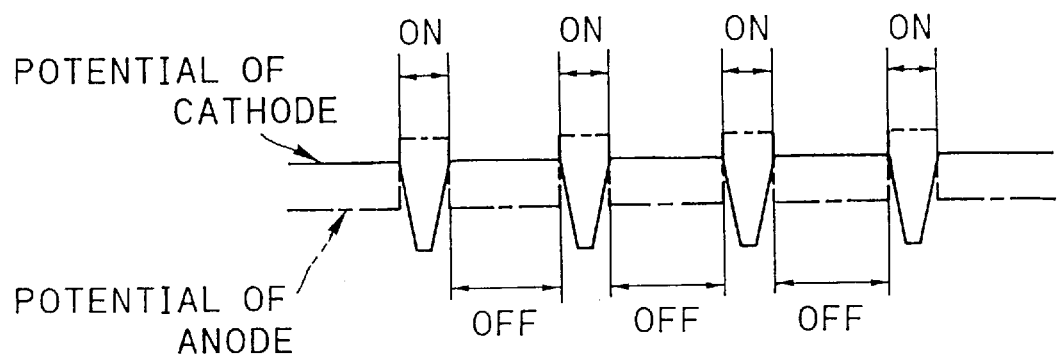

Another variant of photo film is illustrated in FIG. 39. Edge numbers 560 and 561 are arranged increasingly from the film trailer 546 toward the film leader 545 above the effective frame areas 544. The edge numbers 560 are oriented normally, while the edge numbers 561 are oriented upside down. Note that the positions of the edge numbers 560 and the edge numbers 561 may be exchanged. The location of the edge numbers 560 and the edge numbers 561 is associated with lateral edges of each negative frame. If negative frames were recorded in positions deviated from the edge numbers 560 or the edge numbers 561, this deviation would be a serious problem. However such a problem never occurs in the present invention as referred to formerly with the embodiment, because the photo film unit is always loaded with photo film regularly positioned without deviation. Note that pairs of edge numbers may be formed below the effective frame areas 544, not above the effective frame areas 544. It is also possible that each normally oriented edge number is positioned in diagonal arrangement from each upside-down oriented edge number with reference to the effective frame area. It is possible instead of the edge numbers 560 to arrange normally oriented edge numbers increasingly from the film leader 545 toward the film trailer 546.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, in which a film housing is pre-loaded with unexposed photo film, said film housing including a photograph-taking device and an electronic flash device, said photograph-taking device including a taking lens and a shutter mechanism, said flash device including a flash-emitting section driven in response to actuation of said shutter mechanism for emitting flash light toward a photographic field within a predetermined range, a main capacitor for storing charge to be discharged in said flash-emitting section, and a flash circuit board having a flash circuit for controlling charging of said main capacitor and flash emission of said flash-emitting section, said lens-fitted photo film unit further comprising:

a stationary aperture stop control device, disposed in a light path defined through said taking lens, for setting an aperture stop of said taking lens for flash photography larger than an aperture stop of said taking lens for standard photography, wherein said aperture stop is set larger only when said main capacitor is substantially charged, said aperture stop being controlled by a voltage developed across an aperture capacitor, a first terminal of the aperture capacitor being connected to ground, a second terminal of the aperture capacitor being connected to a tap on a secondary winding of an oscillating transformer through a first rectifying diode, the oscillating transformer being connected to the main capacitor through a second rectifying diode;

wherein, said stationary aperture stop control device includes a constantly transparent central portion disposed on an axis of said light path, and a peripheral portion disposed around said central portion, said peripheral portion being changeable between opacity for said standard photography and transparency for said flash photography, said central portion having a size of said smaller aperture stop set for said standard photography.

2. A lens-fitted photo film unit as defined in claim 1, wherein said aperture stop control device is electrochromic.

3. A lens-fitted photo film unit as defined in claim 1, wherein said aperture stop control device is a liquid crystal panel.

\* \* \* \* \*